United States Patent
Aoki

(10) Patent No.: US 6,327,094 B1
(45) Date of Patent: Dec. 4, 2001

(54) HIGH-PERFORMANCE AND COMPACT IMAGE-FORMING OPTICAL SYSTEM USING PRISM ELEMENTS

(75) Inventor: Norihiko Aoki, Iino-machi (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/275,257

(22) Filed: Mar. 23, 1999

(30) Foreign Application Priority Data

Mar. 25, 1998 (JP) .................................................. 10-077272

(51) Int. Cl.$^7$ .................................................. G02B 27/14
(52) U.S. Cl. .......................... 359/637; 359/633; 359/631
(58) Field of Search .................................. 359/630, 631, 359/633, 636, 637, 638, 640

(56) References Cited

U.S. PATENT DOCUMENTS

| | | | |
|---|---|---|---|
| 3,907,430 | * 9/1975 | Mann | 356/100 |
| 5,835,276 | * 11/1998 | Asai et al. | 359/638 |
| 6,084,715 | * 7/2000 | Aoki et al. | |
| 6,147,808 | * 11/2000 | Togino | 359/637 |
| 6,166,858 | * 12/2000 | Togino et al. | 359/633 |
| 6,178,048 | * 1/2001 | Togino et al. | 359/637 |

FOREIGN PATENT DOCUMENTS 10-68887   3/1998 (JP) .

OTHER PUBLICATIONS

Patent Abstracts of Japan, 07333505, Dec. 12, 1995, Shigeo.
Patent Abstracts of Japan, 08292371, Nov. 5, 1996, Kenichi, et al.
Patent Abstracts of Japan, 09005650, Jan. 10, 1997, Keisuke, et al.
Patent Abstracts of Japan, 09090229, Apr. 4, 1997, Makoto.
Patent Abstracts of Japan, 09222563, Aug. 26, 1997, Kenichi.
Patent Abstracts of Japan, 09211331, Aug. 15, 1997, Makoto.
Patent Abstracts of Japan, 08292368, Nov. 5, 1996, Makoto, et al.
Patent Abstracts of Japan, 08292372, Nov. 5, 1996, Tsunefumi, et al.
Patent Abstracts of Japan, 09222561, Aug. 26, 1997, Kenji.
Patent Abstracts of Japan, 09258105, Oct. 3, 1997, Norihiro, et al.
Patent Abstracts of Japan, 09258106, Oct. 3, 1997, Norihiro, et al.
Patent Abstracts of Japan, 10020196, Jan. 23, 1998, Norihiro, et al.

* cited by examiner

*Primary Examiner*—Ricky Mack
(74) *Attorney, Agent, or Firm*—Pillsbury Winthrop LLP

(57) ABSTRACT

A high-performance and low-cost image-forming optical system having a minimal number of constituent optical elements and made compact and thin by folding an optical path using reflecting surfaces arranged to minimize the number of reflections. The image-forming optical system has a first prism, a stop, and a second prism. The first prism has a first transmitting surface, a first reflecting surface, a second reflecting surface of positive power, and a second transmitting surface. The second prism has a first transmitting surface, a first reflecting surface, a second reflecting surface of positive power, and a second transmitting surface. The first transmitting surface and second reflecting surface of the first prism are the identical surface, and the first reflecting surface and second transmitting surface of the second prism are the identical surface. The image-forming optical system is approximately telecentric on the image side.

30 Claims, 28 Drawing Sheets

Hypothetic plane

Hypothetic plane

Hypothetic plane

Hypothetic plane

Hypothetic plane

Hypothetic plane

Hypothetic plane

Hypothetic plane

80 Objective optical system for observation
GF 2 GR
84 Cover member
Front unit  Stop  Rear unit
81 Filter
83 Image pickup surface
82 CCD
86 Light guide fiber bundle
85 Objective optical system for illumination

HIGH-PERFORMANCE AND COMPACT IMAGE-FORMING OPTICAL SYSTEM USING PRISM ELEMENTS

BACKGROUND OF THE INVENTION

The present invention relates to image-forming optical systems. More particularly, the present invention relates to a decentered optical system with a reflecting surface having a power for use in optical apparatus using a small-sized image pickup device, e.g. video cameras, digital still cameras, film scanners, and endoscopes.

Recently, with the achievement of small-sized image pickup devices, image-forming optical systems for use in video cameras, digital still cameras, film scanners, endoscopes, etc. have also been demanded to reduce in size and weight and also in cost.

In the general rotationally symmetric coaxial optical systems, however, optical elements are arranged in the direction of the optical axis. Therefore, there is a limit to the reduction in thickness of the optical systems. At the same time, the number of lens elements unavoidably increases because it is necessary to correct chromatic aberration produced by a rotationally symmetric refracting lens used in the optical systems. Therefore, it is difficult to reduce the cost in the present state of the art. Under these circumstances, there have recently been proposed optical systems designed to be compact in size by giving a power to a reflecting surface, which produces no chromatic aberration, and folding an optical path in the optical axis direction.

Japanese Patent Application Unexamined Publication Number [hereinafter referred to as "JP(A)"] 7-333505 proposes to reduce the thickness of an optical system by giving a power to a decentered reflecting surface and folding an optical path. In an example thereof, however, the number of constituent optical members is as large as five, and actual optical performance is unclear. No mention is made of the configuration of the reflecting surface.

JP(A) 8-292371, 9-5650 and 9-90229 each disclose an optical system in which an optical path is folded by a single prism or a plurality of mirrors integrated into a single block, and an image is relayed in the optical system to form a final image. In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably. The relay of the image also causes the overall volumetric capacity of the optical system to increase unfavorably.

JP(A) 9-222563 discloses an example of an optical system that uses a plurality of prisms. However, because the optical system is arranged to relay an image, the cost increases and the optical system becomes large in size unfavorably for the same reasons as stated above.

JP(A) 9-211331 discloses an example of an optical system in which an optical path is folded by using a single prism to achieve a reduction in size of the optical system. However, the optical system is not satisfactorily corrected for aberrations.

JP(A) 8-292368, 8-292372, 9-222561, 9-258105 and 9-258106 all disclose examples of zoom lens systems. In these examples, however, the number of reflections is undesirably large because an image is relayed in a prism. Therefore, surface accuracy errors and decentration accuracy errors of reflecting surfaces are transferred while being added up, unfavorably. At the same time, the overall size of the optical system unavoidably increases, unfavorably.

JP(A) 10-20196 discloses an example of a two-unit zoom lens system having a positive front unit and a negative rear unit, in which the positive front unit comprises a prism of negative power placed on the object side of a stop and a prism of positive power placed on the image side of the stop. JP(A) 10-20196 also discloses an example in which the positive front unit, which comprises a prism of negative power and a prism of positive power, is divided into two to form a three-unit zoom lens system having a negative unit, a positive unit and a negative unit. However, the prisms used in these examples each have two transmitting surfaces and two reflecting surfaces, which are all independent surfaces. Therefore, a relatively wide space must be ensured for the prisms. In addition, the image plane is large in size in conformity to the Leica size film format. Accordingly, the prisms themselves become unavoidably large in size. Furthermore, because the disclosed zoom lens systems are not telecentric on the image side, it is difficult to apply them to image pickup devices such as CCDs. In either of the examples of zoom lens systems, zooming is performed by moving the prisms. Accordingly, the decentration accuracy required for the reflecting surfaces becomes tight in order to maintain the required performance over the entire zooming range, resulting in an increase in the cost.

When a general refracting optical system is used to obtain a desired refracting power, chromatic aberration occurs at an interface surface thereof according to chromatic dispersion characteristics of an optical element. To correct the chromatic aberration and also correct other ray aberrations, the refracting optical system needs a large number of constituent elements, causing the cost to increase. In addition, because the optical path extends straight along the optical axis, the entire optical system undesirably lengthens in the direction of the optical axis, resulting in an unfavorably large-sized image pickup apparatus.

In decentered optical systems such as those described above in regard to the prior art, an imaged figure or the like is undesirably distorted and the correct shape cannot be reproduced unless the formed image is favorably corrected for aberrations, particularly rotationally asymmetric distortion.

Furthermore, in a case where a reflecting surface is used in a decentered optical system, the sensitivity to decentration errors of the reflecting surface is twice as high as that in the case of a refracting surface, and as the number of reflections increases, decentration errors that are transferred while being added up increase correspondingly. Consequently, manufacturing accuracy and assembly accuracy, e.g. surface accuracy and decentration accuracy, required for reflecting surfaces become even more strict.

SUMMARY OF THE INVENTION

In view of the above-described problems of the prior art, an object of the present invention is to provide a high-performance and low-cost image-forming optical system having a minimal number of constituent optical elements.

Another object of the present invention is to provide a high-performance image-forming optical system that is made compact and thin by folding an optical path using reflecting surfaces arranged to minimize the number of reflections.

To attain the above-described objects, the present invention provides an image-forming optical system having at least one prism at each of the front and back sides of a stop. The at least one prism has at least one reflecting surface having a power. The image-forming optical system is approximately telecentric on the image side. When the at least one prism is defined as a first prism, the image-forming optical system has a prism spacing fixing member for keeping the spacing between the first prism and another prism, which is defined as a second prism, along an optical path at a constant distance. The prism spacing fixing member is arranged to connect together at least a non-optical surface of the first prism and a non-optical surface of the second prism.

In addition, the present invention provides an image-forming optical system consisting of at least one prism placed at each of the front and back sides of a stop. The at least one prism has at least one reflecting surface having a power. When the at least one prism is defined as a first prism, the image-forming optical system has a prism spacing fixing member for keeping the spacing between the first prism and another prism, which is defined as a second prism, along an optical path at a constant distance. The prism spacing fixing member is arranged to connect together at least a non-optical surface of the first prism and a non-optical surface of the second prism.

In addition, the present invention provides an image-forming optical system having at least one prism at each of the front and back sides of a stop. The at least one prism has at least one reflecting surface having a power. The at least one prism has at least one optical surface having both transmitting and reflecting actions. When the at least one prism is defined as a first prism, the image-forming optical system has a prism spacing fixing member for keeping the spacing between the first prism and another prism, which is defined as a second prism, along an optical path at a constant distance. The prism spacing fixing member is arranged to connect together at least a non-optical surface of the first prism and a non-optical surface of the second prism.

The reasons for adopting the above-described arrangements in the present invention, together with the functions thereof, will be described below in order.

The first image-forming optical system according to the present invention, which is provided to attain the above-described objects, has at least one prism at each of the front and back sides of a stop. The at least one prism has at least one reflecting surface having a power. Furthermore, the image-forming optical system is approximately telecentric on the image side.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, an image-forming optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

Accordingly, the present invention adopts an arrangement in which at least one prism is placed at each of the front and back sides of a stop to obtain a satisfactory symmetry with respect to the stop, thereby enabling not only axial aberrations but also off-axis aberrations to be favorably corrected. If a prism is placed at only one side of a stop, asymmetry with respect to the stop is enhanced, and off-axis aberrations are unavoidably aggravated.

For the reasons stated above, the present invention provides an image-forming optical system having a basic arrangement in which at least one prism is placed at each of the front and back sides of a stop, and the at least one prism has at least one reflecting surface having a power. Furthermore, the image-forming optical system is approximately telecentric on the image side.

Next, the arrangement of an image-forming optical system that is approximately telecentric on the image side will be described in detail.

As has been stated above, reflecting surfaces have a high decentration error sensitivity in comparison to refracting surfaces. Therefore, it is desirable to provide an arrangement of an optical system that is as independent of the high decentration error sensitivity as possible. In the case of a general coaxial optical system arranged to be approximately telecentric on the image side, because extra-axial principal rays are approximately parallel to the optical axis, the positional accuracy of the extra-axial rays is satisfactorily maintained on the image plane even if defocusing is effected. Therefore, the image-forming optical system according to the present invention is arranged to reflect the property of the above-described arrangement. In particular, to prevent the performance of an optical system using a reflecting surface, which has a relatively high decentration error sensitivity, from being deteriorated by focusing, the image-forming optical system according to the present invention adopts an arrangement in which it is approximately telecentric on the image side, whereby the positional accuracy of extra-axial rays is maintained favorably.

Such an arrangement enables the present invention to be suitably applied to an image pickup optical system using an image pickup device, e.g. a CCD, in particular. Adopting the above-described arrangement minimizes the influence of the cosine fourth law. Accordingly, it is also possible to reduce shading.

As has been stated above, adopting the arrangement of the present invention makes it possible to obtain a compact image-forming optical system that has a smaller number of constituent optical elements than in the case of a refracting optical system and exhibits favorable performance throughout the image field, from the center to the periphery thereof.

The following is a description of a second image-forming optical system according to the present invention, which is provided to attain the above-described objects. This image-forming optical system consists of at least one prism placed at each of the front and back sides of a stop. The at least one prism has at least one reflecting surface having a power.

The second image-forming optical system also adopts a basic arrangement having the same operation/working-effect as stated in regard to the first image-forming optical system according to the present invention. In particular, the second image-forming optical system is characterized by consisting of prisms.

As has been stated above, a refracting optical element suffers chromatic aberration occurring at an interface surface thereof and requires another refracting optical element to correct the chromatic aberration. A prism also has refracting surfaces as entrance and exit surfaces thereof. However, chromatic aberration can be reduced to a very small quantity by assigning the greater part of the desired power to a reflecting surface, which produces no chromatic aberration, and correspondingly reducing the power of each of the refracting surfaces.

Thus, favorable chromatic aberration correction can be effected by a prism alone. However, by providing a plurality of prisms in front of and behind a stop to obtain a symmetry with respect to the stop as in the first image-forming optical system of the present invention, it is possible to favorably correct chromatic aberration, particularly lateral chromatic aberration, even when each individual prism is not completely corrected for chromatic aberration.

However, in a case where a refracting optical element is placed in the image-forming optical system according to the present invention, chromatic aberration occurs markedly in comparison to an arrangement consisting of prisms. To correct the chromatic aberration, another refracting optical element must be added. As a result, the number of constituent optical elements increases, and the cost rises. In addition, the optical system itself becomes unfavorably large in size. Therefore, it is preferable from the viewpoint of chromatic aberration correction that the image-forming optical system should consist of prisms.

Thus, it is possible to obtain a low-cost, high-performance and compact image-forming optical system that has a reduced number of constituent optical elements in comparison to a refracting optical system.

It should be noted that the term "arrangement consisting of prisms" used herein means that the image-forming optical system has only prisms as optical elements having a power, exclusive of optical elements having no power, e.g. filters. Examples of optical elements equivalent to those which have no power are a low-pass filter that is placed in front of a CCD as used as an image pickup device, and a filter that is placed in front of a photographic optical system.

The following is a description of a third image-forming optical system according to the present invention, which is provided to attain the above-described objects. The third image-forming optical system has at least one prism at each of the front and back sides of a stop. The at least one prism has at least one reflecting surface having a power. The at least one prism has at least one optical surface having both transmitting and reflecting actions.

The third image-forming optical system according to the present invention also adopts a basic arrangement having the same operation/working-effect as stated in regard to the first image-forming optical system according to the present invention. In particular, the third image-forming optical system is characterized in that the at least one prism has at least one optical surface having both transmitting and reflecting actions.

As has been stated above, in reflecting optical elements using reflecting surfaces, which has a high decentration error sensitivity, decentration errors of each surface are transferred to the subsequent surface, and eventually the decentration errors of all the surfaces are added up undesirably. In the case of a prism in particular, among reflecting optical elements, decentration errors are determined when the prism is molded and cannot be corrected during assembly or adjustment. Therefore, from the viewpoint of minimizing the added decentration errors, the smaller the number of reflecting surfaces, the better. Furthermore, the shorter the optical path length in the prism, the smaller the decentration errors transferred. As a result, the manufacturing accuracy required for the reflecting surfaces is eased. In the third image-forming optical system according to the present invention, the at least one prism uses at least one optical surface having both reflecting and transmitting actions, thereby making it possible to use a limited space effectively and to attain a reduction in size of the prism itself. At the same time, the optical path length can be shortened. Therefore, it is possible to minimize decentration errors.

The at least one optical surface having both reflecting and transmitting actions, which is used in the at least one prism, should desirably be provided such that the surface that acts as a transmitting surface forms a surface that is most away from the stop. That is, when the above-described arrangement is applied to a prism placed on the object side of the stop, it is desirable that the surface that acts as a transmitting surface should be placed at a position where it serves as an entrance surface through which light from an object enters the prism. In a case where the above-described arrangement is applied to a prism placed on the image side of the stop, it is desirable that the surface that acts as a transmitting surface should be placed at a position where it serves as an exit surface through which the light from the object exits from the prism. It is also possible to apply the above-described arrangement to both the object-side prism and the image-side prism. In an optical surface having both reflecting and transmitting actions, the effective area that functions as an optical surface is wider than that of a surface having only a reflecting or transmitting action. Therefore, by using the optical surface at the above-described position, it is possible to widen the field angle while maintaining the prism itself in a compact structure.

In the optical surface having both transmitting and reflecting actions according to the present invention, the reflecting action should desirably be total reflection. If the condition for total reflection is not satisfied, the optical surface cannot have both reflecting and transmitting actions, and it becomes difficult to reduce the size of the prism.

Reflecting surfaces other than the totally reflecting surface are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

Thus, it is possible to obtain a low-cost and compact image-forming optical system in which the prism manufacturing accuracy is favorably eased.

The following is a description of a fourth-image forming system according to the present invention, which is provided to attain the above-described objects. The fourth image-forming optical system has a plurality of prisms. At least one of the prisms has at least one reflecting surface having a power. One and only one image-formation plane is present where light exits after passing through all optical elements. The image-forming optical system is approximately telecentric on the image side.

As has been stated above, the decentration error sensitivity of a reflecting surface is higher than that of a refracting surface. In a reflecting optical member arranged in the form of a single block as in the case of a prism, surface accuracy errors and decentration errors of each surface are transferred while being added up. Therefore, the smaller the number of reflecting surfaces, the more the manufacturing accuracy required for each surface is eased. However, if the number of reflecting surfaces is excessively small, it becomes impossible to perform the desired aberration correction. In addition, the decentration error sensitivity of each individual reflecting surface, which is assigned the greater part of the desired power to correct various aberrations, becomes excessively high, causing the cost to increase in the production of the prism. Therefore, by adopting an arrangement in which a plurality of prisms are used and at least the reflecting surfaces are divided into a plurality of surfaces as in the present invention, it becomes possible to ease the manufacturing accuracy required for each individual prism and hence possible to favorably correct various aberrations including chromatic aberration. At the same time, providing a plurality of prisms enables assembly and adjustment to be performed by adjusting the relative positions of the prisms.

If the number of reflections is increased more than is needed, decentration errors at each reflecting surface will be added up to a correspondingly large extent. Therefore, it is undesirable to increase the number of reflections more than is needed. It is preferable for the image-forming optical system to have only one image-formation plane throughout the system. In the case of an image-forming optical system in which an intermediate image is formed and this image is relayed, the number of reflections increases more than is needed, and the manufacturing accuracy required for each surface becomes tight, causing the cost to increase unfavorably.

For the reasons stated above, the image-forming optical system according to the present invention has a basic arrangement in which it has a plurality of prisms, and at least one of the prisms has at least one reflecting surface having a power, and in which one and only one image-formation plane is present where light exits after passing through all optical elements. In addition, the image-forming optical system is approximately telecentric on the image side.

The operation/working-effect obtained by the use of prisms and the operation/working-effect of the image-forming optical system arranged to be approximately telecentric on the image side are the same as those stated above in regard to the first image-forming optical system according to the present invention.

As has been stated above, the arrangement of the fourth image-forming optical system according to the present invention makes it possible to obtain a compact image-forming optical system that has a reduced number of constituent optical elements in comparison to a refracting optical system and exhibits favorable performance throughout the image field, from the center to the periphery thereof.

The following is a description of a fifth-image forming optical system according to the present invention, which is provided to attain the above-described objects. The fifth image-forming optical system consists of a plurality of prisms and at least one of the prisms has at least one reflecting surface having a power. One and only one image-formation plane is present where light exits after passing through all optical elements.

The fifth image-forming optical system according to the present invention also adopts a basic arrangement that has the operation/working-effect stated above in regard to the fourth image-forming optical system according to the present invention. In particular, the fifth image-forming optical system is an image-forming optical system consisting of prisms. The operation/working-effect of the basic arrangement is the same as that stated above in regard to the fourth image-forming optical system according to the present invention. The operation/working-effect of the image-forming optical system consisting of prisms is the same as that stated above in regard to the second image-forming optical system according to the present invention.

The arrangement of the fifth image-forming optical system according to the present invention makes it possible to obtain a low-cost, high-performance and compact image-forming optical system that has a reduced number of constituent optical elements in comparison to a refracting optical system.

The following is a description of a sixth-image forming optical system according to the present invention, which is provided to attain the above-described objects. The sixth image-forming optical system has a plurality of prisms. At least one of the prisms has at least one reflecting surface having a power. One and only one image-formation plane is present where light exits after passing through all optical elements. The at least one of the prisms has at least one optical surface having both transmitting and reflecting actions.

The sixth image-forming optical system also has a basic arrangement having the operation/working-effect stated above in regard to the fourth image-forming optical system according to the present invention. In particular, at least one prism of the image-forming optical system has at least one optical surface having both transmitting and reflecting actions.

The operation/working-effect of the basic arrangement is the same as that stated above in regard to the fourth image-forming optical system according to the present invention. The operation/working-effect of the image-forming optical system in which at least one prism has at least one optical surface having both transmitting and reflecting actions is the same as that stated above in regard to the third image-forming optical system according to the present invention.

The arrangement of the sixth image-forming optical system according to the present invention makes it possible to ease the prism manufacturing accuracy and hence possible to obtain a low-cost and compact image-forming optical system.

If each of the first to third image-forming optical systems according to the present invention has only one image-formation plane throughout the system as stated above in regard to the fourth to sixth image-forming optical systems according to the present invention, the manufacturing accuracy required for the prism reflecting surfaces is eased, and the cost is further reduced.

If each of the fourth to sixth image-forming optical systems according to the present invention is arranged such that the stop is placed between the prisms as stated above in regard to the first to third image-forming optical systems according to the present invention, the performance for extra-axial rays can be maintained even more favorably.

The following is a description of a seventh image-forming optical system according to the present invention, which is provided to attain the above-described objects. The seventh image-forming optical system has a diverging prism on the object side of a stop and a converging prism on the image side of the stop and is approximately telecentric on the image side.

In an image-forming optical system using a refracting optical element, the power distribution varies according to the use application. For example, telephoto systems having a narrow field angle generally adopt an arrangement in which the entire system is formed as a telephoto type having a positive front unit and a negative rear unit, thereby making the overall length of the optical system shorter than the focal length. Wide-angle systems having a wide field angle generally adopt an arrangement in which the entire system is formed as a retrofocus type having a negative front unit and a positive rear unit, thereby making the back focus longer than the focal length.

In the case of an image-forming optical system using an image pickup device, e.g. a CCD, in particular, it is necessary to place an optical low-pass filter or an infrared cutoff filter between the image-forming optical system and the image pickup device to remove moire or to eliminate the influence of infrared rays. Therefore, with a view to ensuring a space for placing these optical members, it is desirable to adopt a retrofocus type arrangement for the image-forming optical system.

It is important for a retrofocus type image-forming optical system to be corrected for aberrations, particularly off-axis aberrations. The correction of off-axis aberrations depends largely on the position of the stop. As has been stated above, in the case of a general coaxial optical system, off-axis aberrations are aggravated if optical elements are not in symmetry with respect to the stop. For this reason, the common practice is to place optical elements of the same sign at respective positions facing each other across the stop, thereby obtaining a satisfactory symmetry with respect to the stop, and thus correcting off-axis aberrations. In the case of a retrofocus type system having a negative front unit and a positive rear unit, the power distribution is asymmetric in the first place. Therefore, the off-axis aberration correcting performance varies to a considerable extent according to the position of the stop.

Accordingly, in the seventh image-forming optical system according to the present invention, the stop is placed between the object-side diverging prism and the image-side converging prism, thereby making it possible to minimize the aggravation of off-axis aberrations due to the asymmetry of the power distribution. If the stop is placed on the object side of the object-side diverging prism or on the image side of the image-side converging prism, the asymmetry with respect to the stop is enhanced and becomes difficult to correct.

For the reasons stated above, the seventh image-forming optical system according to the present invention adopts a basic arrangement in which a diverging prism is provided on the object side of a stop, and a converging prism is provided on the image side of the stop. In addition, the seventh image-forming optical system is arranged to be approximately telecentric on the image side.

The operation/working-effect obtained by the use of prisms and the operation/working-effect of the image-forming optical system arranged to be approximately telecentric on the image side are the same as those stated above in regard to the first image-forming optical system according to the present invention. When the image-forming optical system is arranged in the form of a retrofocus type system in which the stop is placed between the two prisms, it becomes very easy to arrange the image-forming optical system to be approximately telecentric on the image side owing to the presence of the image-side converging prism. Accordingly, it is possible to correct off-axis aberrations easily.

As has been stated above, the arrangement of the seventh image-forming optical system according to the present invention makes it possible to obtain a compact image-forming optical system that has a reduced number of constituent optical elements in comparison to a refracting optical system and exhibits favorable performance throughout the image field, from the center to the periphery thereof.

The following is a description of an eighth image-forming optical system according to the present invention, which is provided to attain the above-described objects. The eighth image-forming optical system consists of a diverging prism placed on the object side of a stop and a converging prism placed on the image side of the stop.

The eighth image-forming optical system according to the present invention also adopts a basic arrangement having the same operation/working-effect as stated above in regard to the seventh image-forming optical system according to the present invention. In particular, the eighth image-forming optical system consists of prisms. The operation/working-effect of the basic arrangement is the same as that stated above in regard to the seventh image-forming optical system of the present invention, and the operation/working-effect of the image-forming optical system consisting of prisms is the same as that stated above in regard to the second image-forming optical system according to the present invention.

The arrangement of the eighth image-forming optical system according to the present invention makes it possible to obtain a low-cost, high-performance and compact image-forming optical system having a reduced number of constituent optical elements in comparison to a refracting optical system.

The following is a description of a ninth image-forming optical system according to the present invention, which is provided to attain the above-described objects. The ninth image-forming optical system has a diverging prism on the object side of a stop and a converging prism on the image side of the stop. At least one of the prisms has at least one optical surface having both transmitting and reflecting actions.

The ninth image-forming optical system according to the present invention adopts a basic arrangement having the same operation/working-effect as that stated above in regard to the seventh image-forming optical system according to the present invention. In particular, at least one of the prisms in the image-forming optical system has at least one optical surface having both transmitting and reflecting actions.

The operation/working-effect of the basic arrangement is the same as that stated above in regard to the seventh image-forming optical system according to the present invention, and the operation/working-effect of the arrangement in which at least one of the prisms has at least one optical surface having both transmitting and reflecting actions is the same as that stated above in regard to the third image-forming optical system according to the present invention.

The arrangement of the ninth image-forming optical system according to the present invention makes it possible to obtain a low-cost and compact image-forming optical system in which the prism manufacturing accuracy is favorably eased.

The following is a description of a tenth image-forming optical system according to the present invention, which is provided to attain the above-described objects. The tenth image-forming optical system has a converging prism and a diverging prism placed on the object side of the converging prism. The image-forming optical system has only one image-formation plane throughout the system and is arranged to be approximately telecentric on the image side.

As has been detailed above in regard to the seventh image-forming optical system according to the present invention, a high-performance and compact image-forming optical system can be obtained by placing a diverging prism and a converging prism in the form of a retrofocus type system. As has been detailed above in regard to the fourth image-forming optical system according to the present invention, the decentration error sensitivity of a reflecting surface is higher than that of a refracting surface. In a reflecting optical member arranged in the form of a single block as in the case of a prism, surface accuracy errors and decentration errors of each surface are transferred while being added up. Therefore, the smaller the number of reflecting surfaces, the more the manufacturing accuracy required for each surface is eased. Conversely, if the number of reflections is increased more than is needed, decentration errors at each reflecting surface are added up to a correspondingly large extent. Therefore, it is undesirable to increase the number of reflections more than is needed. It is preferable for the image-forming optical system to have only one image-formation plane throughout the system. In the case of an image-forming optical system in which an intermediate image is formed and this image is relayed, the number of reflections increases more than is needed, and the manufacturing accuracy required for each surface becomes tight, causing the cost to increase unfavorably.

For the reasons stated above, the tenth image-forming optical system adopts a basic arrangement in which a diverging prism is placed on the object side of a converging prism, and there is only one image-formation plane throughout the system. Furthermore, the image-forming optical system is arranged to be approximately telecentric on the image side. The operation/working-effect obtained by the use of prisms and the operation/working-effect of the image-forming optical system arranged to be approximately telecentric on the image side are the same as those stated above in regard to the first image-forming optical system according to the present invention.

As has been stated above, the arrangement of the tenth image-forming optical system according to the present invention makes it possible to obtain a compact and low-cost image-forming optical system that has a reduced number of constituent optical elements in comparison to a refracting optical system and exhibits favorable performance throughout the image field, from the center to the periphery thereof.

The following is a description of an eleventh image-forming optical system according to the present invention, which is provided to attain the above-described objects. The eleventh image-forming optical system consists of a converging prism and a diverging prism placed on the object side of the converging prism. The image-forming optical system has only one image-formation plane throughout the system.

The eleventh image-forming optical system according to the present invention also adopts a basic arrangement having the same operation/working-effect as that stated above in regard to the tenth image-forming optical system according to the present invention. In particular, the eleventh image-forming optical system consists of prisms. The operation/working-effect of the basic arrangement is the same as that stated above in regard to the tenth image-forming optical system according to the present invention, and the operation/working-effect of the image-forming optical system consisting of prisms is the same as that stated above in regard to the second image-forming optical system according to the present invention.

The arrangement of the eleventh image-forming optical system according to the present invention makes it possible to obtain a low-cost, high-performance and compact image-forming optical system having a reduced number of constituent optical elements in comparison to a refracting optical system.

The following is a description of a twelfth image-forming optical system according to the present invention, which is provided to attain the above-described objects. The twelfth image-forming optical system has a converging prism and a diverging prism placed on the object side of the converging prism. The image-forming optical system has only one image-formation plane throughout the system. At least one of the prisms has at least one optical surface having both transmitting and reflecting actions.

The twelfth image-forming optical system according to the present invention also adopts a basic arrangement having the same operation/working-effect as that stated above in regard to the tenth image-forming optical system according to the present invention. In particular, at least one of the prisms has at least one optical surface having both transmitting and reflecting actions.

The operation/working-effect of the basic arrangement is the same as that stated above in regard to the tenth image-forming optical system according to the present invention, and the operation/working-effect of the arrangement in which at least one of the prisms has at least one optical surface having both transmitting and reflecting actions is the same as that stated above in regard to the third image-forming optical system according to the present invention.

The arrangement of the twelfth image-forming optical system according to the present invention makes it possible to obtain a low-cost and compact image-forming optical system in which the prism manufacturing accuracy is favorably eased.

If each of the seventh to ninth image-forming optical systems according to the present invention has only one image-formation plane throughout the system as stated above in regard to the tenth to twelfth image-forming optical systems according to the present invention, the manufacturing accuracy required for the prism reflecting surfaces is eased, and the cost is further reduced.

If each of the tenth to twelfth image-forming optical systems according to the present invention is arranged such that the stop is placed between the prisms as stated above in regard to the seventh to ninth image-forming optical systems according to the present invention, the performance for extra-axial rays can be maintained even more favorably.

The following is a description of a thirteenth image-forming optical system according to the present invention, which is provided to attain the above-described objects. The thirteenth image-forming optical system has a plurality of prisms placed such that transmitting surfaces thereof are disposed in close proximity to each other so as to face each other across a stop. Optical surfaces each having both transmitting and reflecting actions are placed outside the transmitting surfaces of the prisms in symmetry with respect to the stop.

A prism as considered to be a reflecting optical element needs at least two transmitting surfaces serving as an entrance surface and an exit surface, respectively, and at least one reflecting surface for reflecting rays in the prism. As has been stated above, to reduce the decentration error of a reflecting optical element such as a prism, it is conceivable to minimize the number of reflecting surfaces, which have a high decentration error sensitivity, and to shorten the length of the optical path of rays passing through the prism, along which decentration errors are transferred. The above-described entrance and exit surfaces and internal reflecting surface can be formed as independent surfaces. However, by forming one of the surfaces from an optical surface having both transmitting and reflecting actions, the number of surfaces is reduced. At the same time, by effectively utilizing a limited space, the optical path length of rays passing through the prism is shortened. Accordingly, the overall decentration error itself can be reduced. Thus, the manufacturing accuracy required for the prism, particularly the reflecting surface, is eased, and the cost is reduced.

Image-forming optical systems are required to exhibit favorable image-forming performance throughout the image field, from the center to the periphery thereof. For the central portion of the image field, the required performance can be ensured with relative ease. However, it is generally difficult to ensure the required performance for extra-axial rays, which depends largely on the degree of symmetry of the optical system with respect to the stop. In particular, as the field angle becomes wider, the dependence on the degree of symmetry becomes more remarkable. Therefore, the thirteenth image-forming optical system according to the present invention is arranged to satisfy the required symmetry with respect to the stop, thereby preventing aggravation of off-axis aberrations, and thus making it possible to obtain favorable image-forming performance throughout the image field, from the center to the periphery thereof.

An optical surface having both transmitting and reflecting actions has a wider effective area than that of an optical surface having only a reflecting or transmitting action. Therefore, if an optical surface having both transmitting and reflecting actions is placed on the entrance side in particular, the field angle can be widened without need of widening the effective area. Accordingly, taking into consideration the symmetry with respect to the stop, the thirteenth image-forming optical system according to the present invention uses a plurality of prisms placed such that transmitting surfaces thereof are disposed in close proximity to each other so as to face each other across a stop. In addition, optical surfaces each having both transmitting and reflecting actions are placed outside the transmitting surfaces in symmetry with respect to the stop, thereby making it possible to achieve a compact and low-cost image-forming optical system while attaining favorable performance throughout the image field, from the center to the periphery thereof.

An optical surface with both reflecting and transmitting actions, which is used as at least one surface of the at least one prism, should desirably be arranged such that the surface that acts as a transmitting surface forms a surface that is most away from the stop as viewed in the sequence in which light from the object passes. That is, when the above-described arrangement is applied to a prism placed on the object side of the stop, it is desirable that the surface that acts as a transmitting surface should be placed at a position where it serves as an entrance surface through which light from the object enters the prism. In a case where the above-described arrangement is applied to a prism placed on the image side of the stop, it is desirable that the surface that acts as a transmitting surface should be placed at a position where it serves as an exit surface through which the light from the object exits from the prism. It is also possible to apply the above-described arrangement to both the object-side prism and the image-side prism.

It should be noted that in the optical surface having both transmitting and reflecting actions according to the present invention, the reflecting action should desirably be total reflection. If the condition for total reflection is not satisfied, the optical surface cannot have both reflecting and transmitting actions, and it becomes difficult to reduce the size of the prism.

Reflecting surfaces other than the totally reflecting surface are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

Thus, it is possible to obtain a low-cost and compact image-forming optical system in which the prism manufacturing accuracy is favorably eased. Regarding the prism configuration, it is possible to place the prisms in plane or point symmetry with respect to the stop while satisfying the required symmetry with respect to the stop. Accordingly, the degree of freedom for layout of the optical system increases favorably.

The following is a description of a fourteenth image-forming optical system according to the present invention, which is provided to attain the above-described objects. The fourteenth image-forming optical system has, in order in which rays pass from the object side, a first prism, a stop, and a second prism. The first prism has a first transmitting surface, a first reflecting surface, a second reflecting surface, and a second transmitting surface. The second prism has a first transmitting surface, a first reflecting surface, a second reflecting surface, and a second transmitting surface. The first transmitting surface and second reflecting surface of the first prism are the identical surface, and the first reflecting surface and second transmitting surface of the second prism are the identical surface.

The fourteenth image-forming optical system according to the present invention adopts an arrangement in which optical surfaces are placed in symmetry with respect to a stop to thereby correct off-axis aberrations, and an optical surface having both reflecting and transmitting actions is introduced to shorten the optical path length in a prism, thereby easing the manufacturing accuracy required for reflecting surfaces.

As has been stated above, to correct off-axis aberrations, it is important to place optical surfaces in symmetry with respect to a stop. In the fourteenth image-forming optical system according to the present invention, the positions where the optical surfaces are placed are limited even more specifically, thereby enabling the image-forming optical system to exhibit favorable performance for both axial and extra-axial rays despite a compact structure. That is, by using a surface having both transmitting and reflecting actions as a surface of the first prism that is closest to the object side, the effective diameter of the first transmitting surface can be enlarged easily. Thus, even if incident rays have a wide field angle, the prism can be made compact in size. Rays entering the prism through the first transmitting surface are reflected by the first reflecting surface, which has only a reflecting action, and then reach the second reflecting surface, which is the identical with the first transmitting surface having both reflecting and transmitting actions. The rays are totally reflected by the second reflecting surface and exit from the prism through the second transmitting surface, which has only a transmitting action, to reach the stop. In particular, in a case where there is only one reflecting surface in one prism, it is impossible to form an optical surface having both reflecting and transmitting actions. In addition, when there is only one reflecting surface, aberration correction cannot be made, and the degree of freedom with which a ray passing direction can be determined reduces. Accordingly, the layout of the image-forming optical system is undesirably limited. As a result, it becomes impossible to achieve a reduction in size of the optical system.

Even in a case where two reflecting surfaces are used as in the arrangement according to the present invention, the optical path length in the prism can be reduced by arranging at least one of the reflecting surfaces in the form of a surface having both transmitting and reflecting actions. Consequently, it is possible to minimize the increase in the total amount of decentration error due to the transfer of decentration errors of each prism surface. Accordingly, it is possible to ease the manufacturing accuracy required for the reflecting surfaces in particular and hence possible to reduce the cost.

By placing an optical surface having both reflecting and transmitting actions on the entrance side of a prism, it is possible to achieve a wide field angle while keeping the prism compact in size. The second prism should preferably be arranged such that the optical surface thereof is in a symmetric relation to the first prism with respect to the stop. This arrangement is particularly useful to correct off-axis aberrations.

As has been stated above, the arrangement of the fourteenth image-forming optical system according to the present invention makes it possible to obtain a compact and low-cost image-forming optical system in which favorable performance is ensured throughout the image field, from the center to the periphery thereof.

In any of the first to fourteenth image-forming optical systems according to the present invention, it is desirable that at least one reflecting surface should have a power. By giving a power to a reflecting surface, which produces no chromatic aberration, it is possible to minimize chromatic aberration produced in the entire image-forming optical system. Furthermore, the inside of a prism is filled with a transparent medium having a refractive index higher than that of air. Therefore, to obtain the same power, the curvature required for a prism reflecting surface is smaller than in the case of surface reflection by a mirror or the like placed in the air, and it is also possible to minimize the amount of aberration produced. Thus, it becomes possible to obtain even more favorable image-forming performance.

In any of the first to fourteenth image-forming optical systems according to the present invention, it is desirable that at least one reflecting surface of the object-side prism should have a negative power, and at least one reflecting surface of the image-side prism should have a positive power. With this arrangement, the greater part of the power of the object-side diverging prism is assigned to the reflecting surface, and the greater part of the power of the image-side converging prism is assigned to the reflecting surface. Thus, it is possible to obtain an image-forming optical system having minimal chromatic aberration.

In any of the first to fourteenth image-forming optical systems according to the present invention, when a light ray from the object center that passes through the center of the stop and reaches the center of the image plane is defined as an axial principal ray, it is desirable that at least one of the reflecting surfaces should be decentered with respect to the axial principal ray. If at least one reflecting surface is not decentered with respect to the axial principal ray, the axial principal ray travels along the same optical path when incident on and reflected from the reflecting surface, and thus the axial principal ray is intercepted in the optical system undesirably. As a result, an image is formed from only a light beam whose central portion is shaded. Consequently, the center of the image is unfavorably dark, or no image is formed in the center of the image field.

It is also possible to decenter a reflecting surface with a power with respect to the axial principal ray.

When a reflecting surface with a power is decentered with respect to the axial principal ray, it is desirable that at least one of surfaces constituting a prism used in the present invention should be a rotationally asymmetric surface. It is particularly preferable from the viewpoint of aberration correction that at least one reflecting surface should be a rotationally asymmetric surface.

The reasons for adopting the above-described arrangements in the present invention will be described below in detail.

First, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the image-forming optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 34, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 35, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 36, as in the case of the above.

The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of a free-form surface.

$$Z = cr^2 / \left[ 1 + \sqrt{\{1 - (1+k)c^2 r^2\}} \right] + \sum_{j=2}^{66} C_j X^m Y^n \quad \text{(a)}$$

In Eq. (a), the first term is a spherical surface term, and the second term is a free-form surface term.

In the spherical surface term:
c: the curvature at the vertex
k: a conic constant $r = \sqrt{(X^2 + Y^2)}$ The free-form surface term is given by $$\sum_{j=2}^{66} C_j X^m Y^n = C_2 X + C_3 Y + C_4 X^2 + C_5 XY + C_6 Y^2 +$$

$$C_7 X^3 + C_8 X^2 Y + C_9 XY^2 + C_{10} Y^3 +$$

$$C_{11} X^4 + C_{12} X^3 Y + C_{13} X^2 Y^2 + C_{14} XY^3 +$$

$$C_{15} Y^4 + C_{16} X^5 + C_{17} X^4 Y + C_{18} X^3 Y^2 +$$

$$C_{19} X^2 Y^3 + C_{20} XY^4 + C_{21} Y^5 + C_{22} X^6 +$$

$$C_{23} X^5 Y + C_{24} X^4 Y^2 + C_{25} X^3 Y^3 + C_{26} X^2 Y^4 +$$

$$C_{27} XY^5 + C_{28} Y^6 + C_{29} X^7 + C_{30} X^6 Y +$$

$$C_{31} X^5 Y^2 + C_{32} X^4 Y^3 + C_{33} X^3 Y^4 + C_{34} X^2 Y^5 +$$

$$C_{35} XY^6 + C_{36} Y^7$$

$$\ldots$$

where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms with odd-numbered powers of X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, the productivity can be improved.

It should be noted that the above defining equation (a) is shown as merely an example, and that the feature of the present invention resides in that rotationally asymmetric aberrations due decentration are corrected and, at the same time, the productivity is improved by using a rotationally asymmetric surface having only one plane of symmetry. Therefore, the same advantageous effect can be obtained for any other defining equation that expresses a rotationally asymmetric surface.

In any of the first to fourteenth image-forming optical systems according to the present invention, at least one prism should preferably use at least one optical surface having both reflecting and transmitting actions. This arrangement makes it possible to use a limited space effectively and to attain a reduction in size of the prism. In this case, the optical path length of rays passing through the prism is shortened. Consequently, it becomes possible to minimize the effect produced by the transfer of decentration errors of reflecting surfaces, which have a high decentration error sensitivity. Accordingly, it is possible to ease the manufacturing accuracy required for the reflecting surfaces and hence possible to reduce the cost.

The reflecting action of the optical surface having both transmitting and reflecting actions should desirably be total reflection. If the condition for total reflection is not satisfied, the optical surface cannot have both reflecting and transmitting actions, and it becomes difficult to reduce the size of the prism. Furthermore, it is impossible to ease the manufacturing accuracy required for each reflecting surface.

Reflecting surfaces used in the present invention, exclusive of totally reflecting surfaces, are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

In any of the first to fourteenth image-forming optical systems according to the present invention, it is preferable for the image-forming optical system to have only one image-formation plane throughout the system. As has been stated above, the decentration error sensitivity of a reflecting surface is higher than that of a refracting surface. In a reflecting optical member arranged in the form of a single block as in the case of a prism, surface accuracy errors and decentration errors of each surface are transferred while being added up. Therefore, the smaller the number of reflecting surfaces, the more the manufacturing accuracy required for each surface is eased. Accordingly, it is undesirable to increase the number of reflections more than is needed. For example, in an image-forming optical system in which an intermediate image is formed and this image is relayed, the number of reflections increases more than is needed, and the manufacturing accuracy required for each surface becomes tight, causing the cost to increase unfavorably.

In any of the first to fourteenth image-forming optical systems according to the present invention, focusing of the image-forming optical system can be effected by moving all the constituent elements or moving only one prism. However, it is also possible to effect focusing by moving the image-formation plane in the direction of the axial principal ray exiting from the surface closest to the image side. By doing so, it is possible to prevent displacement of the axial principal ray on the entrance side due to focusing even if the direction in which the axial principal ray from the object enters the optical system is not coincident with the direction of the axial principal ray exiting from the surface closest to the image side owing to the decentration of the image-forming optical system. It is also possible to effect focusing by moving a plurality of wedge-shaped prisms, which are formed by dividing a plane-parallel plate, in a direction perpendicular to the Z-axis. In this case also, focusing can be performed independently of the decentration of the image-forming optical system.

In any of the first to fourteenth image-forming optical systems according to the present invention, if at least one of the prisms is formed by using an organic material such as a plastic material, the cost can be reduced. It is desirable to use a material of low moisture absorption, such as amorphous polyolefin, because such a material has a minimum change in image-forming performance with changes in moisture.

In any of the first to fourteenth image-forming optical systems according to the present invention, temperature compensation can be made by using a diverging prism and a converging prism. By providing the prisms with powers of different signs, it is possible to prevent the focal shift due to changes in temperature, which is a problem arising when a plastic material is used to form a prism.

In any of the first to fourteenth image-forming optical systems according to the present invention, it is desirable that each of the plurality of prisms should have a positioning portion for setting a relative position that is provided on a surface having no optical action. In a case where a plurality of prisms each having a reflecting surface with a power are provided as in the present invention in particular, relative displacement of each prism causes the performance to be deteriorated. Therefore, in the present invention, as shown in parts (a) and (b) of FIG. 27, a positioning portion B for setting a relative position is provided on each surface NP of each prism P that has no optical action, thereby ensuring the required positional accuracy. Thus, the desired performance can be ensured. In particular, if a plurality of prisms P are integrated into one unit by using the positioning portions B and coupling members J, it becomes unnecessary to assemble and adjust a plurality of prisms P which would otherwise be separate from each other. Accordingly, the cost can be further reduced. In the case of part (a) of FIG. 27, a positioning portion B and a coupling member J are integrated with each other. It should be noted that FIG. 27 shows the prism-integrating structure as an example, and it is possible to adopt any other method whereby a plurality of prisms P are integrated by using positioning portions B and coupling members J.

In any of the first to fourteenth image-forming optical systems according to the present invention, the optical path can be folded in a direction different from the decentration direction of the image-forming optical system according to the present invention by placing a reflecting optical member, e.g. a mirror, on the object side of the entrance surface of the image-forming optical system. By doing so, the degree of freedom for layout of the image-forming optical system further increases, and the overall size of the image-forming optical apparatus can be further reduced.

In any of the first to fourteenth image-forming optical systems according to the present invention, the image-forming optical system can be formed from prisms alone. By doing so, the number of components is reduced, and the cost is lowered. Furthermore, a plurality of prisms may be integrated into one prism at each of the front and back sides of the stop. By doing so, the cost can be further reduced.

In any of the first to fourteenth image-forming optical systems according to the present invention, the image-forming optical system may be a fast, single focal length lens system. As has been stated above, the decentration error sensitivity of a reflecting surface is higher than that of a refracting surface. It is undesirable to move an optical element including a reflecting surface to a considerable extent as in a zoom lens system because this would cause the performance to be deteriorated. To maintain the desired performance despite moving the optical element to a considerable extent, assembly and adjustment must be made with high accuracy. This causes the cost to increase unfavorably. The present invention makes it possible to obtain a fast, single focal length lens system whose F-number is smaller than about 3 by adopting the arrangement of any of the first to fourteenth image-forming optical systems.

In any of the first to fourteenth image-forming optical systems according to the present invention, it is desirable to satisfy the following condition:

$$1° < |\alpha| \tag{1-1}$$

where $\alpha$ is the angle formed between the axial principal ray and a line normal to the rotationally asymmetric surface at a point where the axial principal ray intersects the rotationally asymmetric surface.

By tilting the rotationally asymmetric surface with respect to the axial principal ray, correction of decentration aberrations can be performed effectively. In particular, when the decentered reflecting surface has a power, it is possible to correct comatic and astigmatic aberrations due to decentration.

If $|\alpha|$ is not larger than the lower limit of the condition (1-1), i.e. 1°, it becomes impossible for this surface to correct comatic and astigmatic aberrations due to decentration that are produced by another surface, and the resolution degrades even for an axial image.

It is more desirable from the viewpoint of aberration correction to satisfy the following condition:

$$10° < |\alpha| < 80° \tag{1-2}$$

It is necessary for $|\alpha|$ to be larger than the lower limit of this condition, i.e. 10°, in order to correct aberrations produced by another surface. If $|\alpha|$ is not smaller than the upper limit, i.e. 80°, the amount of comatic and astigmatic aberrations due to decentration that are produced by this surface becomes excessively large, resulting in over-correction. Thus, it becomes difficult to correct decentration aberrations with good balance.

It is still more desirable to satisfy the following condition:

$$10° < |\alpha| < 60° \tag{1-3}$$

By satisfying the condition (1-3), the aberration correcting performance is further improved.

In any of the first to fourteenth image-forming optical systems according to the present invention, it is desirable to satisfy the following condition:

$$0 < |DY| < 0.1 \text{ (radian)} \tag{2-1}$$

where, when one and only one plane of symmetry of a plane-symmetry free-form surface is defined as a YZ-plane and a direction perpendicular to the YZ-plane is defined as an X-axis, DY is the difference between the value of the tangent in the YZ-plane of a line normal to the surface at a point where a principal ray at the maximum field angle in the X-axis direction impinges on the surface and the value of the tangent in the YZ-plane of a line normal to the surface at a point where the axial principal ray impinges on the surface.

The condition (2-1) relates to a bow-shaped rotationally asymmetric image distortion in which a horizontal line, for example, is undesirably curved in a bow shape when imaged.

To describe the above difference DY, part (a) of FIG. 37 shows a perspective view, and part (b) of FIG. 37 shows a projection of part (a) of FIG. 37 onto the YZ-plane. DY is the difference between the value of the tangent in the YZ-plane of a line n' normal to a rotationally asymmetric surface A at a point where a principal ray at the maximum field angle in the X-axis direction intersects the rotationally asymmetric surface A and the value of the tangent in the YZ-plane of a line n normal to the rotationally asymmetric surface A at a point where the axial principal ray intersects the rotationally asymmetric surface A.

If $|DY|$ is not larger than the lower limit of the condition (2-1), i.e. 0, it becomes impossible to correct a bow-shaped image distortion. If $|DY|$ is not smaller than the upper limit, i.e. 0.1, a bow-shaped image distortion is over-corrected. In either case, the image is distorted in a bow shape.

It is more desirable to satisfy the following condition:

$$0 < |DY| < 0.05 \text{ (radian)} \tag{2-2}$$

By satisfying the condition (2-2), a bow-shaped image distortion can be corrected even more favorably.

In any of the first to fourteenth image-forming optical systems according to the present invention, it is desirable to satisfy the following condition:

$$0 \leq |Cxn/Pxn| < 10 \tag{3-1}$$

where, when the direction in which the axial principal ray travels until it reaches the first surface of the image-forming optical system is defined as a Z-axis direction, and one and only one plane of symmetry of a plane-symmetry free-form surface is defined as a YZ-plane, and further a direction perpendicularly intersecting the YZ-plane is defined as an X-axis direction, Cxn is the difference between the curvature in the X-axis direction of a portion of the surface at which a principal ray at the maximum field angle in the positive direction of the Y-axis impinges on the surface and the curvature in the X-axis direction of a portion of the surface at which a principal ray at the maximum field angle in the negative direction of the Y-axis impinges on the surface, and Pxn is the power in the X-axis direction of a portion of the surface at which the axial principal ray impinges on the surface.

The condition (3-1) relates to a trapezoidal image distortion. If $|Cxn/Pxn|$ is not smaller than the upper limit, i.e. 10, a trapezoidal image distortion becomes excessively large and hence impossible to correct by another surface.

It is more desirable to satisfy the following condition:

$$0 \leq |Cxn/Pxn| < 1 \tag{3-2}$$

By satisfying the condition (3-2), a trapezoidal image distortion can be corrected even more favorably.

In any of the first to fourteenth image-forming optical systems according to the present invention, it is desirable to satisfy the following condition:

$$0<|Pxn/Px|<100 \qquad (4\text{-}1)$$

where Px is the power in the X-axis direction of the entire image-forming optical system.

The power Px is determined as follows. As shown in FIG. 38, when the direction of decentration of the image-forming optical system is taken in the Y-axis direction, a light ray which is parallel to the axial principal ray of the image-forming optical system and which has a small height d in a direction parallel to the YZ-plane is made to enter the image-forming optical system from the object side thereof. The angle that is formed between that ray and the axial principal ray exiting from the image-forming optical system when the loci of the two rays are projected onto the YZ-plane is denoted by NA'yi, and NA'yi/d is defined as the power Py in the Y-axis direction of the entire image-forming optical system. Similarly, a light ray which is parallel to the axial principal ray of the image-forming optical system and which has a small height d in the X-axis direction, which is perpendicular to the YZ-plane, is made to enter the image-forming optical system from the object side thereof. The angle that is formed between that ray and the axial principal ray exiting from the image-forming optical system when the loci of the two rays are projected onto a plane perpendicularly intersecting the YZ-plane and containing the axial principal ray is denoted by NA'xi, and NA'xi/d is defined as the power Px in the X-axis direction of the entire image-forming optical system.

If $|Pxn/Px|$ is not smaller than the upper limit of the condition (4-1), i.e. 100, the power of the rotationally asymmetric surface becomes excessively strong relative to the power of the entire image-forming optical system. If the rotationally asymmetric surface has an excessively strong power, rotationally asymmetric aberrations produced by the rotationally asymmetric surface become large and hence impossible to correct by another surface. If $|Pxn/Px|$ is not larger than the lower limit, i.e. 0, the power in the X-axis direction of the rotationally asymmetric surface becomes zero. Consequently, it becomes impossible to correct rotationally asymmetric aberrations. To compensate for the lack of power, it is necessary to give a power in the X-axis direction to another surface. This causes an increase in the number of surfaces constituting the image-forming optical system and thus makes it impossible to achieve a compact and low-cost image-forming optical system.

It is more desirable to satisfy the following condition:

$$0<|Pxn/Px|<10 \qquad (4\text{-}2)$$

By satisfying the condition (4-2), rotationally asymmetric aberrations can be corrected even more favorably.

In any of the first to fourteenth image-forming optical systems according to the present invention, it is desirable to satisfy the following condition:

$$0<|Pyn/Py|<100 \qquad (5\text{-}1)$$

where, when the direction of decentration of the image-forming optical system is taken in the Y-axis direction, and the direction in which the axial principal ray travels until it reaches the first surface of the image-forming optical system is defined as a Z-axis direction, and further one and only plane of symmetry of a plane-symmetry free-form surface is defined as a YZ-plane, and further a direction perpendicularly intersecting the YZ-plane is defined as an X-axis direction, Pyn is the power in the Y-axis direction of a portion of the surface at which the axial principal ray impinges on the surface.

If $|Pyn/Py|$ is not smaller than the upper limit of the condition (5-1), i.e. 100, the power of the rotationally asymmetric surface becomes excessively strong relative to the power of the entire image-forming optical system. If the rotationally asymmetric surface has an excessively strong power, rotationally asymmetric aberrations produced by the rotationally asymmetric surface become large and hence impossible to correct by another surface. If $|Pyn/Py|$ is not larger than the lower limit, i.e. 0, the power in the Y-axis direction of the rotationally asymmetric surface becomes zero. Consequently, it becomes impossible to correct rotationally asymmetric aberrations. To compensate for the lack of power, it is necessary to give a power in the Y-axis direction to another surface. This causes an increase in the number of surfaces constituting the image-forming optical system and thus makes it impossible to achieve a compact and low-cost image-forming optical system.

It is more desirable to satisfy the following condition:

$$0<|Pyn/Py|<10 \qquad (5\text{-}2)$$

By satisfying the condition (5-2), rotationally asymmetric aberrations can be corrected even more favorably.

In any of the first to fourteenth image-forming optical systems according to the present invention, it is desirable to satisfy the following condition:

$$0.5<|Px/Py|<2 \qquad (6\text{-}1)$$

If $|Px/Py|$ is not smaller than the upper limit of the condition (6-1), i.e. 2, or not larger than the lower limit, i.e. 0.5, the focal lengths in the X- and Y-axis directions of the entire image-forming optical system become exceedingly different from each other. Consequently, it becomes difficult to favorably correct rotationally asymmetric aberrations. In particular, the image is undesirably distorted in a rotationally asymmetric form, and it is difficult to correct the image distortion.

It is more desirable to satisfy the following condition:

$$0.8<|Px/Py|<1.25 \qquad (6\text{-}2)$$

By satisfying the condition (6-2), rotationally asymmetric aberrations can be corrected even more favorably.

In any of the first to fourteenth image-forming optical systems according to the present invention, it is desirable to satisfy the following condition:

$$0.01<|Pxf/Px|<2 \qquad (7\text{-}1)$$

where Pxf is the power in the X-axis direction of a part of the image-forming optical system that is closer to the object side than the stop.

If $|Pxf/Px|$ is not smaller than the upper limit of the condition (7-1), i.e. 2, the power in the X-axis direction of the part of the image-forming optical system that is closer to the object side than the stop becomes excessively strong, and it becomes impossible to correct aberrations produced in that portion of the image-forming optical system. If $|Pxf/Px|$ is not larger than the lower limit, i.e. 0.01, the power in the X-axis direction of the part of the image-forming optical system that is closer to the object side than the stop becomes excessively weak. Consequently, it becomes impossible to reduce the overall size of the image-forming optical system.

It is more desirable to satisfy the following condition:

$$0.05 < |Pxf/Px| < 1.2 \quad (7\text{-}2)$$

By satisfying the condition (7-2), it is possible to obtain an image-forming optical system that is even more compact and corrected for various aberrations even more favorably.

In any of the first to fourteenth image-forming optical systems according to the present invention, it is desirable to satisfy the following condition:

$$0.01 < |Pyf/Py| < 2 \quad (8\text{-}1)$$

where Pyf is the power in the Y-axis direction of a part of the image-forming optical system that is closer to the object side than the stop.

If |Pyf/Py| is not smaller than the upper limit of the condition (8-1), i.e. 2, the power in the Y-axis direction of the part of the image-forming optical system that is closer to the object side than the stop becomes excessively strong, and it becomes impossible to correct aberrations produced in that portion of the image-forming optical system. If |Pyf/Py| is not larger than the lower limit, i.e. 0.01, the power in the Y-axis direction of the part of the image-forming optical system that is closer to the object side than the stop becomes excessively weak. Consequently, it becomes impossible to reduce the overall size of the image-forming optical system.

It is more desirable to satisfy the following condition:

$$0.05 < |Pyf/Py| < 1.2 \quad (8\text{-}2)$$

By satisfying the condition (8-2), it is possible to obtain an image-forming optical system that is even more compact and corrected for various aberrations even more favorably.

In any of the first to fourteenth image-forming optical systems according to the present invention, it is desirable to satisfy the following condition:

$$0.01 < |Pxb/Px| < 2 \quad (9\text{-}1)$$

where Pxb is the power in the X-axis direction of a part of the image-forming optical system that is closer to the image side than the stop.

If |Pxb/Px| is not smaller than the upper limit of the condition (9-1), i.e. 2, the power in the X-axis direction of the part of the image-forming optical system that is closer to the image side than the stop becomes excessively strong, and it becomes impossible to correct aberrations produced in that portion of the image-forming optical system. If |Pxb/Px| is not larger than the lower limit, i.e. 0.01, the power in the X-axis direction of the part of the image-forming optical system that is closer to the image side than the stop becomes excessively weak. Consequently, it becomes impossible to reduce the overall size of the image-forming optical system.

It is more desirable to satisfy the following condition:

$$0.05 < |Pxb/Px| < 1.2 \quad (9\text{-}2)$$

By satisfying the condition (9-2), it is possible to obtain an image-forming optical system that is even more compact and corrected for various aberrations even more favorably.

In any of the first to fourteenth image-forming optical systems according to the present invention, it is desirable to satisfy the following condition:

$$0.01 < |Pyb/Py| < 2 \quad (10\text{-}1)$$

where Pyb is the power in the Y-axis direction of a part of the image-forming optical system that is closer to the image side than the stop.

If |Pyb/Py| is not smaller than the upper limit of the condition (10-1), i.e. 2, the power in the Y-axis direction of the part of the image-forming optical system that is closer to the image side than the stop becomes excessively strong, and it becomes impossible to correct aberrations produced in that portion of the image-forming optical system. If |Pyb/Py| is not larger than the lower limit, i.e. 0.01, the power in the Y-axis direction of the part of the image-forming optical system that is closer to the image side than the stop becomes excessively weak. Consequently, it becomes impossible to reduce the overall size of the image-forming optical system.

It is more desirable to satisfy the following condition:

$$0.05 < |Pyb/Py| < 1.2 \quad (10\text{-}2)$$

By satisfying the condition (10-2), it is possible to obtain an image-forming optical system that is even more compact and corrected for various aberrations even more favorably.

In any of the first to fourteenth image-forming optical systems according to the present invention, the refracting and reflecting surfaces of the image-forming optical system may be formed from spherical surfaces or rotationally symmetric aspherical surfaces.

In a case where any of the above-described image-forming optical systems according to the present invention is placed in an image pickup part of an image pickup apparatus, or in a case where the image pickup apparatus is a photographic apparatus having a camera mechanism, it is possible to adopt an arrangement in which a prism member provided in the front unit is placed closest to the object side among optical elements having an optical action, and the entrance surface of the prism member is decentered with respect to the optical axis, and further a cover member is placed on the object side of the prism member at right angles to the optical axis. The arrangement may also be such that the prism member provided in the front unit has on the object side thereof an entrance surface decentered with respect to the optical axis, and a cover lens having a power is placed on the object side of the entrance surface of the prism member in coaxial relation to the optical axis so as to face the entrance surface across an air spacing.

If a prism member is placed closest to the object side and a decentered entrance surface is provided on the front side of a photographic apparatus as stated above, the obliquely tilted entrance surface is seen from the subject, and it gives the illusion that the photographic center of the apparatus is deviated from the subject when the entrance surface is seen from the subject side. Therefore, a cover member or a cover lens is placed at right angles to the optical axis, thereby preventing the subject from feeling incongruous when seeing the entrance surface, and allowing the subject to be photographed with the same feeling as in the case of general photographic apparatus.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 10 of the image-forming optical system according to the present invention will be described below. It should be noted that constituent parameters of each example will be shown later.

Figure 1:
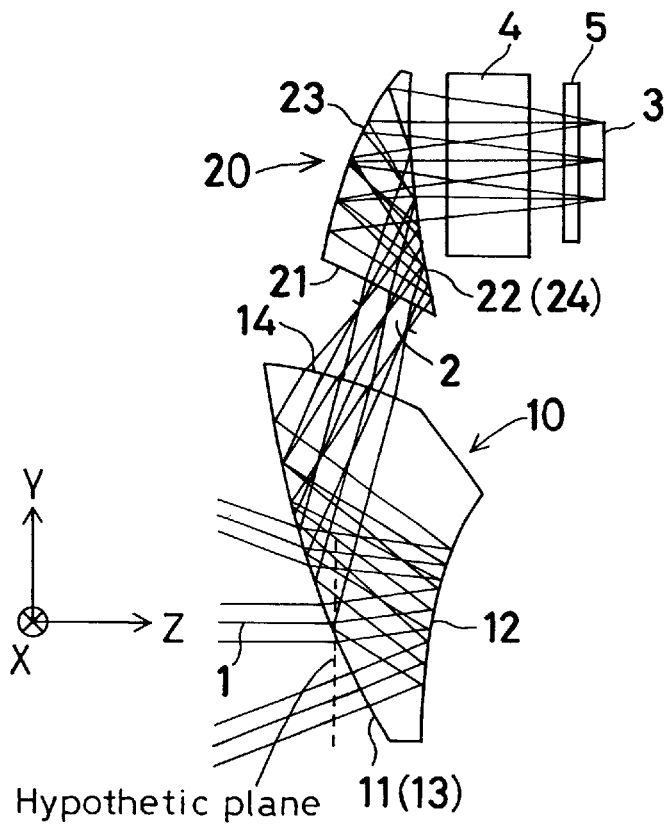
FIG. 1 is a sectional view of an image-forming optical system according to Example 1 of the present invention.

In each example, as shown in FIG. 1, the center of a specific surface of an optical system (in Example 1 shown in FIG. 1, the specific surface is each of the hypothetic plane of surface No. 1 and the stop plane of surface No. 6) is defined as the origin of a decentered optical system, and an axial principal ray 1 is defined by a ray emanating from the center of an object and passing through the center of a stop 2. A Z-axis is taken in the direction in which the axial principal ray 1 travels from the object center to the first surface of the optical system. A plane containing the Z-axis and the center of the image plane is defined as a YZ-plane. A Y-axis is taken in a direction perpendicularly intersecting the Z-axis in a plane in which rays are folded by the surfaces of the optical system. The direction in which the Z-axis extends from the object point toward the first surface of the optical system is defined as a positive direction of the Z-axis. The upward direction as viewed in FIG. 1 is defined as a positive direction of the Y-axis. An axis that constitutes a right-handed orthogonal coordinate system in combination with the Y- and Z-axes is defined as an X-axis.

In Example 1 to 10, decentration of each surface is made in the YZ-plane, and one and only one plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z = (y^2/R)/[1+\{1-(1+K)y^2/R^2\}^{1/2}]+Ay^4+By^6+Cy^8+Dy^{10}+ \quad (b)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (c). The Z-axis of the defining equation (c) is the axis of Zernike polynomial. A rotationally asymmetric surface is defined by polar coordinates of the height of the Z-axis with respect to the XY-plane. In the equation (c), A is the distance from the Z-axis in the XY-plane, and R is the azimuth angle about the Z-axis, which is expressed by the angle of rotation measured from the Z-axis.

$$\begin{aligned}
x &= R\cos(A) \\
y &= R\sin(A) \\
Z &= D_2 \\
&+D_3 R\cos(A) + D_4 R\sin(A) \\
&+D_5 R^2\cos(2A) + D_6(R^2-1) + D_7 R^2\sin(2A) \\
&+D_8 R^3\cos(3A) + D_9(3R^3-2R)\cos(A) \\
&\quad +D_{10}(3R^3-2R)\sin(A) + D_{11}R^3\sin(3A) \\
&+D_{12}R^4\cos(4A) + D_{13}(4R^4-3R^2)\cos(2A) \\
&\quad +D_{14}(6R^4-6R^2+1) + D_{15}(4R^4-3R^2)\sin(2A) \\
&\quad +D_{16}R^4\sin(4A) \\
&+D_{17}R^5\cos(5A) + D_{18}(5R^5-4R^3)\cos(3A) \\
&\quad +D_{19}(10R^5-12R^3+3R)\cos(A) \\
&\quad +D_{20}(10R^5-12R^3+3R)\sin(A) \\
&\quad +D_{21}(5R^5-4R^3)\sin(3A) + D_{22}R^5\sin(5A) \\
&+D_{23}R^6\cos(6A) + D_{24}(6R^6-5R^4)\cos(4A) \\
&\quad +D_{25}(15R^6-20R^4+6R^2)\cos(2A) \\
&\quad +D_{26}(20R^6-30R^4+12R^2-1) \\
&\quad +D_{27}(15R^6-20R^4+6R^2)\sin(2A) \\
&\quad +D_{29}(6R^6-5R^4)\sin(4A)+D^{29}R^6\sin(6A) \ldots \\
& \ldots (c)
\end{aligned}$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$. . . should be used.

Other examples of surfaces usable in the present invention are expressed by the following defining equation (d):

$$Z = \sum\sum C_{nm}XY$$

Assuming that k=7 (polynomial of degree 7), for example, a free-form surface is expressed by an expanded form of the above equation as follows:

$$\begin{aligned}
Z = &\ C_2 + C_3 y + C_4|x| + C_5 y^2 + C_6 y|x| + C_7 x^2 + C_8 y^3 + \quad (d) \\
&+ C_9 y^2|x| + C_{10} yx^2 + C_{11}|x^3| + C_{12} y^4 + C_{13} y^3|x| + \\
&+ C_{14} y^2 x^2 + C_{15} y|x^3| + C_{16} x^4 + C_{17} y^5 + C_{18} y^4|x| + \\
&+ C_{19} y^3 x^2 + C_{20} y^2|x^3| + C_{21} yx^4 + C_{22}|x^5| + C_{23} y^6 + \\
&+ C_{24} y^5|x| + C_{25} y^4 x^2 + C_{26} y^3|x^3| + C_{27} y^2 x^4 + C_{28} y|x^5| + \\
&+ C_{29} x^6 + C_{30} y^7 + C_{31} y^6|x| + C_{32} y^5 x^2 + C_{33} y^4|x^3| + \\
&+ C_{34} y^3 x^4 + C_{35} y^2|x^5| + C_{36} yx^6 + C_{37}|x^7|
\end{aligned}$$

Although in the examples of the present invention the surface configuration is expressed by a free-form surface using the above equation (a), it should be noted that the same advantageous effect can be obtained by using the above equation (c) or (d).

In Examples 1 to 9, it is assumed that an image pickup device of ⅓ inch size in which the image size is about 2.5×1.8 millimeters is used. In Example 10, it is assumed that an image pickup device of ⅕ inch size in which the image size is 1.69×1.28 millimeters is used. It should be noted that the present invention is also applicable to image pickup devices of other sizes. The present invention includes not only an image pickup optical system using the image-forming optical system according to the present invention but also an image pickup apparatus incorporating the optical system.

EXAMPLE 1

FIG. 1 is a sectional view of Example 1 taken along the YZ-plane containing the axial principal ray.

In Example 1, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Constituent parameters of this example will be shown later. In the constituent parameters, free-form surfaces are denoted by "FFS", and aspherical surfaces by "ASS". The same shall apply to the following Examples.

Example 1 has, in order in which light passes from the object side, a first prism 10, a stop 2, and a second prism 20. The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21 of negative power, a first reflecting surface 22 of negative power, a second reflecting surface 23 of positive power, and a second transmitting surface 24 of negative power. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is perpendicular to the Z-axis. It should be noted that a low-pass filter 4 formed from a plane-parallel plate and a cover glass 5 are placed between the second prism 20 and the image plane 3.

In this example, two prisms are placed in series in the Y-axis direction, thereby reducing the thickness in the Z-axis direction in particular.

EXAMPLE 2

Figure 2:
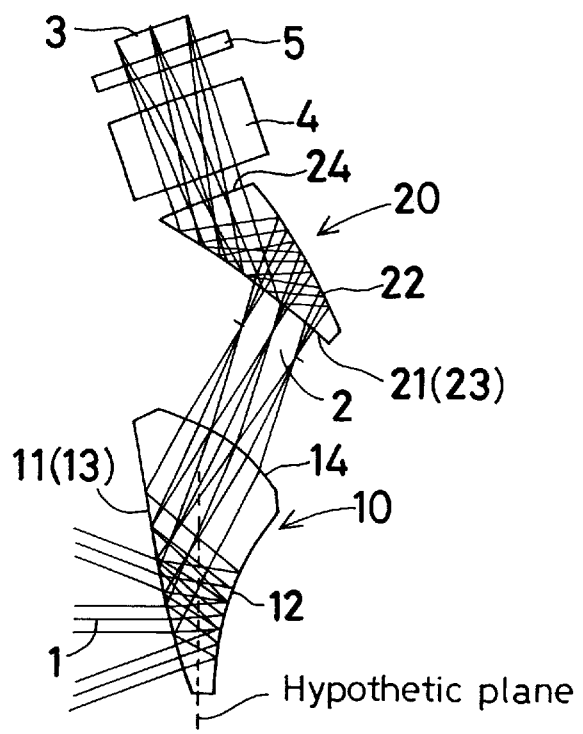
FIG. 2 is a sectional view of an image-forming optical system according to Example 2 of the present invention.

FIG. 2 is a sectional view of Example 2 taken along the YZ-plane containing the axial principal ray.

In Example 2, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Example 2 has, in order in which light passes from the object side, a first prism 10, a stop 2, and a second prism 20. The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21, a first reflecting surface 22 of positive power, a second reflecting surface 23, and a second transmitting surface 24. The first transmitting surface 11 and second reflecting surface 13 of the first prism 10 are the identical optical surface having both transmitting and reflecting actions, and the first transmitting surface 21 and second reflecting surface 23 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. It should be noted that a low-pass filter 4 formed from a plane-parallel plate and a cover glass 5 are placed between the second prism 20 and the image plane 3.

In this example, two prisms are placed in series in the Y-axis direction, thereby reducing the thickness in the Z-axis direction in particular as in the case of Example 1. The axial principal ray exiting from the final surface of the image-forming optical system also travels in the Y-axis direction.

EXAMPLE 3

Figure 3:
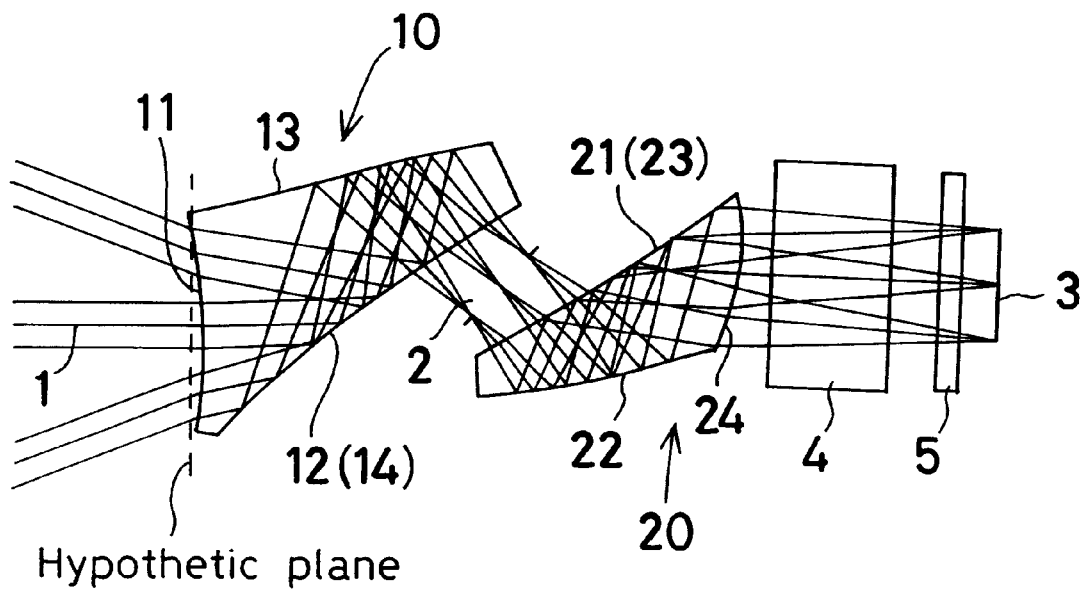
FIG. 3 is a sectional view of an image-forming optical system according to Example 3 of the present invention.

FIG. 3 is a sectional view of Example 3 taken along the YZ-plane containing the axial principal ray.

In Example 3, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Example 3 has, in order in which light passes from the object side, a first prism 10, a stop 2, and a second prism 20. The first prism 10 has a first transmitting surface 11 of negative power, a first reflecting surface 12 of negative power, a second reflecting surface 13, and a second transmitting surface 14. The second prism 20 has a first transmitting surface 21, a first reflecting surface 22 of positive power, a second reflecting surface 23 of negative power, and a second transmitting surface 24 of positive power. The first reflecting surface 12 and second transmitting surface 14 of the first prism 10 are the identical optical surface having both transmitting and reflecting actions, and the first transmitting surface 21 and second reflecting surface 23 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is approximately perpendicular to the Z-axis. It should be noted that a low-pass filter 4 formed from a plane-parallel plate and a cover glass 5 are placed between the second prism 20 and the image plane 3.

In this example, two prisms are placed in series in the Z-axis direction, and the optical path is folded, thereby enabling the image-forming optical system to become compact in size in both the Z- and Y-axis directions.

EXAMPLE 4

Figure 4:
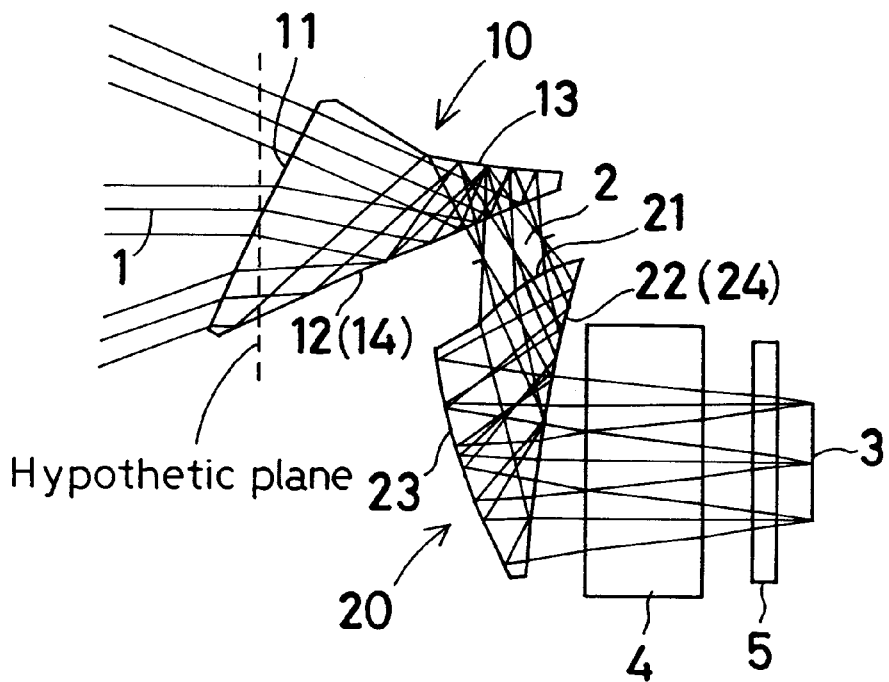
FIG. 4 is a sectional view of an image-forming optical system according to Example 4 of the present invention.

FIG. 4 is a sectional view of Example 4 taken along the YZ-plane containing the axial principal ray.

In Example 4, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Example 4 has, in order in which light passes from the object side, a first prism 10, a stop 2, and a second prism 20. The first prism 10 has a first transmitting surface 11, a first reflecting surface 12, a second reflecting surface 13 of negative power, and a second transmitting surface 14. The second prism 20 has a first transmitting surface 21 of positive power, a first reflecting surface 22 of negative power, a second reflecting surface 23 of positive power, and a second transmitting surface 24 of negative power. The first reflecting surface 12 and second transmitting surface 14 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is approximately perpendicular to the Z-axis. It should be noted that a low-pass filter 4 formed from a plane-parallel plate and a cover glass 5 are placed between the second prism 20 and the image plane 3.

In this example, incident rays traveling in the Z-axis direction are bent in the Y-axis direction by the first prism 10 and further bent in the Z-axis direction by the second prism 20. Thus, it is possible to make the image-forming optical system compact in size in both the Z- and Y-axis directions.

EXAMPLE 5

Figure 5:
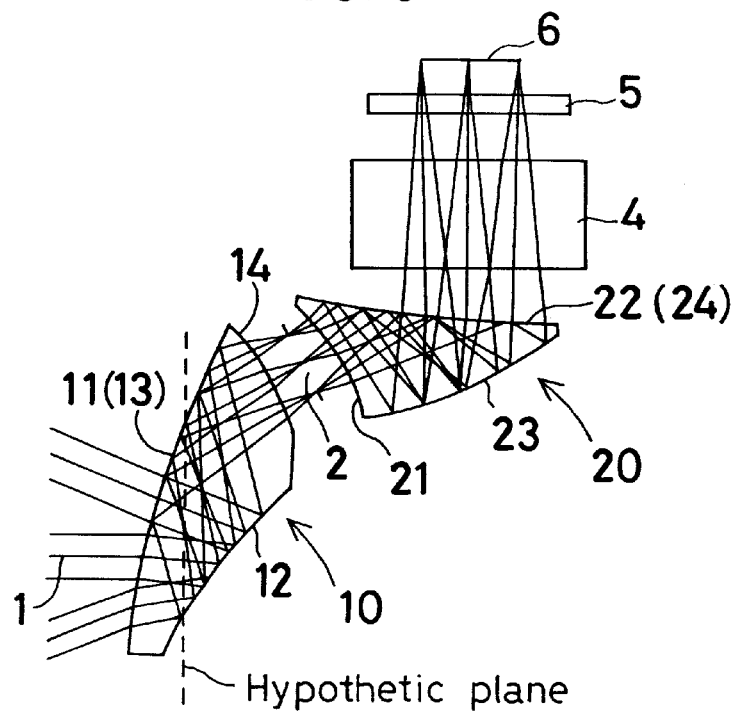
FIG. 5 is a sectional view of an image-forming optical system according to Example 5 of the present invention.

FIG. 5 is a sectional view of Example 5 taken along the YZ-plane containing the axial principal ray.

In Example 5, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Example 5 has, in order in which light passes from the object side, a first prism 10, a stop 2, and a second prism 20. The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21 of negative power, a first reflecting surface 22 of negative power, a second reflecting surface 23 of positive power, and a second transmitting surface 24 of negative power. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is approximately perpendicular to the Y-axis. It should be noted that a low-pass filter 4 formed from a plane-parallel plate and a cover glass 5 are placed between the second prism 20 and the image plane 3.

In this example, incident rays traveling in the Z-axis direction are bent in the Y-axis direction and then bent in the Z-axis direction by the first prism 10. The rays are further bent in the Y-axis direction by the second prism 20. Thus, it is possible to make the image-forming optical system compact in size in both the Z- and Y-axis directions.

EXAMPLE 6

Figure 6:
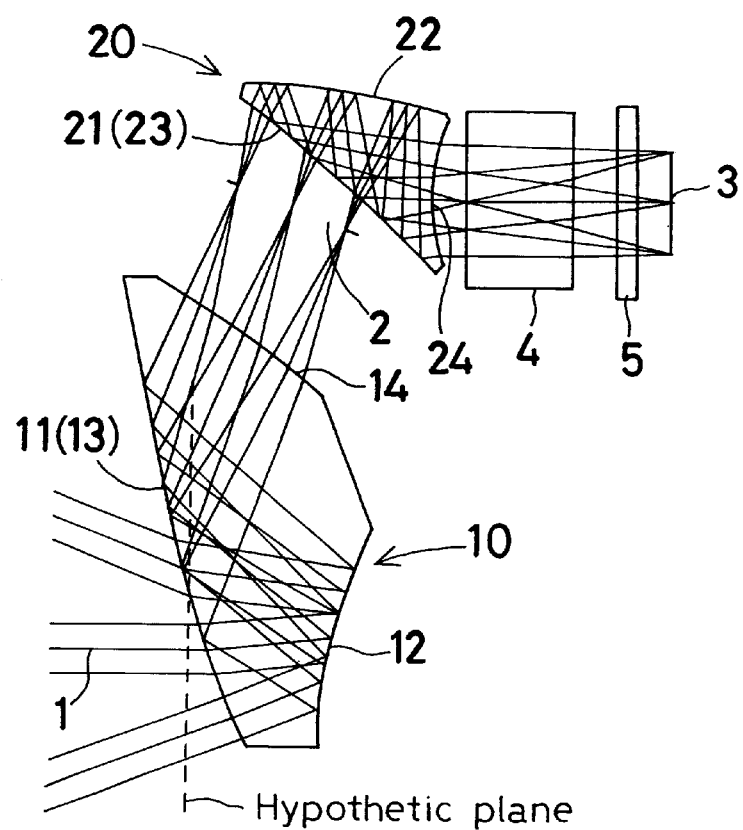
FIG. 6 is a sectional view of an image-forming optical system according to Example 6 of the present invention.

FIG. 6 is a sectional view of Example 6 taken along the YZ-plane containing the axial principal ray.

In Example 6, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Example 6 has, in order in which light passes from the object side, a first prism 10, a stop 2, and a second prism 20. The first prism 10 has a first transmitting surface 11 of positive power, a first reflecting surface 12 of negative power, a second reflecting surface 13, and a second transmitting surface 14. The second prism 20 has a first transmitting surface 21, a first reflecting surface 22 of positive power, a second reflecting surface 23, and a second transmitting surface 24 of negative power. The first transmitting surface 11 and second reflecting surface 13 of the first prism 10 are the identical optical surface having both transmitting and reflecting actions, and the first transmitting surface 21 and second reflecting surface 23 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is approximately perpendicular to the Z-axis. It should be noted that a low-pass filter 4 formed from a plane-parallel plate and a cover glass 5 are placed between the second prism 20 and the image plane 3.

In this example, incident rays traveling in the Z-axis direction are bent in the Y-axis direction by the first prism 10 and further bent in the Z-axis direction by the second prism 20. Thus, it is possible to make the image-forming optical system compact in size in both the Z- and Y-axis directions.

EXAMPLE 7

Figure 7:
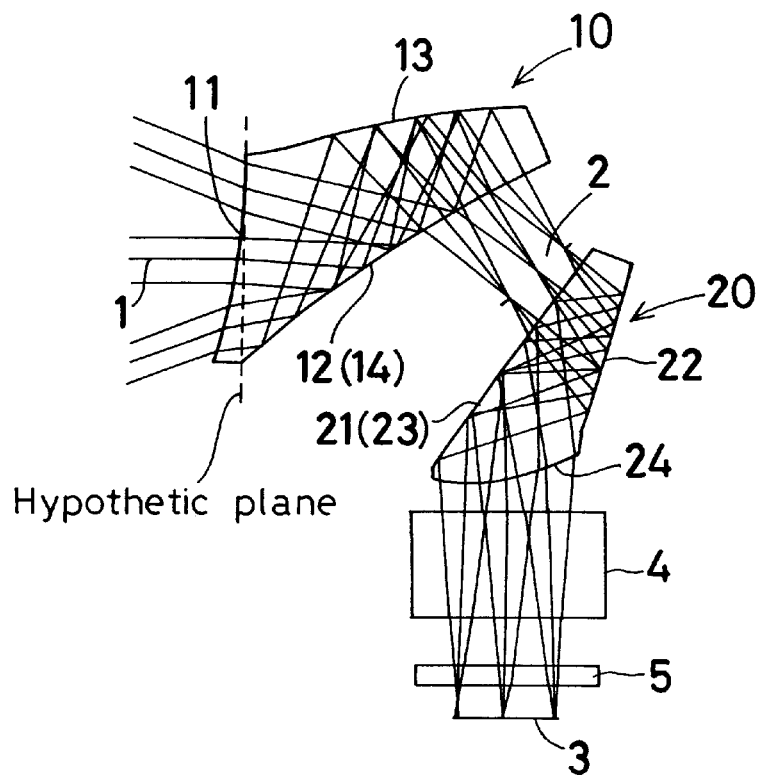
FIG. 7 is a sectional view of an image-forming optical system according to Example 7 of the present invention.

FIG. 7 is a sectional view of Example 7 taken along the YZ-plane containing the axial principal ray.

In Example 7, the horizontal half field angle is 26.1 degrees, and the vertical half field angle is 20.2 degrees. The entrance pupil diameter is 1.78 millimeters. The image pickup device size is 2.45'1.84 millimeters. The focal length is equivalent to 5 millimeters in terms of the focal length of a rotationally symmetric optical system.

Example 7 has, in order in which light passes from the object side, a first prism 10, a stop 2, and a second prism 20. The first prism 10 has a first transmitting surface 11 of negative power, a first reflecting surface 12 of negative power, a second reflecting surface 13 of positive power, and a second transmitting surface 14. The second prism 20 has a first transmitting surface 21, a first reflecting surface 22, a second reflecting surface 23, and a second transmitting surface 24 of positive power. The first reflecting surface 12 and second transmitting surface 14 of the first prism 10 are the identical optical surface having both transmitting and reflecting actions, and the first transmitting surface 21 and second reflecting surface 23 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is approximately perpendicular to the Y-axis. It should be noted that a low-pass filter 4 formed from a plane-parallel plate and a cover glass 5 are placed between the second prism 20 and the image plane 3.

In this example, incident rays traveling in the Z-axis direction are bent in a direction oblique to the Y-axis direction by the first prism 10 and further bent in the Y-axis direction by the second prism 20. Thus, it is possible to make the image-forming optical system compact in size in both the Z- and Y-axis directions.

EXAMPLE 8

Figure 8:
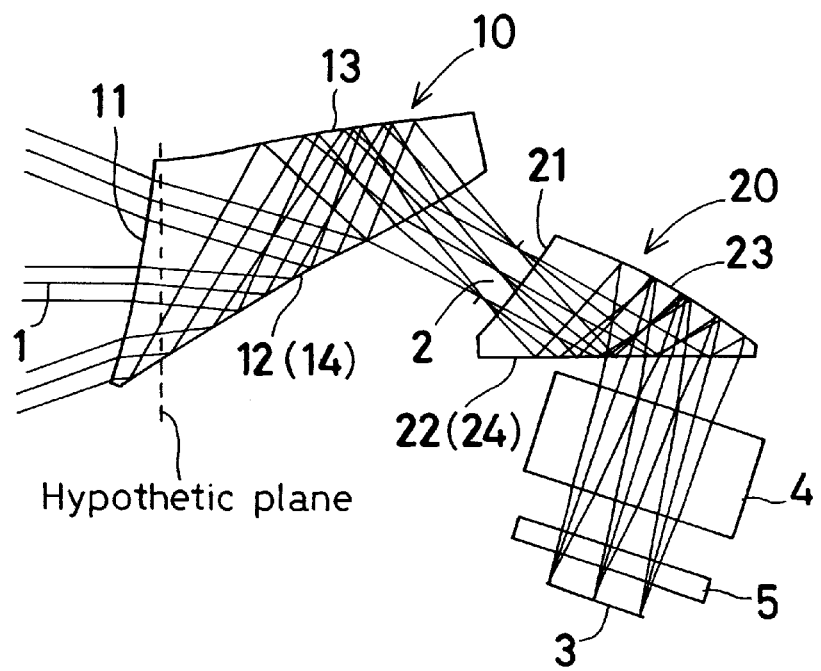
FIG. 8 is a sectional view of an image-forming optical system according to Example 8 of the present invention.

FIG. 8 is a sectional view of Example 8 taken along the YZ-plane containing the axial principal ray.

In Example 8, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Example 8 has, in order in which light passes from the object side, a first prism 10, a stop 2, and a second prism 20. The first prism 10 has a first transmitting surface 11 of negative power, a first reflecting surface 12, a second reflecting surface 13, and a second transmitting surface 14.

The second prism 20 has a first transmitting surface 21, a first reflecting surface 22, a second reflecting surface 23 of positive power, and a second transmitting surface 24. The first reflecting surface 12 and second transmitting surface 14 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. It should be noted that a low-pass filter 4 formed from a plane-parallel plate and a cover glass 5 are placed between the second prism 20 and the image plane 3.

In this example, two prisms are placed in series in the Z-axis direction, thereby making it possible to reduce the thickness in the Y-axis direction. It should be noted that the image plane 3 is approximately perpendicular to the Y-axis direction.

EXAMPLE 9

Figure 9:
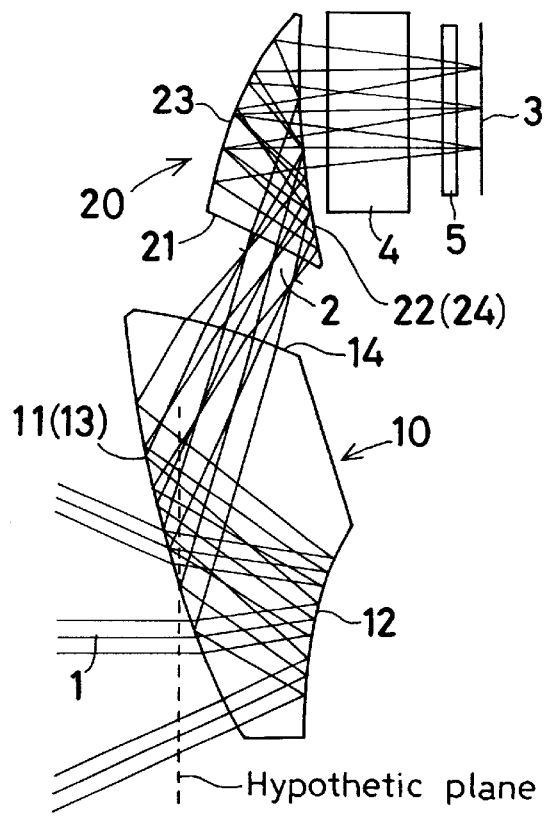
FIG. 9 is a sectional view of an image-forming optical system according to Example 9 of the present invention.

FIG. 9 is a sectional view of Example 9 taken along the YZ-plane containing the axial principal ray.

In Example 9, the horizontal half field angle is 32.7 degrees, and the vertical half field angle is 23.2 degrees. The entrance pupil diameter is 1.54 millimeters. The image pickup device size is 2.45×1.84 millimeters. The focal length is equivalent to 4.3 millimeters in terms of the focal length of a rotationally symmetric optical system.

Example 9 has, in order in which light passes from the object side, a first prism 10, a stop 2, and a second prism 20. The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21, a first reflecting surface 22 of negative power, a second reflecting surface 23 of positive power, and a second transmitting surface 24 of negative power. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is perpendicular to the Z-axis. It should be noted that a low-pass filter 4 formed from a plane-parallel plate and a cover glass 5 are placed between the second prism 20 and the image plane 3.

In this example, two prisms are placed in series in the Y-axis direction, thereby reducing the thickness in the Z-axis direction in particular.

EXAMPLE 10

Figure 10:
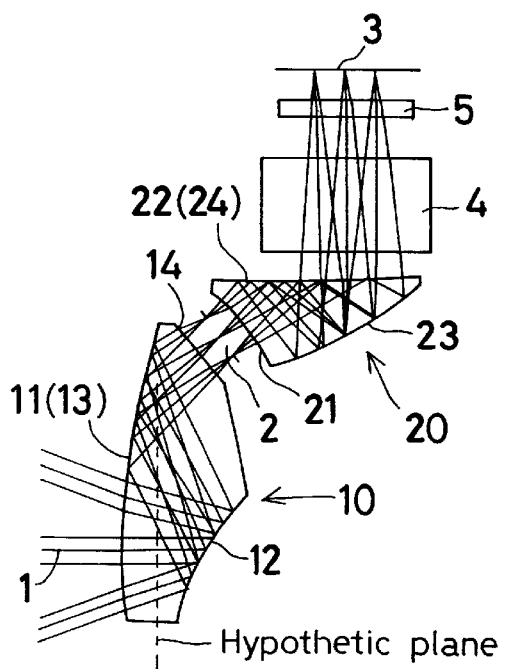
FIG. 10 is a sectional view of an image-forming optical system according to Example 10 of the present invention.
Figure 11:
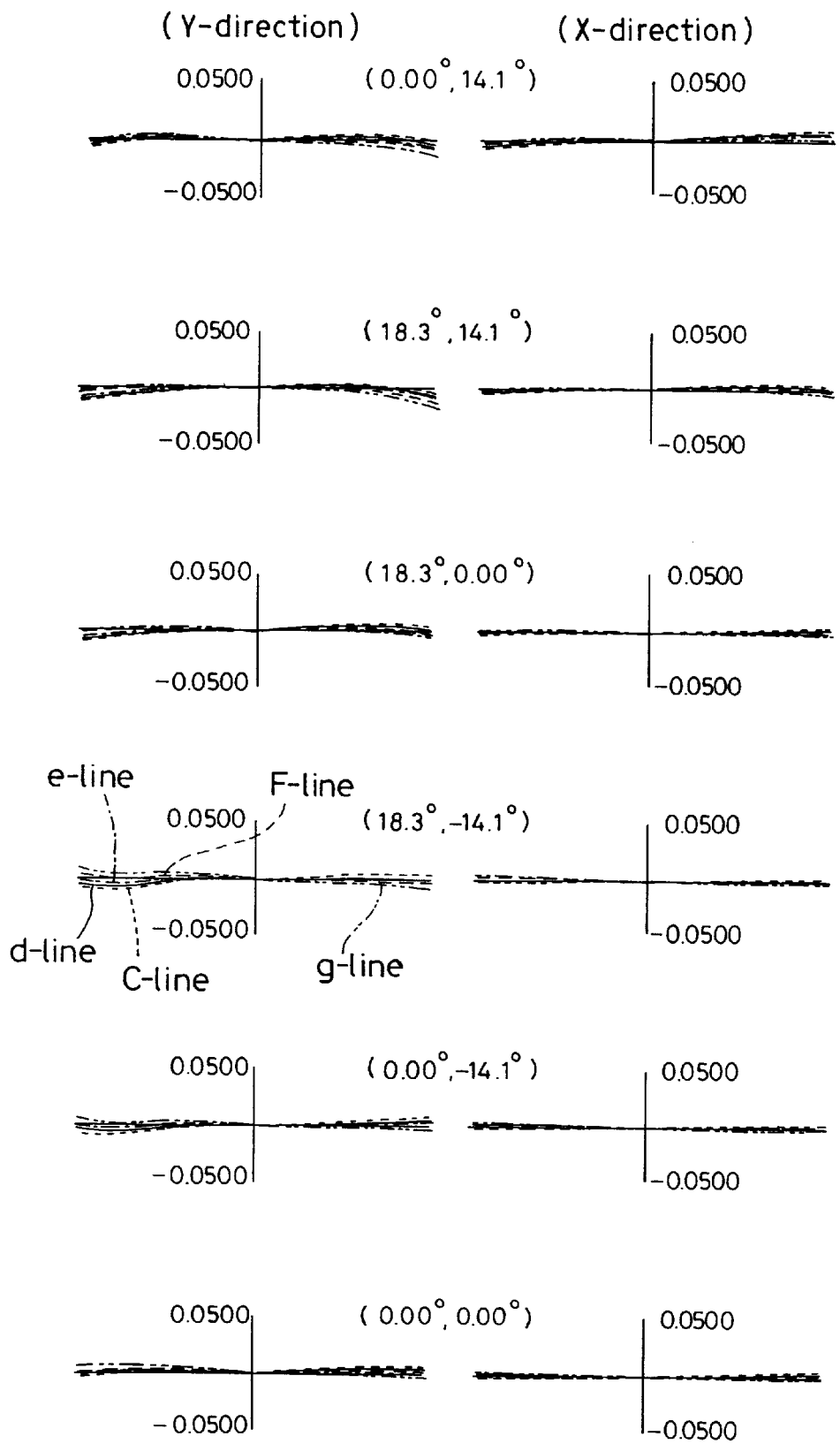
FIG. 11 is an aberrational diagram showing lateral aberrations in the image-forming optical system according to Example 1.
Figure 12:
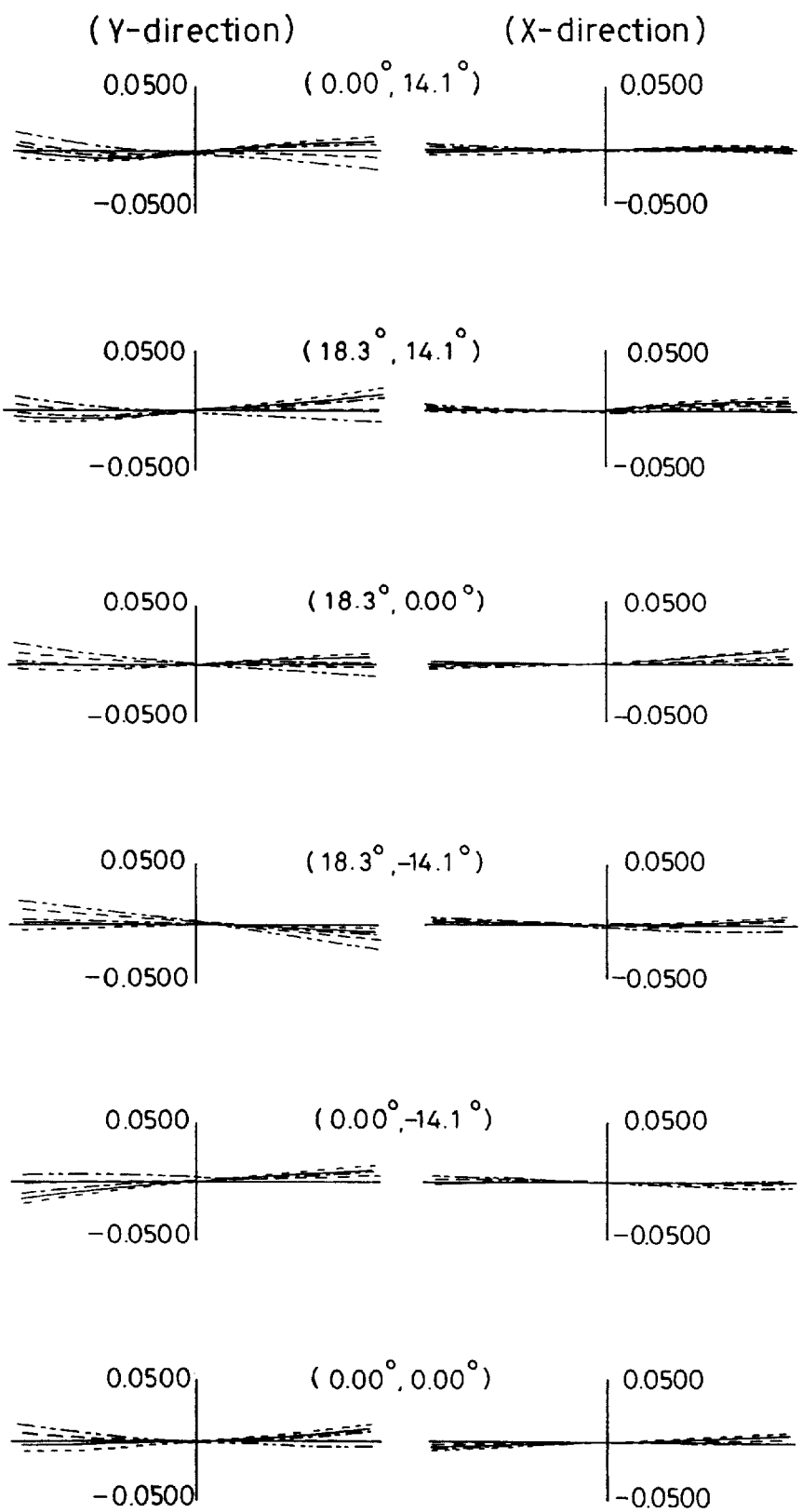
FIG. 12 is an aberrational diagram showing lateral aberrations in the image-forming optical system according to Example 2.
Figure 13:
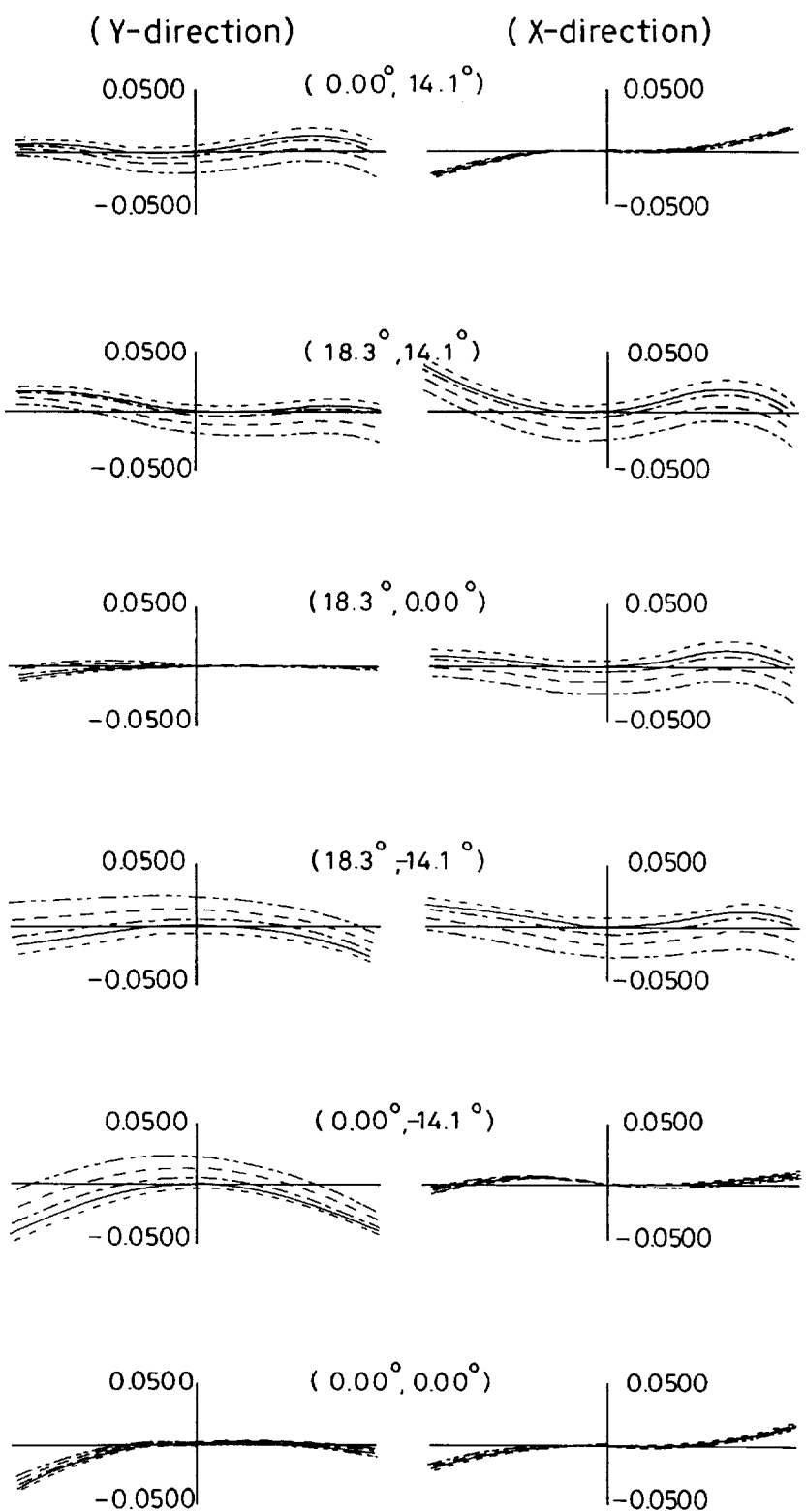
FIG. 13 is an aberrational diagram showing lateral aberrations in the image-forming optical system according to Example 3.
Figure 14:
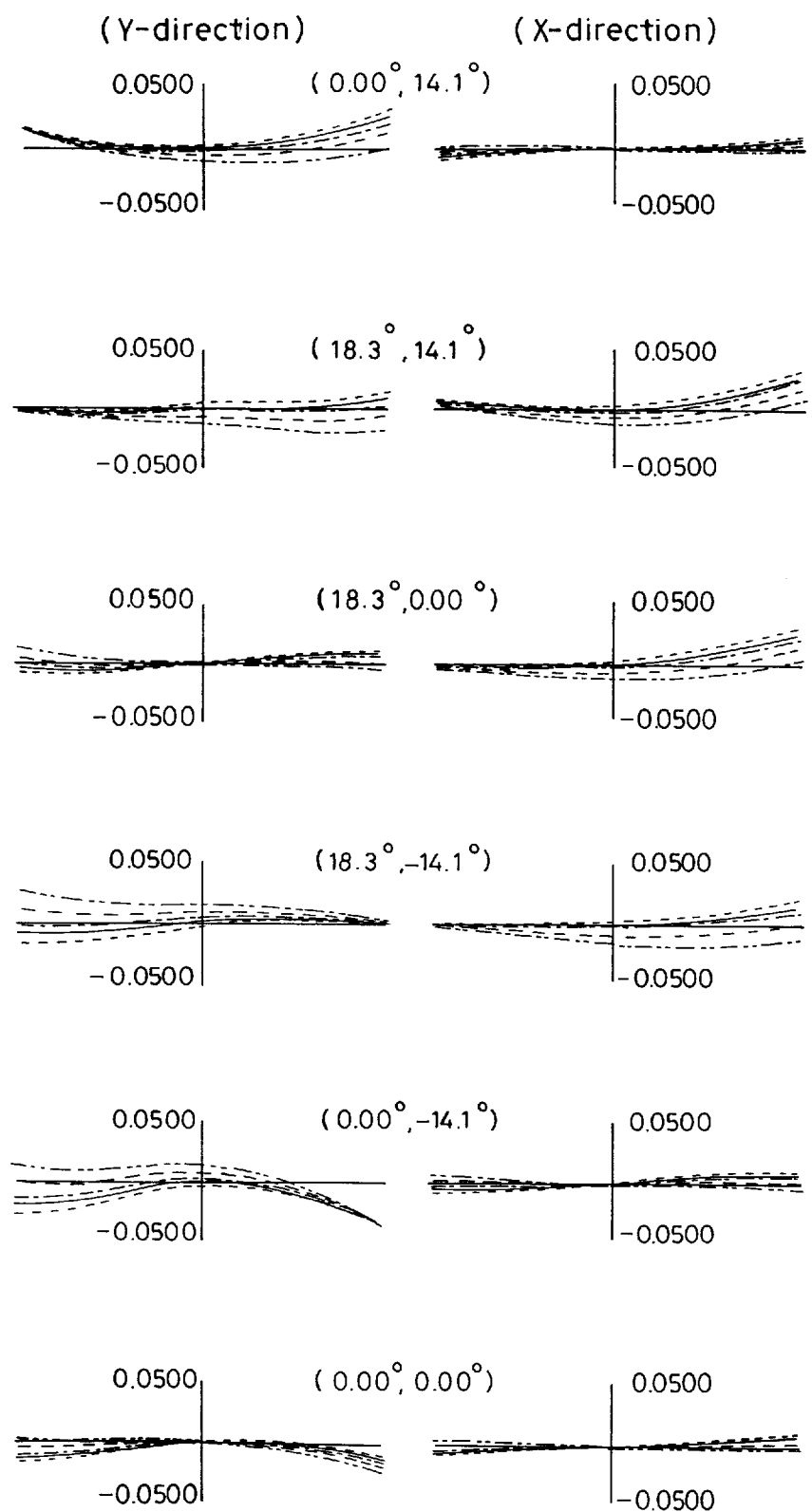
FIG. 14 is an aberrational diagram showing lateral aberrations in the image-forming optical system according to Example 4.
Figure 15:
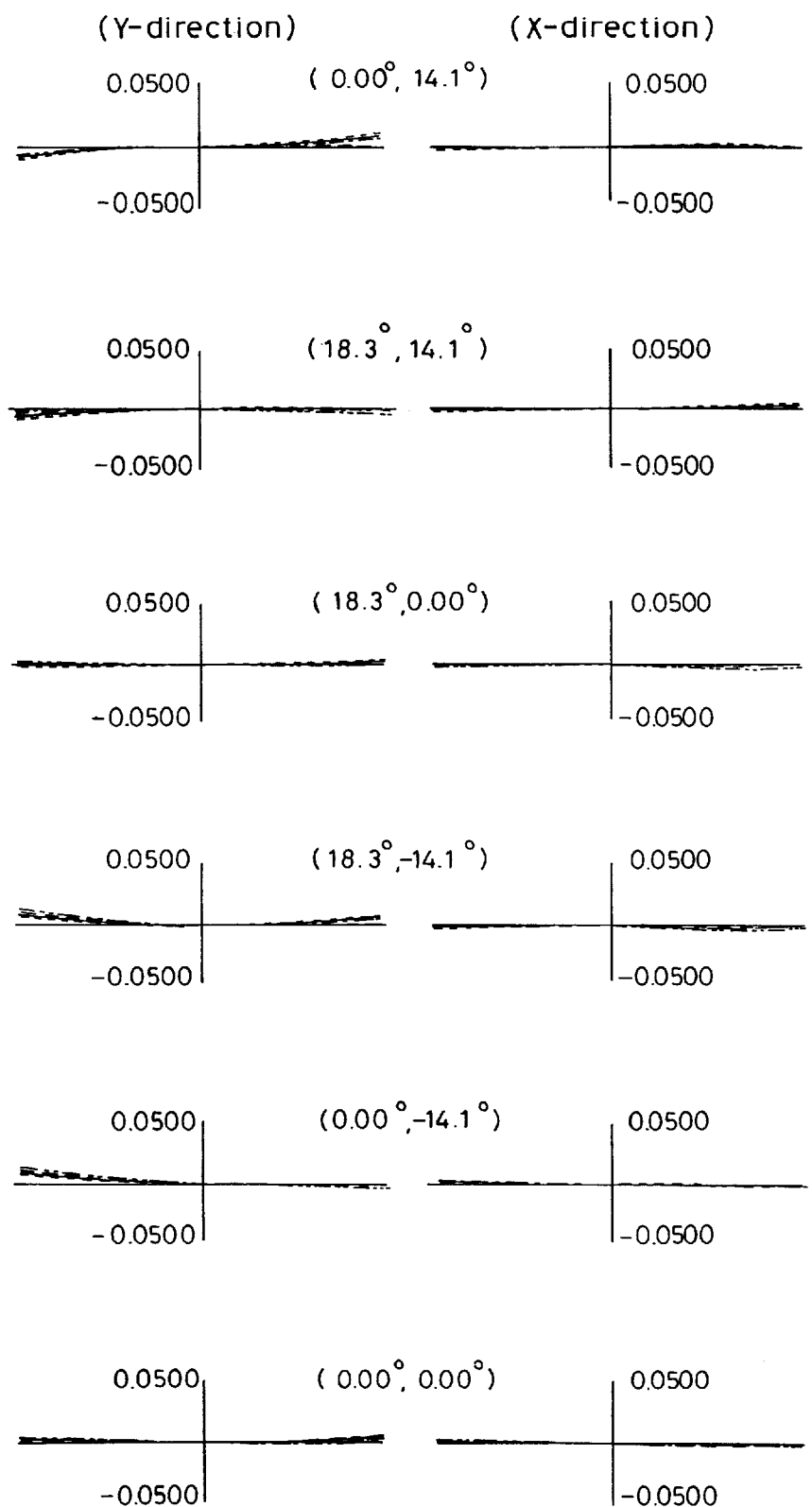
FIG. 15 is an aberrational diagram showing lateral aberrations in the image-forming optical system according to Example 5.
Figure 16:
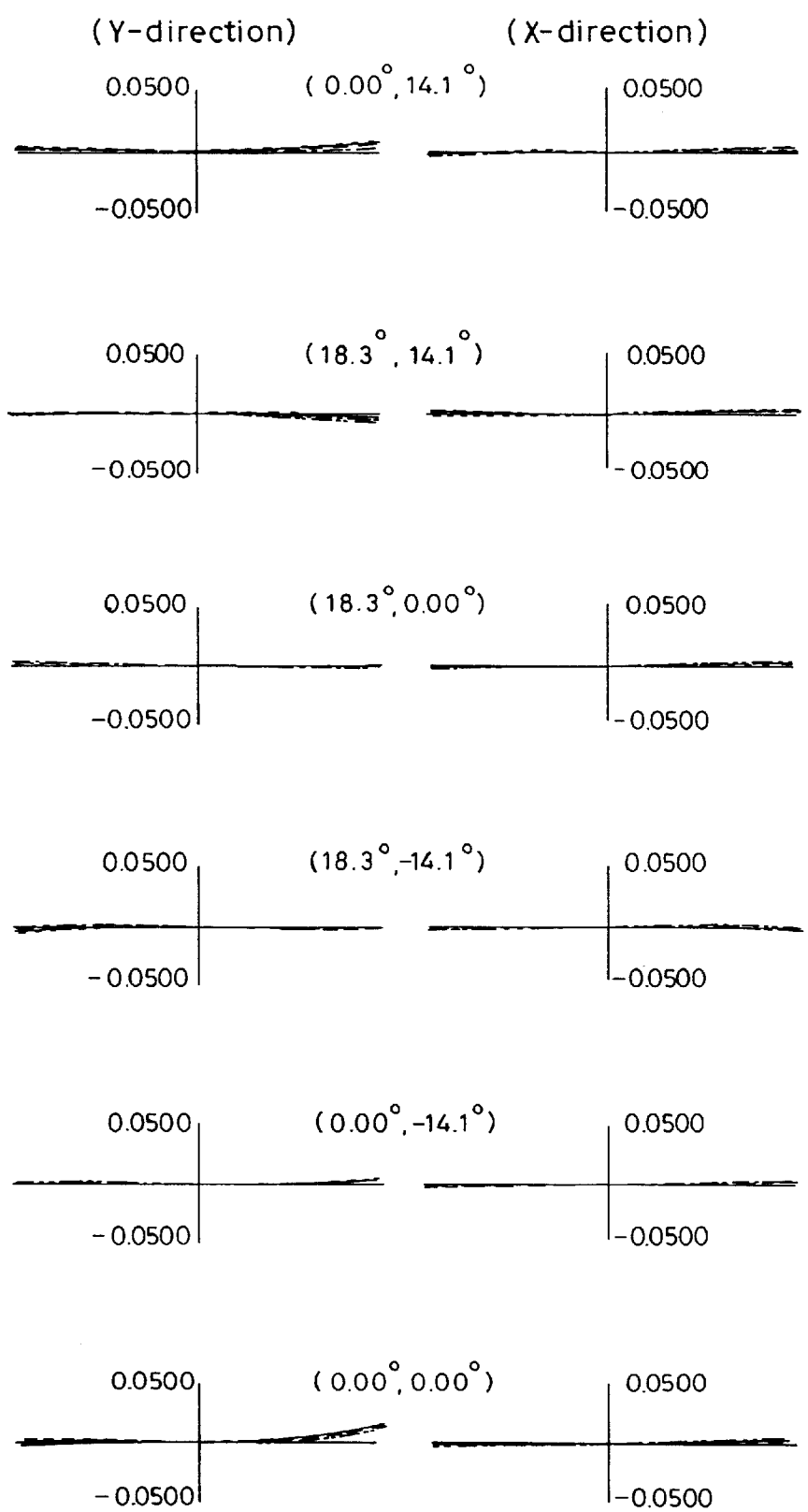
FIG. 16 is an aberrational diagram showing lateral aberrations in the image-forming optical system according to Example 6.
Figure 17:
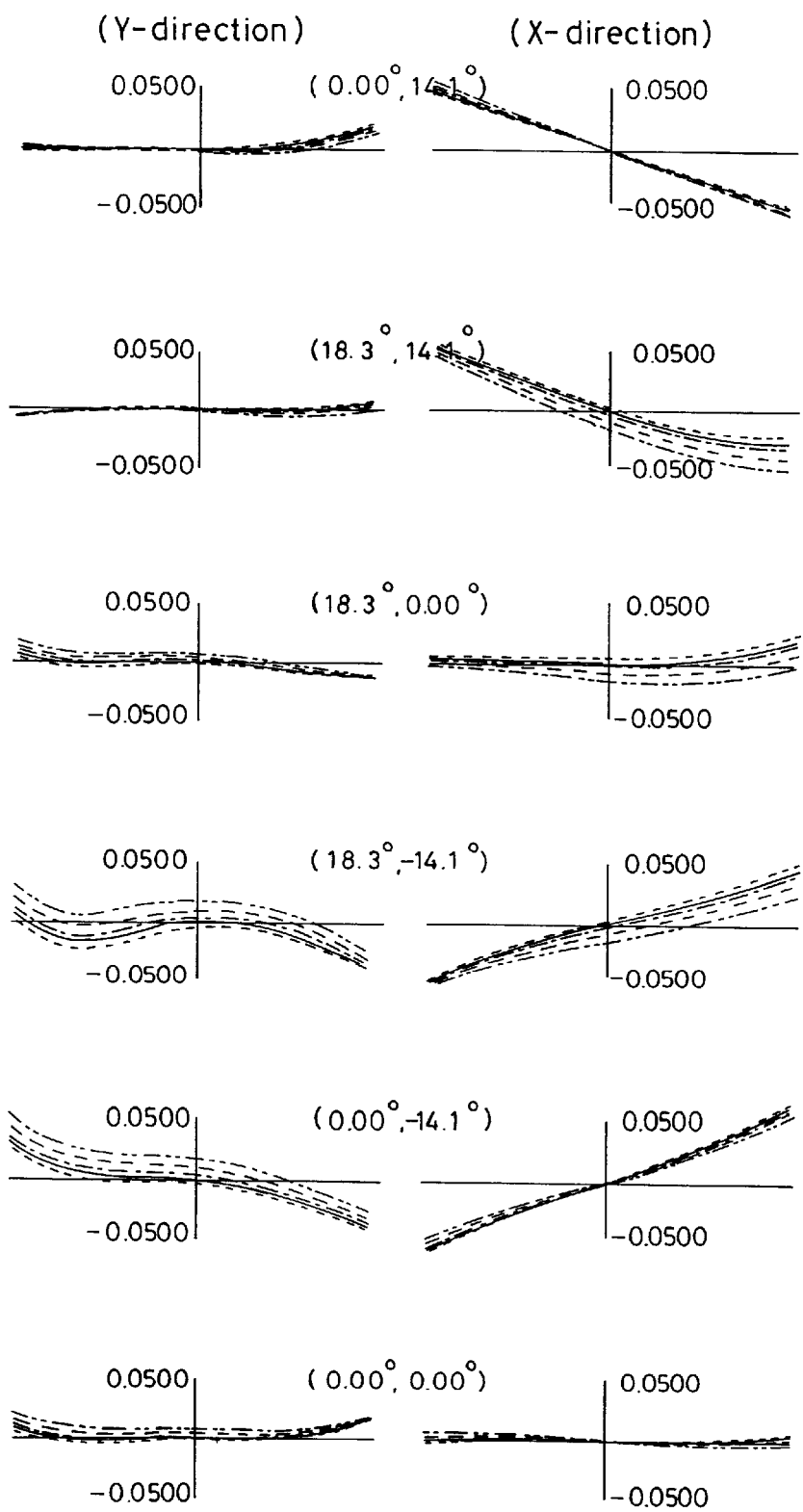
FIG. 17 is an aberrational diagram showing lateral aberrations in the image-forming optical system according to Example 7.
Figure 18:
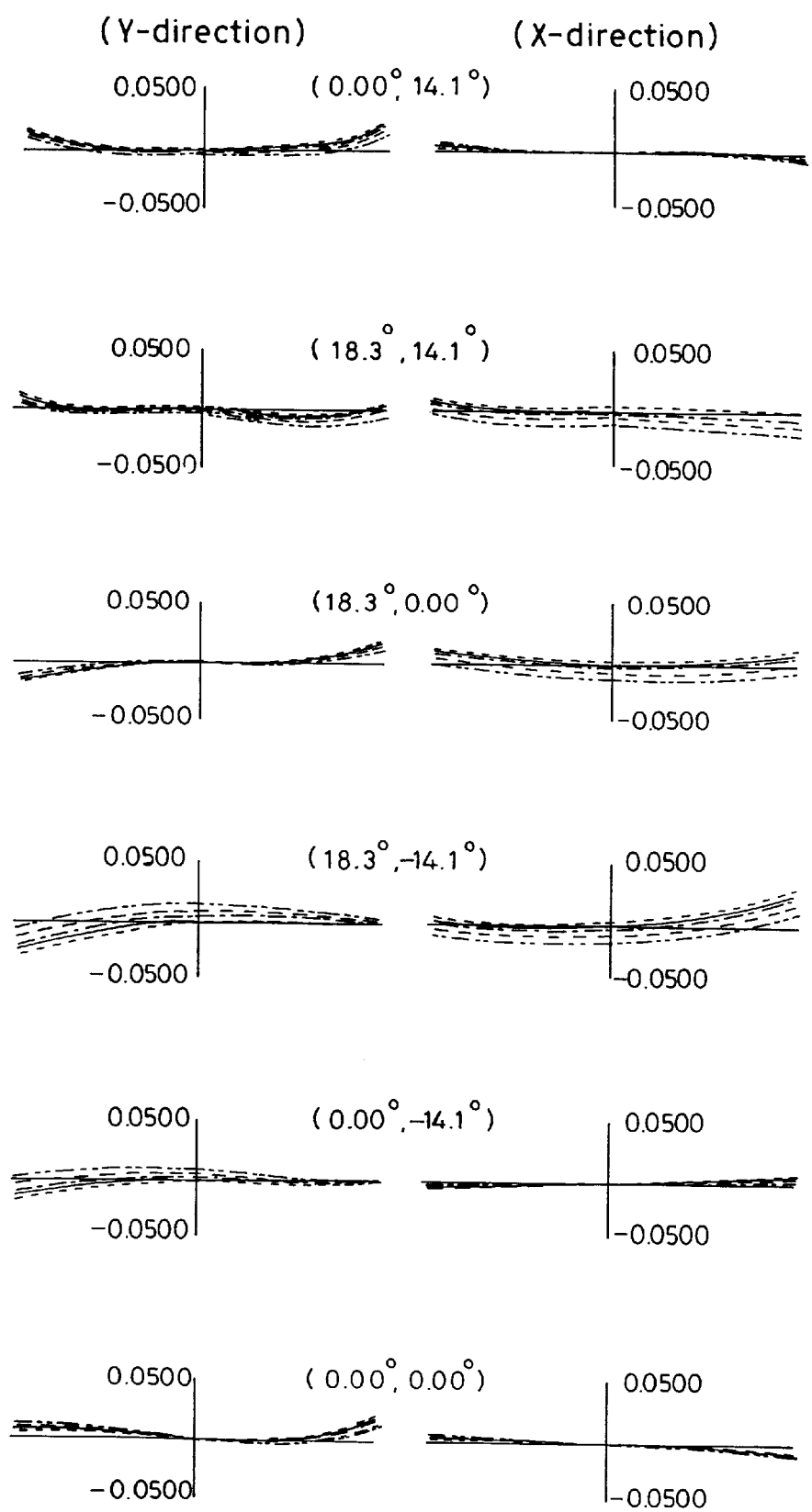
FIG. 18 is an aberrational diagram showing lateral aberrations in the image-forming optical system according to Example 8.
Figure 19:
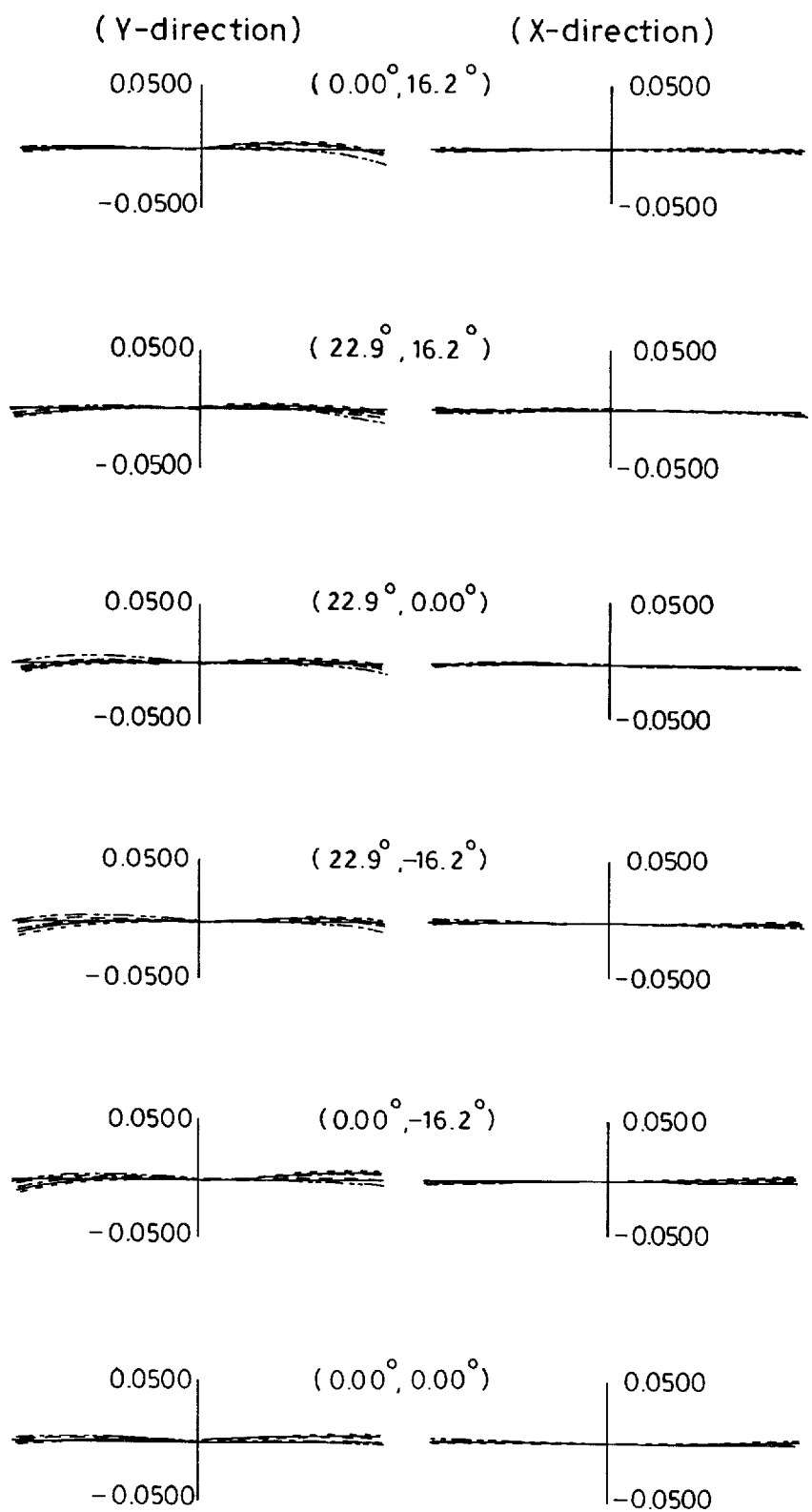
FIG. 19 is an aberrational diagram showing lateral aberrations in the image-forming optical system according to Example 9.
Figure 20:
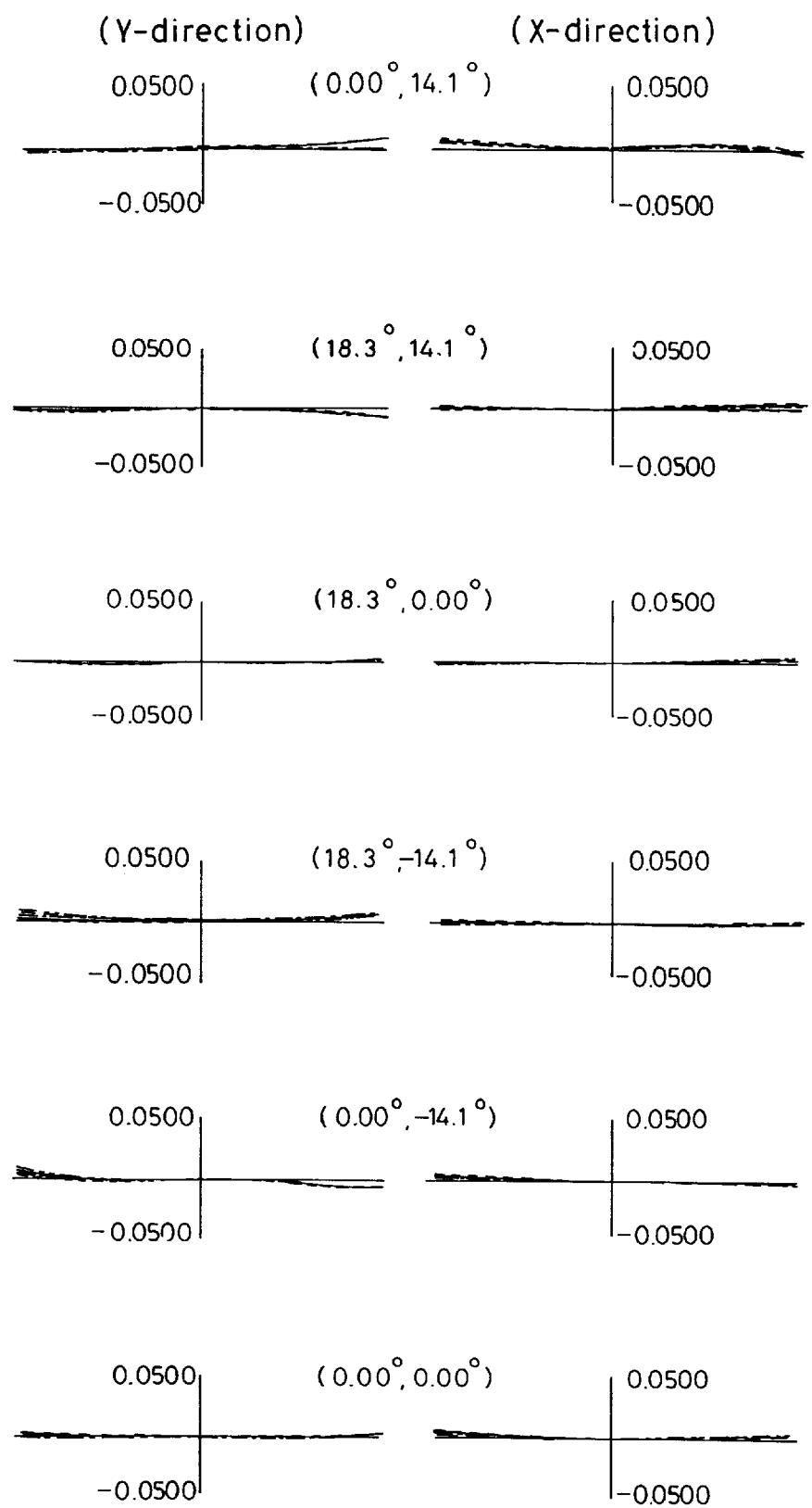
FIG. 20 is an aberrational diagram showing lateral aberrations in the image-forming optical system according to Example 10.

FIG. 10 is a sectional view of Example 10 taken along the YZ-plane containing the axial principal ray.

In Example 10, the horizontal half field angle is 26.1 degrees, and the vertical half field angle is 20.2 degrees. The entrance pupil diameter is 1.24 millimeters. The image pickup device size is 1.69×1.28 millimeters. The focal length is equivalent to 3.5 millimeters in terms of the focal length of a rotationally symmetric optical system.

Example 10 has, in order in which light passes from the object side, a first prism 10, a stop 2, and a second prism 20. The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21 of negative power, a first reflecting surface 22 of negative power, a second reflecting surface 23 of positive power, and a second transmitting surface 24 of negative power. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is approximately perpendicular to the Y-axis. It should be noted that a low-pass filter 4 formed from a plane-parallel plate and a cover glass 5 are placed between the second prism 20 and the image plane 3.

In this example, incident rays traveling in the Z-axis direction are bent in the Y-axis direction and then bent in the Z-axis direction by the first prism 10. The rays are further bent in the Y-axis direction by the second prism 20. Thus, it is possible to make the image-forming optical system compact in size in both the Z- and Y-axis directions.

Constituent parameters in the foregoing Examples 1 to 10 are shown below. In each table below: "OBJ" denotes an object plane; "IMG" denotes an image plane; "STO" denotes a stop plane; "REF" denotes a reflecting surface; "RP" denotes a decentration reference plane; "HP" denotes a hypothetic plane; "FFS" denotes a free-form surface; and "ASS" denotes an aspherical surface.

EXAMPLE 1

| Surface No. | Radius of curvature | Surface separation | Displacement and tilt | Refractive index | Abbe's No. |
|---|---|---|---|---|---|
| OBJ | ∞ | ∞ | | | |
| 1 | ∞ (HP) | | | (RP1) | |
| 2 | FFS① | | (1) | 1.4924 | 57.6 |
| 3 | FFS② (REF) | | (2) | 1.4924 | 57.6 |
| 4 | FFS① (REF) | | (1) | 1.4924 | 57.6 |
| 5 | ASS① | | (3) | | |
| 6 | ∞ (STO) | | (4) | (RP2) | |
| 7 | ASS② | | (5) | 1.4924 | 57.6 |
| 8 | FFS③ (REF) | | (6) | 1.4924 | 57.6 |
| 9 | FFS④ (REF) | | (7) | 1.4924 | 57.6 |
| 10 | FFS③ | | (6) | | |
| 11 | ∞ | 3.92 | (8) | 1.5163 | 64.1 |
| 12 | ∞ | 1.60 | | | |
| 13 | ∞ | 0.75 | | 1.4875 | 70.2 |
| 14 | ∞ | 1.21 | | | |
| IMG | ∞ | | | | |

ASS①
R    −16.57
K    0.0000

-continued

| | | | | | |
|---|---|---|---|---|---|
| A | $4.7848 \times 10^{-4}$ | | | | |
| B | $-1.2546 \times 10^{-5}$ | | | | |
| C | $8.7139 \times 10^{-7}$ | | | | |
| D | $-3.1595 \times 10^{-8}$ | | | | |
| | ASS② | | | | |
| R | $-26.91$ | | | | |
| K | $0.0000$ | | | | |
| A | $1.8212 \times 10^{-4}$ | | | | |
| B | $2.1260 \times 10^{-4}$ | | | | |
| C | $-6.0489 \times 10^{-5}$ | | | | |
| D | $8.6951 \times 10^{-6}$ | | | | |
| | FFS① | | | | |
| $C_4$ | $1.2969 \times 10^{-2}$ | $C_6$ | $7.4440 \times 10^{-3}$ | $C_8$ | $-2.8015 \times 10^{-4}$ |
| $C_{10}$ | $-5.3403 \times 10^{-5}$ | $C_{11}$ | $-2.4805 \times 10^{-5}$ | $C_{13}$ | $7.1755 \times 10^{-6}$ |
| $C_{15}$ | $1.6393 \times 10^{-5}$ | $C_{17}$ | $1.2560 \times 10^{-5}$ | $C_{19}$ | $-2.2063 \times 10^{-6}$ |
| $C_{21}$ | $2.8097 \times 10^{-7}$ | | | | |
| | FFS② | | | | |
| $C_4$ | $1.9940 \times 10^{-2}$ | $C_6$ | $2.0506 \times 10^{-2}$ | $C_8$ | $-3.5141 \times 10^{-4}$ |
| $C_{10}$ | $6.4395 \times 10^{-6}$ | $C_{11}$ | $-7.9063 \times 10^{-5}$ | $C_{13}$ | $-3.5554 \times 10^{-5}$ |
| $C_{15}$ | $1.2976 \times 10^{-4}$ | $C_{17}$ | $1.6268 \times 10^{-5}$ | $C_{19}$ | $-1.1310 \times 10^{-5}$ |
| $C_{21}$ | $1.9381 \times 10^{-6}$ | | | | |
| | FFS③ | | | | |
| $C_4$ | $2.8632 \times 10^{-2}$ | $C_6$ | $9.9752 \times 10^{-3}$ | $C_8$ | $-8.5106 \times 10^{-4}$ |
| $C_{10}$ | $1.6730 \times 10^{-4}$ | $C_{11}$ | $-5.1246 \times 10^{-6}$ | $C_{13}$ | $-1.3585 \times 10^{-4}$ |
| $C_{15}$ | $5.7836 \times 10^{-5}$ | $C_{17}$ | $2.4460 \times 10^{-5}$ | $C_{19}$ | $1.1167 \times 10^{-5}$ |
| $C_{21}$ | $-5.9178 \times 10^{-6}$ | | | | |
| | FFS④ | | | | |
| $C_4$ | $3.5073 \times 10^{-2}$ | $C_6$ | $2.7484 \times 10^{-2}$ | $C_8$ | $1.5358 \times 10^{-4}$ |
| $C_{10}$ | $4.3563 \times 10^{-4}$ | $C_{11}$ | $4.4102 \times 10^{-5}$ | $C_{13}$ | $-5.4020 \times 10^{-6}$ |
| $C_{15}$ | $8.0934 \times 10^{-5}$ | $C_{17}$ | $6.8142 \times 10^{-6}$ | $C_{19}$ | $4.6422 \times 10^{-6}$ |
| $C_{21}$ | $5.4809 \times 10^{-6}$ | | | | |

Displacement and tilt(1)

| X | 0.00 | Y | 5.18 | Z | -1.67 |
|---|---|---|---|---|---|
| α | 16.00 | β | 0.00 | γ | 0.00 |

Displacement and tilt(2)

| X | 0.00 | Y | 0.62 | Z | 4.95 |
|---|---|---|---|---|---|
| α | -13.62 | β | 0.00 | γ | 0.00 |

Displacement and tilt(3)

| X | 0.00 | Y | 11.30 | Z | 1.08 |
|---|---|---|---|---|---|
| α | 72.61 | β | 0.00 | γ | 0.00 |

Displacement and tilt(4)

| X | 0.00 | Y | 14.45 | Z | 2.57 |
|---|---|---|---|---|---|
| α | 63.36 | β | 0.00 | γ | 0.00 |

Displacement and tilt(5)

| X | 0.00 | Y | 0.40 | Z | 1.02 |
|---|---|---|---|---|---|
| α | 0.75 | β | 0.00 | γ | 0.00 |

Displacement and tilt(6)

| X | 0.00 | Y | 0.00 | Z | 3.84 |
|---|---|---|---|---|---|
| α | -53.99 | β | 0.00 | γ | 0.00 |

Displacement and tilt(7)

| X | 0.00 | Y | 4.78 | Z | 5.39 |
|---|---|---|---|---|---|
| α | -84.91 | β | 0.00 | γ | 0.00 |

Displacement and tilt(8)

| X | 0.00 | Y | 0.54 | Z | 7.60 |
|---|---|---|---|---|---|
| α | -63.36 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| OBJ | ∞ | ∞ | | | |
| 1 | ∞ (HP) | | | (RP1) | |
| 2 | FFS① | | (1) | 1.4924 | 57.6 |
| 3 | FFS② (REF) | | (2) | 1.4924 | 57.6 |

-continued

| 4 | FFS① (REF) | | (1) | 1.4924 | 57.6 |
|---|---|---|---|---|---|
| 5 | -9.52 | | (3) | | |
| 6 | ∞ (STO) | | (4) | (RP2) | |
| 7 | FFS③ | | (5) | 1.4924 | 57.6 |
| 8 | FFS④ (REF) | | (6) | 1.4924 | 57.6 |
| 9 | FFS③ (REF) | | (7) | 1.4924 | 57.6 |
| 10 | -182.90 | | (6) | | |
| 11 | ∞ | 3.92 | (8) | 1.5163 | 64.1 |
| 12 | ∞ | 1.60 | | | |
| 13 | ∞ | 0.75 | | 1.4875 | 70.2 |
| 14 | ∞ | 1.21 | | | |
| IMG | ∞ | | | | |

| | FFS① | | | | |
|---|---|---|---|---|---|
| $C_4$ | $4.4882 \times 10^{-3}$ | $C_6$ | $5.2857 \times 10^{-3}$ | $C_8$ | $1.2727 \times 10^{-3}$ |
| $C_{10}$ | $-4.5566 \times 10^{-4}$ | $C_{11}$ | $-1.9936 \times 10^{-5}$ | $C_{13}$ | $-5.5113 \times 10^{-4}$ |
| $C_{15}$ | $1.4836 \times 10^{-5}$ | $C_{17}$ | $-3.9125 \times 10^{-5}$ | $C_{19}$ | $2.3094 \times 10^{-6}$ |
| $C_{21}$ | $-9.6658 \times 10^{-8}$ | | | | |
| | FFS② | | | | |
| $C_4$ | $2.8720 \times 10^{-2}$ | $C_6$ | $3.6663 \times 10^{-2}$ | $C_8$ | $3.0497 \times 10^{-3}$ |
| $C_{10}$ | $-2.0416 \times 10^{-3}$ | $C_{11}$ | $2.2086 \times 10^{-4}$ | $C_{13}$ | $-1.4149 \times 10^{-3}$ |
| $C_{15}$ | $2.4439 \times 10^{-4}$ | $C_{17}$ | $-9.4283 \times 10^{-5}$ | $C_{19}$ | $1.6628 \times 10^{-5}$ |
| $C_{21}$ | $2.9961 \times 10^{-6}$ | | | | |
| | FFS③ | | | | |
| $C_4$ | $-2.6108 \times 10^{-2}$ | $C_6$ | $-6.6594 \times 10^{-3}$ | $C_8$ | $-5.9095 \times 10^{-4}$ |
| $C_{10}$ | $-7.6762 \times 10^{-4}$ | $C_{11}$ | $4.9250 \times 10^{-6}$ | $C_{13}$ | $-5.8488 \times 10^{-4}$ |
| $C_{15}$ | $-6.5315 \times 10^{-5}$ | $C_{17}$ | $7.3853 \times 10^{-5}$ | $C_{19}$ | $5.1908 \times 10^{-5}$ |
| $C_{21}$ | $-2.6277 \times 10^{-6}$ | | | | |
| | FFS④ | | | | |
| $C_4$ | $-3.3730 \times 10^{-2}$ | $C_6$ | $-1.9366 \times 10^{-2}$ | $C_8$ | $9.6993 \times 10^{-4}$ |
| $C_{10}$ | $-5.6938 \times 10^{-4}$ | $C_{11}$ | $-5.1080 \times 10^{-5}$ | $C_{13}$ | $-4.5123 \times 10^{-4}$ |
| $C_{15}$ | $-1.8122 \times 10^{-5}$ | $C_{17}$ | $2.6091 \times 10^{-5}$ | $C_{19}$ | $8.3242 \times 10^{-5}$ |
| $C_{21}$ | $1.5598 \times 10^{-6}$ | | | | |

Displacement and tilt(1)

| X | 0.00 | Y | 2.70 | Z | -2.04 |
|---|---|---|---|---|---|
| α | 12.31 | β | 0.00 | γ | 0.00 |

Displacement and tilt(2)

| X | 0.00 | Y | 0.22 | Z | 1.12 |
|---|---|---|---|---|---|
| α | -16.62 | β | 0.00 | γ | 0.00 |

Displacement and tilt(3)

| X | 0.00 | Y | 8.66 | Z | 1.02 |
|---|---|---|---|---|---|
| α | 57.86 | β | 0.00 | γ | 0.00 |

Displacement and tilt(4)

| X | 0.00 | Y | 13.19 | Z | 3.12 |
|---|---|---|---|---|---|
| α | 65.17 | β | 0.00 | γ | 0.00 |

Displacement and tilt(5)

| X | 0.00 | Y | 3.33 | Z | 2.47 |
|---|---|---|---|---|---|
| α | -9.58 | β | 0.00 | γ | 0.00 |

Displacement and tilt(6)

| X | 0.00 | Y | -0.15 | Z | 4.19 |
|---|---|---|---|---|---|
| α | -33.69 | β | 0.00 | γ | 0.00 |

Displacement and tilt(7)

| X | 0.00 | Y | 5.52 | Z | 4.69 |
|---|---|---|---|---|---|
| α | 46.68 | β | 0.00 | γ | 0.00 |

Displacement and tilt(8)

| X | 0.00 | Y | 6.27 | Z | 5.48 |
|---|---|---|---|---|---|
| α | 43.47 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| OBJ | ∞ | ∞ | | | |
| 1 | ∞ (HP) | | | (RP1) | |
| 2 | -17.97 | | (1) | 1.4924 | 57.6 |

-continued

| | | | | | |
|---|---|---|---|---|---|
| 3 | FFS①  (REF) | | (2) | 1.4924 | 57.6 |
| 4 | FFS②  (REF) | | (3) | 1.4924 | 57.6 |
| 5 | FFS①  | | (2) | | |
| 6 | ∞ (STO) | | (4) | (RP2) | |
| 7 | FFS③ | | (5) | 1.4924 | 57.6 |
| 8 | FFS④  (REF) | | (6) | 1.4924 | 57.6 |
| 9 | FFS③  (REF) | | (5) | 1.4924 | 57.6 |
| 10 | −7.38 | | (7) | | |
| 11 | ∞ | 3.92 | (8) | 1.5163 | 64.1 |
| 12 | ∞ | 1.60 | | | |
| 13 | ∞ | 0.75 | | 1.4875 | 70.2 |
| 14 | ∞ | 1.21 | | | |
| IMG | ∞ | | | | |

FFS①
| | | | | | |
|---|---|---|---|---|---|
| $C_4$ | $4.6619 \times 10^{-3}$ | $C_6$ | $1.0103 \times 10^{-2}$ | $C_8$ | $5.3309 \times 10^{-4}$ |
| $C_{10}$ | $2.5809 \times 10^{-4}$ | $C_{11}$ | $3.9107 \times 10^{-4}$ | $C_{13}$ | $-7.9465 \times 10^{-4}$ |
| $C_{15}$ | $-2.5990 \times 10^{-5}$ | $C_{17}$ | $-7.7132 \times 10^{-5}$ | $C_{19}$ | $-1.1982 \times 10^{-4}$ |
| $C_{21}$ | $-2.4626 \times 10^{-6}$ | | | | |

FFS②
| | | | | | |
|---|---|---|---|---|---|
| $C_4$ | $-5.9402 \times 10^{-3}$ | $C_6$ | $7.9395 \times 10^{-3}$ | $C_8$ | $-2.2567 \times 10^{-3}$ |
| $C_{10}$ | $4.2495 \times 10^{-4}$ | $C_{11}$ | $3.8769 \times 10^{-4}$ | $C_{13}$ | $-1.3643 \times 10^{-3}$ |
| $C_{15}$ | $-4.9097 \times 10^{-6}$ | $C_{17}$ | $-1.4836 \times 10^{-4}$ | $C_{19}$ | $-4.1700 \times 10^{-4}$ |
| $C_{21}$ | $-5.1395 \times 10^{-6}$ | | | | |

FFS③
| | | | | | |
|---|---|---|---|---|---|
| $C_4$ | $-2.2750 \times 10^{-2}$ | $C_6$ | $-6.4484 \times 10^{-3}$ | $C_8$ | $-3.5583 \times 10^{-4}$ |
| $C_{10}$ | $-3.9258 \times 10^{-4}$ | $C_{11}$ | $6.1743 \times 10^{-4}$ | $C_{13}$ | $-8.6592 \times 10^{-4}$ |
| $C_{15}$ | $-4.4177 \times 10^{-5}$ | $C_{17}$ | $1.8522 \times 10^{-4}$ | $C_{19}$ | $1.7964 \times 10^{-4}$ |
| $C_{21}$ | $-4.2969 \times 10^{-6}$ | | | | |

FFS④
| | | | | | |
|---|---|---|---|---|---|
| $C_4$ | $-3.3449 \times 10^{-2}$ | $C_6$ | $-1.8715 \times 10^{-2}$ | $C_8$ | $2.0166 \times 10^{-3}$ |
| $C_{10}$ | $-3.0297 \times 10^{-4}$ | $C_{11}$ | $2.9735 \times 10^{-4}$ | $C_{13}$ | $-7.9739 \times 10^{-4}$ |
| $C_{15}$ | $2.5504 \times 10^{-5}$ | $C_{17}$ | $1.0997 \times 10^{-4}$ | $C_{19}$ | $2.3093 \times 10^{-4}$ |
| $C_{21}$ | $-1.2170 \times 10^{-5}$ | | | | |

Displacement and tilt(1)
| X | 0.00 | Y | 0.00 | Z | 0.36 |
|---|---|---|---|---|---|
| α | 2.38 | β | 0.00 | γ | 0.00 |

Displacement and tilt(2)
| X | 0.00 | Y | 0.06 | Z | 5.01 |
|---|---|---|---|---|---|
| α | −52.83 | β | 0.00 | γ | 0.00 |

Displacement and tilt(3)
| X | 0.00 | Y | 5.20 | Z | 6.53 |
|---|---|---|---|---|---|
| α | −77.26 | β | 0.00 | γ | 0.00 |

Displacement and tilt(4)
| X | 0.00 | Y | 1.30 | Z | 10.27 |
|---|---|---|---|---|---|
| α | −43.02 | β | 0.00 | γ | 0.00 |

Displacement and tilt(5)
| X | 0.00 | Y | 3.46 | Z | 2.77 |
|---|---|---|---|---|---|
| α | −14.25 | β | 0.00 | γ | 0.00 |

Displacement and tilt(6)
| X | 0.00 | Y | −0.24 | Z | 4.34 |
|---|---|---|---|---|---|
| α | −36.21 | β | 0.00 | γ | 0.00 |

Displacement and tilt(7)
| X | 0.00 | Y | 5.68 | Z | 5.55 |
|---|---|---|---|---|---|
| α | 34.74 | β | 0.00 | γ | 0.00 |

Displacement and tilt(8)
| X | 0.00 | Y | 6.33 | Z | 6.32 |
|---|---|---|---|---|---|
| α | 40.32 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| OBJ | ∞ | ∞ | | | |
| 1 | ∞ (HP) | | | (RP1) | |
| 2 | 83.89 | | (1) | 1.4924 | 57.6 |
| 3 | FFS①  (REF) | | (2) | 1.4924 | 57.6 |
| 4 | FFS②  (REF) | | (3) | 1.4924 | 57.6 |
| 5 | FFS① | | (2) | | |
| 6 | ∞ (STO) | | (4) | (RP2) | |
| 7 | 9.75 | | (5) | 1.4924 | 57.6 |
| 8 | FFS③  (REF) | | (6) | 1.4924 | 57.6 |
| 9 | FFS④  (REF) | | (7) | 1.4924 | 57.6 |
| 10 | FFS③ | | (6) | | |
| 11 | ∞ | 3.92 | (8) | 1.5163 | 64.1 |
| 12 | ∞ | 1.60 | | | |
| 13 | ∞ | 0.75 | | 1.4875 | 70.2 |
| 14 | ∞ | 1.21 | | | |
| IMG | ∞ | | | | |

FFS①
| | | | | | |
|---|---|---|---|---|---|
| $C_4$ | $-6.3358 \times 10^{-3}$ | $C_6$ | $-1.5557 \times 10^{-3}$ | $C_8$ | $6.6937 \times 10^{-4}$ |
| $C_{10}$ | $6.2158 \times 10^{-6}$ | $C_{11}$ | $1.6612 \times 10^{-4}$ | $C_{13}$ | $6.4652 \times 10^{-5}$ |
| $C_{15}$ | $1.7089 \times 10^{-5}$ | $C_{17}$ | $2.6595 \times 10^{-5}$ | $C_{19}$ | $-3.5633 \times 10^{-6}$ |
| $C_{21}$ | $1.3013 \times 10^{-6}$ | | | | |

FFS②
| | | | | | |
|---|---|---|---|---|---|
| $C_4$ | $2.3637 \times 10^{-2}$ | $C_6$ | $1.8511 \times 10^{-2}$ | $C_8$ | $1.5064 \times 10^{-3}$ |
| $C_{10}$ | $-1.8602 \times 10^{-5}$ | $C_{11}$ | $2.1894 \times 10^{-4}$ | $C_{13}$ | $1.0786 \times 10^{-3}$ |
| $C_{15}$ | $2.4116 \times 10^{-4}$ | $C_{17}$ | $7.9889 \times 10^{-5}$ | $C_{19}$ | $2.5396 \times 10^{-4}$ |
| $C_{21}$ | $-1.2496 \times 10^{-5}$ | | | | |

FFS③
| | | | | | |
|---|---|---|---|---|---|
| $C_4$ | $2.6075 \times 10^{-2}$ | $C_6$ | $7.0386 \times 10^{-3}$ | $C_8$ | $1.7598 \times 10^{-4}$ |
| $C_{10}$ | $-1.6042 \times 10^{-4}$ | $C_{11}$ | $2.8095 \times 10^{-4}$ | $C_{13}$ | $-6.0469 \times 10^{-4}$ |
| $C_{16}$ | $4.2855 \times 10^{-5}$ | $C_{17}$ | $-6.6903 \times 10^{-5}$ | $C_{19}$ | $-7.2733 \times 10^{-5}$ |
| $C_{21}$ | $2.7031 \times 10^{-6}$ | | | | |

FFS④
| | | | | | |
|---|---|---|---|---|---|
| $C_4$ | $3.6244 \times 10^{-2}$ | $C_6$ | $2.8169 \times 10^{-2}$ | $C_8$ | $5.9800 \times 10^{-4}$ |
| $C_{10}$ | $-1.8425 \times 10^{-4}$ | $C_{11}$ | $1.1767 \times 10^{-4}$ | $C_{13}$ | $-2.0855 \times 10^{-4}$ |
| $C_{15}$ | $6.6760 \times 10^{-5}$ | $C_{17}$ | $-2.3652 \times 10^{-5}$ | $C_{19}$ | $1.7128 \times 10^{-5}$ |
| $C_{21}$ | $-8.0804 \times 10^{-6}$ | | | | |

Displacement and tilt(1)
| X | 0.00 | Y | 0.00 | Z | 0.24 |
|---|---|---|---|---|---|
| α | −25.89 | β | 0.00 | γ | 0.00 |

Displacement and tilt(2)
| X | 0.00 | Y | −0.89 | Z | 5.92 |
|---|---|---|---|---|---|
| α | −66.31 | β | 0.00 | γ | 0.00 |

Displacement and tilt(3)
| X | 0.00 | Y | 1.66 | Z | 7.62 |
|---|---|---|---|---|---|
| α | −96.36 | β | 0.00 | γ | 0.00 |

Displacement and tilt(4)
| X | 0.00 | Y | −1.18 | Z | 8.68 |
|---|---|---|---|---|---|
| α | −70.46 | β | 0.00 | γ | 0.00 |

Displacement and tilt(5)
| X | 0.00 | Y | 0.00 | Z | 1.22 |
|---|---|---|---|---|---|
| α | 15.65 | β | 0.00 | γ | 0.00 |

Displacement and tilt(6)
| X | 0.00 | Y | 0.25 | Z | 3.93 |
|---|---|---|---|---|---|
| α | 58.86 | β | 0.00 | γ | 0.00 |

Displacement and tilt(7)
| X | 0.00 | Y | −3.83 | Z | 5.62 |
|---|---|---|---|---|---|
| α | 90.24 | β | 0.00 | γ | 0.00 |

Displacement and tilt(8)
| X | 0.00 | Y | 0.14 | Z | 7.14 |
|---|---|---|---|---|---|
| α | 71.07 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| OBJ | ∞ | ∞ | | | |
| 1 | ∞ (HP) | | | (RP1) | |
| 2 | FFS① | | (1) | 1.4924 | 57.6 |
| 3 | FFS① (REF) | | (2) | 1.4924 | 57.6 |
| 4 | FFS② (REF) | | (1) | 1.4924 | 57.6 |
| 5 | −12.77 | | (3) | | |
| 6 | ∞ (STO) | | (4) | (RP2) | |
| 7 | −7.26 | | (5) | 1.4924 | 57.6 |
| 8 | FFS③ (REF) | | (6) | 1.4924 | 57.6 |
| 9 | FFS④ (REF) | | (7) | 1.4924 | 57.6 |
| 10 | FFS③ | | (6) | | |
| 11 | ∞ | 3.92 | (8) | 1.5163 | 64.1 |
| 12 | ∞ | 1.60 | | | |
| 13 | ∞ | 0.75 | | 1.4875 | 70.2 |
| 14 | ∞ | 1.21 | | | |
| IMG | ∞ | | | | |

FFS①
$C_4$ $1.7703 \times 10^{-2}$ $C_6$ $1.2541 \times 10^{-2}$ $C_8$ $-2.2282 \times 10^{-4}$
$C_{10}$ $-3.4808 \times 10^{-4}$ $C_{11}$ $3.4612 \times 10^{-5}$ $C_{13}$ $-1.3636 \times 10^{-4}$
$C_{15}$ $3.7812 \times 10^{-5}$ $C_{17}$ $6.7884 \times 10^{-6}$ $C_{19}$ $-2.4525 \times 10^{-5}$
$C_{21}$ $-1.3942 \times 10^{-6}$ FFS②
$C_4$ $2.4784 \times 10^{-2}$ $C_6$ $3.0103 \times 10^{-2}$ $C_8$ $-7.1594 \times 10^{-4}$
$C_{10}$ $-1.5659 \times 10^{-3}$ $C_{11}$ $1.1480 \times 10^{-4}$ $C_{13}$ $-1.2581 \times 10^{-4}$
$C_{15}$ $3.4035 \times 10^{-4}$ $C_{17}$ $1.8205 \times 10^{-5}$ $C_{19}$ $-5.6904 \times 10^{-5}$
$C_{21}$ $-3.1366 \times 10^{-5}$ FFS③
$C_4$ $2.1357 \times 10^{-2}$ $C_8$ $5.1898 \times 10^{-3}$ $C_8$ $8.3640 \times 10^{-4}$
$C_{10}$ $-1.1399 \times 10^{-4}$ $C_{11}$ $2.1316 \times 10^{-6}$ $C_{13}$ $-3.9460 \times 10^{4}$
$C_{15}$ $1.9177 \times 10^{-5}$ $C_{17}$ $-3.7670 \times 10^{-5}$ $C_{19}$ $-3.6694 \times 10^{5}$
$C_{21}$ $2.6250 \times 10^{-6}$ FFS④
$C_4$ $3.7819 \times 10^{-2}$ $C_6$ $2.6303 \times 10^{-2}$ $C_8$ $-5.3115 \times 10^{-5}$
$C_{10}$ $-4.9381 \times 10^{-4}$ $C_{11}$ $7.9618 \times 10^{-5}$ $C_{13}$ $-1.2365 \times 10^{-4}$
$C_{15}$ $4.3659 \times 10^{-5}$ $C_{17}$ $-1.5126 \times 10^{-5}$ $C_{19}$ $-8.1824 \times 10^{-7}$
$C_{21}$ $-6.0095 \times 10^{-6}$ Displacement and tilt(1)
| X | 0.00 | Y | 4.65 | Z | 0.00 |
| α | −22.96 | β | 0.00 | γ | 0.00 |

Displacement and tilt(2)
| X | 0.00 | Y | −0.22 | Z | 1.25 |
| α | −40.03 | β | 0.00 | γ | 0.00 |

Displacement and tilt(3)
| X | 0.00 | Y | 6.38 | Z | 3.04 |
| α | 33.06 | β | 0.00 | γ | 0.00 |

Displacement and tilt(4)
| X | 0.00 | Y | 7.00 | Z | 4.20 |
| α | 28.03 | β | 0.00 | γ | 0.00 |

Displacement and tilt(5)
| X | 0.00 | Y | 0.00 | Z | 1.37 |
| α | 11.28 | β | 0.00 | γ | 0.00 |

Displacement and tilt(6)
| X | 0.00 | Y | 0.15 | Z | 3.69 |
| α | 56.30 | β | 0.00 | γ | 0.00 |

Displacement and tilt(7)
| X | 0.00 | Y | −3.66 | Z | 4.99 |
| α | 84.80 | β | 0.00 | γ | 0.00 |

Displacement and tilt(8)
| X | 0.00 | Y | 0.00 | Z | 7.00 |
| α | 61.97 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| OBJ | ∞ | ∞ | | | |
| 1 | ∞ (HP) | | | (RP1) | |
| 2 | FFS① | | (1) | 1.4924 | 57.6 |
| 3 | FFS① (REF) | | (2) | 1.4924 | 57.6 |
| 4 | FFS② (REF) | | (1) | 1.4924 | 57.6 |
| 5 | −43.81 | | (3) | | |
| 6 | ∞ (STO) | | (4) | (RP2) | |
| 7 | FFS③ | | (5) | 1.4924 | 57.6 |
| 8 | FFS④ (REF) | | (6) | 1.4924 | 57.6 |
| 9 | FFS③ (REF) | | (75) | 1.4924 | 57.6 |
| 10 | 6.64 | | (7) | | |
| 11 | ∞ | 3.92 | (8) | 1.5163 | 64.1 |
| 12 | ∞ | 1.60 | | | |
| 13 | ∞ | 0.75 | | 1.4875 | 70.2 |
| 14 | ∞ | 1.21 | | | |
| IMG | ∞ | | | | |

FFS①
$C_4$ $1.4406 \times 10^{-2}$ $C_6$ $6.2753 \times 10^{-3}$ $C_8$ $-2.2691 \times 10^{-5}$
$C_{10}$ $-2.9838 \times 10^{-4}$ $C_{11}$ $-1.0722 \times 10^{-5}$ $C_{13}$ $-1.0493 \times 10^{-4}$
$C_{15}$ $8.1242 \times 10^{-5}$ $C_{17}$ $5.2767 \times 10^{-6}$ $C_{19}$ $-1.5960 \times 10^{-6}$
$C_{21}$ $-7.3131 \times 10^{-7}$ FFS②
$C_4$ $3.6310 \times 10^{-2}$ $C_6$ $3.1671 \times 10^{-2}$ $C_8$ $8.6034 \times 10^{-4}$
$C_{10}$ $-1.2966 \times 10^{-3}$ $C_{11}$ $1.1208 \times 10^{-4}$ $C_{13}$ $-3.8279 \times 10^{-4}$
$C_{15}$ $2.0358 \times 10^{-6}$ $C_{17}$ $3.0459 \times 10^{-5}$ $C_{19}$ $-4.7616 \times 10^{-6}$
$C_{21}$ $-1.8571 \times 10^{-5}$ FFS③
$C_4$ $-1.0586 \times 10^{-2}$ $C_6$ $-7.2769 \times 10^{-4}$ $C_8$ $1.5849 \times 10^{-3}$
$C_{10}$ $-1.7212 \times 10^{-5}$ $C_{11}$ $2.2782 \times 10^{-5}$ $C_{13}$ $-4.2389 \times 10^{-4}$
$C_{15}$ $-1.9404 \times 10^{-5}$ $C_{17}$ $3.7578 \times 10^{-6}$ $C_{19}$ $2.0147 \times 10^{-5}$
$C_{21}$ $9.3400 \times 10^{-7}$ FFS④
$C_4$ $-2.7505 \times 10^{-2}$ $C_6$ $-2.0471 \times 10^{-2}$ $C_8$ $5.5810 \times 10^{-4}$
$C_{10}$ $9.1509 \times 10^{-5}$ $C_{11}$ $-1.1389 \times 10^{-5}$ $C_{13}$ $-1.8475 \times 10^{-4}$
$C_{15}$ $-3.6730 \times 10^{-5}$ $C_{17}$ $3.8568 \times 10^{-6}$ $C_{19}$ $-1.8287 \times 10^{-5}$
$C_{21}$ $-2.7640 \times 10^{-6}$ Displacement and tilt(1)
| X | 0.00 | Y | 5.19 | Z | −0.91 |
| α | 14.69 | β | 0.00 | γ | 0.00 |

Displacement and tilt(2)
| X | 0.00 | Y | 0.57 | Z | 5.36 |
| α | −14.73 | β | 0.00 | γ | 0.00 |

Displacement and tilt(3)
| X | 0.00 | Y | 11.31 | Z | 1.83 |
| α | 57.37 | β | 0.00 | γ | 0.00 |

Displacement and tilt(4)
| X | 0.00 | Y | 16.01 | Z | 3.54 |
| α | 70.02 | β | 0.00 | γ | 0.00 |

Displacement and tilt(5)
| X | 0.00 | Y | −2.27 | Z | 1.02 |
| α | −19.83 | β | 0.00 | γ | 0.00 |

Displacement and tilt(6)
| X | 0.00 | Y | −0.29 | Z | 4.38 |
| α | 11.90 | β | 0.00 | γ | 0.00 |

Displacement and tilt(7)
| X | 0.00 | Y | −4.94 | Z | 2.00 |
| α | −70.13 | β | 0.00 | γ | 0.00 |

Displacement and tilt(8)
| X | 0.00 | Y | −6.17 | Z | 2.44 |
| α | −70.02 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| OBJ | ∞ | ∞ | | | |
| 1 | ∞ (HP) | | | (RP1) | |
| 2 | −18.00 | | (1) | 1.4924 | 57.6 |
| 3 | FFS ① (REF) | | (2) | 1.4924 | 57.6 |
| 4 | FFS ② (REF) | | (3) | 1.4924 | 57.6 |
| 5 | FFS ① | | (2) | | |
| 6 | ∞ (STO) | | (4) | (RP2) | |
| 7 | FFS ③ | | (5) | 1.4924 | 57.6 |
| 8 | FFS ④ (REF) | | (6) | 1.4924 | 57.6 |
| 9 | FFS ③ (REF) | | (5) | 1.4924 | 57.6 |
| 10 | −7.53 | | (7) | | |
| 11 | ∞ | 3.92 | (8) | 1.5163 | 64.1 |
| 12 | ∞ | 1.60 | | | |
| 13 | ∞ | 0.75 | | 1.4875 | 70.2 |
| 14 | ∞ | 1.21 | | | |
| IMG | ∞ | | | | |

FFS ①
$C_4$ −8.0690 × 10⁻³  $C_6$ 1.0994 × 10⁻²  $C_8$ −1.1605 × 10⁻³
$C_{10}$ 1.0408 × 10⁻⁴  $C_{11}$ 1.1135 × 10⁻⁴  $C_{13}$ −3.7395 × 10⁻⁴
$C_{15}$ −2.4881 × 10⁻⁵  $C_{17}$ 6.1074 × 10⁻⁵  $C_{19}$ −4.2711 × 10⁻⁵
$C_{21}$ −1.0346 × 10⁻⁶

FFS ②
$C_4$ −1.9233 × 10⁻²  $C_6$ 1.3289 × 10⁻²  $C_8$ −3.3501 × 10⁻³
$C_{10}$ 5.2058 × 10⁻⁵  $C_{11}$ 3.2245 × 10⁻⁴  $C_{13}$ −8.7661 × 10⁻⁴
$C_{15}$ −4.1891 × 10⁻⁶  $C_{17}$ 2.0917 × 10⁻⁴  $C_{19}$ −6.0632 × 10⁻⁵
$C_{21}$ 4.5070 × 10⁻⁶

FFS ③
$C_4$ −6.6799 × 10⁻³  $C_6$ 3.6521 × 10⁻³  $C_8$ 1.6716 × 10⁻³
$C_{10}$ −1.0088 × 10⁻⁴  $C_{11}$ −2.2729 × 10⁻⁴  $C_{13}$ 7.0411 × 10⁻⁵
$C_{15}$ −2.9328 × 10⁻⁵  $C_{17}$ −2.7090 × 10⁻⁴  $C_{19}$ 1.9903 × 10⁻⁴
$C_{21}$ 5.6974 × 10⁻⁶

FFS ④
$C_4$ −1.9936 × 10⁻²  $C_6$ −4.4471 × 10⁻³  $C_8$ 2.6589 × 10⁻³
$C_{10}$ 2.4845 × 10⁻⁴  $C_{11}$ −1.3765 × 10⁻⁴  $C_{13}$ 1.0999 × 10⁻³
$C_{15}$ 4.1789 × 10⁻⁵  $C_{17}$ −3.1322 × 10⁻⁴  $C_{19}$ 6.2298 × 10⁻⁴
$C_{21}$ 5.1149 × 10⁻⁵

Displacement and tilt (1)
X 0.00  Y 0.00  Z −0.14
α −7.73  β 0.00  γ 0.00

Displacement and tilt (2)
X 0.00  Y −0.21  Z 4.55
α −56.11  β 0.00  γ 0.00

Displacement and tilt (3)
X 0.00  Y 5.21  Z 6.48
α −80.86  β 0.00  γ 0.00

Displacement and tilt (4)
X 0.00  Y −0.26  Z 11.13
α −47.19  β 0.00  γ 0.00

Displacement and tilt (5)
X 0.00  Y −3.36  Z 1.83
α 10.85  β 0.00  γ 0.00

Displacement and tilt (6)
X 0.00  Y 0.15  Z 3.79
α 31.98  β 0.00  γ 0.00

Displacement and tilt (7)
X 0.00  Y −5.87  Z 4.92
α −33.38  β 0.00  γ 0.00

Displacement and tilt (8)
X 0.00  Y −6.57  Z 5.70
α −41.83  β 0.00  γ 0.00

EXAMPLE 8

| Surface No. | Radius of curvature | Surface separation | Displacement and tilt | Refractive index | Abbe's No. |
|---|---|---|---|---|---|
| OBJ | ∞ | ∞ | | | |
| 1 | ∞ (HP) | | | (RP1) | |
| 2 | −29.44 | | (1) | 1.4924 | 57.6 |
| 3 | FFS ① (REF) | | (2) | 1.4924 | 57.6 |
| 4 | FFS ② (REF) | | (3) | 1.4924 | 57.6 |
| 5 | FFS ① | | (2) | | |
| 6 | ∞ (STO) | | (4) | (RP2) | |
| 7 | −44.21 | | (5) | 1.4924 | 57.6 |
| 8 | FFS ③ (REF) | | (6) | 1.4924 | 57.6 |
| 9 | FFS ④ (REF) | | (7) | 1.4924 | 57.6 |
| 10 | FFS ③ | | (6) | | |
| 11 | ∞ | 3.92 | (8) | 1.5163 | 64.1 |
| 12 | ∞ | 1.60 | | | |
| 13 | ∞ | 0.75 | | 1.4875 | 70.2 |
| 14 | ∞ | 1.21 | | | |
| IMG | ∞ | | | | |

FFS ①
$C_4$ −4.4551 × 10⁻³  $C_6$ 8.4100 × 10⁻³  $C_8$ −3.6940 × 10⁻⁴
$C_{10}$ 7.0459 × 10⁻⁵  $C_{11}$ 1.3227 × 10⁻⁴  $C_{13}$ −1.5807 × 10⁻⁴
$C_{15}$ −5.4109 × 10⁻⁵  $C_{17}$ −6.7127 × 10⁻⁵  $C_{19}$ −1.3607 × 10⁻⁵
$C_{21}$ −4.3109 × 10⁻⁶

FFS ②
$C_4$ −6.5168 × 10⁻³  $C_6$ 5.5139 × 10⁻³  $C_8$ −1.8170 × 10⁻³
$C_{10}$ −3.6638 × 10⁻⁴  $C_{11}$ 1.6336 × 10⁻⁴  $C_{13}$ −3.0325 × 10⁻⁴
$C_{15}$ −1.5069 × 10⁻⁴  $C_{17}$ −5.0878 × 10⁻⁶  $C_{19}$ −4.6743 × 10⁻⁵
$C_{21}$ −2.1747 × 10⁻⁵

FFS ③
$C_4$ 9.1804 × 10⁻³  $C_6$ −1.0658 × 10⁻³  $C_8$ −1.3909 × 10⁻³
$C_{10}$ −2.4668 × 10⁻⁴  $C_{11}$ 3.5040 × 10⁻⁴  $C_{13}$ −3.6768 × 10⁻⁴
$C_{15}$ −4.5133 × 10⁻⁵  $C_{17}$ −1.1357 × 10⁻⁵  $C_{19}$ 3.5233 × 10⁻⁵
$C_{21}$ 2.0976 × 10⁻⁶

FFS ④
$C_4$ 2.8689 × 10⁻²  $C_6$ 1.7448 × 10⁻²  $C_8$ −1.0427 × 10⁻³
$C_{10}$ −8.0146 × 10⁻⁴  $C_{11}$ 1.7629 × 10⁻⁴  $C_{13}$ −4.2072 × 10⁻⁴
$C_{15}$ −2.0287 × 10⁻⁴  $C_{17}$ 1.9390 × 10⁻⁵  $C_{19}$ −3.7737 × 10⁻⁵
$C_{21}$ −1.5378 × 10⁻⁵

Displacement and tilt (1)
X 0.00  Y 0.00  Z −0.83
α −11.12  β 0.00  γ 0.00

Displacement and tilt (2)
X 0.00  Y −0.31  Z 3.94
α −60.81  β 0.00  γ 0.00

Displacement and tilt (3)
X 0.00  Y 5.61  Z 7.08
α −81.51  β 0.00  γ 0.00

Displacement and tilt (4)
X 0.00  Y 0.68  Z 12.73
α −36.55  β 0.00  γ 0.00

Displacement and tilt (5)
X 0.00  Y 0.00  Z 1.00
α −0.45  β 0.00  γ 0.00

-continued

|  | Displacement and tilt (6) |  |  |  |  |
|---|---|---|---|---|---|
| X | 0.00 | Y | −0.01 | Z | 5.33 |
| α | −52.27 | β | 0.00 | γ | 0.00 |
|  | Displacement and tilt (7) |  |  |  |  |
| X | 0.00 | Y | 3.43 | Z | 6.22 |
| α | −84.25 | β | 0.00 | γ | 0.00 |
|  | Displacement and tilt (8) |  |  |  |  |
| X | 0.00 | Y | −0.22 | Z | 7.78 |
| α | −70.43 | β | 0.00 | γ | 0.00 |

EXAMPLE 9

| Surface No. | Radius of curvature | Surface separation | Displacement and tilt | Refractive index | Abbe's No. |
|---|---|---|---|---|---|
| OBJ | ∞ | ∞ |  |  |  |
| 1 | ∞ (HP) |  |  | (RP1) |  |
| 2 | FFS ① |  | (1) | 1.4924 | 57.6 |
| 3 | FFS ② (REF) |  | (2) | 1.4924 | 57.6 |
| 4 | FFS ① (REF) |  | (1) | 1.4924 | 57.6 |
| 5 | ASS ① |  | (3) |  |  |
| 6 | ∞ (STO) |  | (4) | (RP2) |  |
| 7 | ASS ② |  | (5) | 1.4924 | 57.6 |
| 8 | FFS ③ (REF) |  | (6) | 1.4924 | 57.6 |
| 9 | FFS ④ (REF) |  | (7) | 1.4924 | 57.6 |
| 10 | FFS ③ |  | (6) |  |  |
| 11 | ∞ | 3.92 | (8) | 1.5163 | 64.1 |
| 12 | ∞ | 1.60 |  |  |  |
| 13 | ∞ | 0.75 |  | 1.4875 | 70.2 |
| 14 | ∞ | 1.21 |  |  |  |
| IMG | ∞ |  |  |  |  |

ASS ①

R −17.23
K 0.0000
A $5.5487 \times 10^{-4}$
B $-2.7860 \times 10^{-5}$
C $2.7817 \times 10^{-6}$
D $-1.1756 \times 10^{-7}$

ASS ②

R −22.15
K 0.0000
A $3.4739 \times 10^{-4}$
B $3.4155 \times 10^{-4}$
C $-1.4546 \times 10^{-4}$
D $2.5281 \times 10^{-5}$

FFS ①

| $C_4$ | $1.3513 \times 10^{-2}$ | $C_6$ | $8.1119 \times 10^{-3}$ | $C_8$ | $-2.7322 \times 10^{-4}$ |
| $C_{10}$ | $-7.9931 \times 10^{-5}$ | $C_{11}$ | $-1.9854 \times 10^{-5}$ | $C_{13}$ | $6.0903 \times 10^{-6}$ |
| $C_{15}$ | $1.3697 \times 10^{-5}$ | $C_{17}$ | $7.9589 \times 10^{-6}$ | $C_{19}$ | $-1.3932 \times 10^{-6}$ |
| $C_{21}$ | $2.5333 \times 10^{-7}$ | | | | |

FFS ②

| $C_4$ | $2.3647 \times 10^{-2}$ | $C_6$ | $2.4838 \times 10^{-2}$ | $C_8$ | $-4.3719 \times 10^{-4}$ |
| $C_{10}$ | $-1.2569 \times 10^{-4}$ | $C_{11}$ | $-8.0404 \times 10^{-5}$ | $C_{13}$ | $-4.8855 \times 10^{-5}$ |
| $C_{15}$ | $1.5049 \times 10^{-4}$ | $C_{17}$ | $1.2694 \times 10^{-5}$ | $C_{19}$ | $-1.1625 \times 10^{-5}$ |
| $C_{21}$ | $3.8112 \times 10^{-6}$ | | | | |

FFS ③

| $C_4$ | $3.1409 \times 10^{-2}$ | $C_6$ | $8.2449 \times 10^{-3}$ | $C_8$ | $-5.6692 \times 10^{-4}$ |
| $C_{10}$ | $2.5394 \times 10^{-4}$ | $C_{11}$ | $4.4424 \times 10^{-5}$ | $C_{13}$ | $-1.3224 \times 10^{-5}$ |
| $C_{15}$ | $4.9210 \times 10^{-5}$ | $C_{17}$ | $2.0438 \times 10^{-5}$ | $C_{19}$ | $7.1847 \times 10^{-6}$ |
| $C_{21}$ | $-4.2376 \times 10^{-6}$ | | | | |

FFS ④

| $C_4$ | $3.7698 \times 10^{-2}$ | $C_6$ | $2.6462 \times 10^{-2}$ | $C_8$ | $3.5685 \times 10^{-4}$ |
| $C_{10}$ | $4.7497 \times 10^{-4}$ | $C_{11}$ | $6.2480 \times 10^{-5}$ | $C_{13}$ | $1.0356 \times 10^{-5}$ |
| $C_{15}$ | $8.1350 \times 10^{-5}$ | $C_{17}$ | $9.5814 \times 10^{-6}$ | $C_{19}$ | $5.5444 \times 10^{-6}$ |
| $C_{21}$ | $5.5879 \times 10^{-6}$ | | | | |

|  | Displacement and tilt (1) |  |  |  |  |
|---|---|---|---|---|---|
| X | 0.00 | Y | 6.13 | Z | −1.00 |
| α | 15.05 | β | 0.00 | γ | 0.00 |
|  | Displacement and tilt (2) |  |  |  |  |
| X | 0.00 | Y | 0.75 | Z | 6.68 |
| α | −13.71 | β | 0.00 | γ | 0.00 |
|  | Displacement and tilt (3) |  |  |  |  |
| X | 0.00 | Y | 14.13 | Z | 2.72 |
| α | 71.33 | β | 0.00 | γ | 0.00 |
|  | Displacement and tilt (4) |  |  |  |  |
| X | 0.00 | Y | 17.22 | Z | 4.36 |
| α | 62.00 | β | 0.00 | γ | 0.00 |
|  | Displacement and tilt (5) |  |  |  |  |
| X | 0.00 | Y | 0.00 | Z | 1.03 |
| α | 0.04 | β | 0.00 | γ | 0.00 |
|  | Displacement and tilt (6) |  |  |  |  |
| X | 0.00 | Y | 0.00 | Z | 3.83 |
| α | −53.61 | β | 0.00 | γ | 0.00 |
|  | Displacement and tilt (7) |  |  |  |  |
| X | 0.00 | Y | 4.83 | Z | 5.33 |
| α | −83.95 | β | 0.00 | γ | 0.00 |
|  | Displacement and tilt (8) |  |  |  |  |
| X | 0.00 | Y | 0.92 | Z | 7.48 |
| α | −62.00 | β | 0.00 | γ | 0.00 |

EXAMPLE 10

| Surface No. | Radius of curvature | Surface separation | Displacement and tilt | Refractive index | Abbe's No. |
|---|---|---|---|---|---|
| OBJ | ∞ | ∞ |  |  |  |
| 1 | ∞ (HP) |  |  | (RP1) |  |
| 2 | FFS ① |  | (1) | 1.4924 | 57.6 |
| 3 | FFS ② (REF) |  | (2) | 1.4924 | 57.6 |
| 4 | FFS ① (REF) |  | (1) | 1.4924 | 57.6 |
| 5 | −15.44 |  | (3) |  |  |
| 6 | ∞ (STO) |  | (4) | (RP2) |  |
| 7 | −5.26 |  | (5) | 1.4924 | 57.6 |
| 8 | FFS ③ (REF) |  | (6) | 1.4924 | 57.6 |
| 9 | FFS ④ (REF) |  | (7) | 1.4924 | 57.6 |
| 10 | FFS ③ |  | (6) |  |  |
| 11 | ∞ | 3.92 | (8) | 1.5163 | 64.1 |
| 12 | ∞ | 1.60 |  |  |  |
| 13 | ∞ | 0.75 |  | 1.4875 | 70.2 |
| 14 | ∞ | 1.21 |  |  |  |
| IMG | ∞ |  |  |  |  |

FFS ①

| $C_4$ | $2.0854 \times 10^{-2}$ | $C_6$ | $1.3433 \times 10^{-2}$ | $C_8$ | $-1.2897 \times 10^{-4}$ |
| $C_{10}$ | $-2.5553 \times 10^{-4}$ | $C_{11}$ | $3.6499 \times 10^{-5}$ | $C_{13}$ | $-1.1309 \times 10^{-4}$ |
| $C_{15}$ | $4.2916 \times 10^{-5}$ | $C_{17}$ | $-2.4050 \times 10^{-6}$ | $C_{19}$ | $-1.9942 \times 10^{-5}$ |
| $C_{21}$ | $-1.2349 \times 10^{-6}$ | | | | |

FFS ②

| $C_4$ | $3.2095 \times 10^{-2}$ | $C_6$ | $3.8763 \times 10^{-2}$ | $C_8$ | $-8.6098 \times 10^{-4}$ |

-continued

| | | | | | |
|---|---|---|---|---|---|
| $C_{10}$ | $-1.5903 \times 10^{-3}$ | $C_{11}$ | $1.1388 \times 10^{-4}$ | $C_{13}$ | $-2.6386 \times 10^{-4}$ |
| $C_{15}$ | $4.6971 \times 10^{-4}$ | $C_{17}$ | $-2.8541 \times 10^{-6}$ | $C_{19}$ | $-8.4390 \times 10^{-5}$ |
| $C_{21}$ | $-6.8073 \times 10^{-5}$ | | | | |

FFS ③

| | | | | | |
|---|---|---|---|---|---|
| $C_4$ | $3.2186 \times 10^{-2}$ | $C_6$ | $6.5972 \times 10^{-3}$ | $C_8$ | $2.2781 \times 10^{-3}$ |
| $C_{10}$ | $1.2993 \times 10^{-4}$ | $C_{11}$ | $-1.9118 \times 10^{-4}$ | $C_{13}$ | $-5.5486 \times 10^{-4}$ |
| $C_{15}$ | $1.5485 \times 10^{-5}$ | $C_{17}$ | $-9.4440 \times 10^{-5}$ | $C_{19}$ | $-7.9954 \times 10^{-5}$ |
| $C_{21}$ | $2.3926 \times 10^{-6}$ | | | | |

FFS ④

| | | | | | |
|---|---|---|---|---|---|
| $C_4$ | $4.8819 \times 10^{-2}$ | $C_6$ | $3.1471 \times 10^{-2}$ | $C_8$ | $1.5772 \times 10^{-4}$ |
| $C_{10}$ | $-3.6072 \times 10^{-4}$ | $C_{11}$ | $1.2024 \times 10^{-4}$ | $C_{13}$ | $-1.1655 \times 10^{-4}$ |
| $C_{15}$ | $4.3632 \times 10^{-5}$ | $C_{17}$ | $-1.9460 \times 10^{-5}$ | $C_{19}$ | $-4.5774 \times 10^{-7}$ |
| $C_{21}$ | $-4.7119 \times 10^{-6}$ | | | | |

Displacement and tilt (1)

| X | 0.00 | Y | 6.07 | Z | 1.00 |
|---|---|---|---|---|---|
| α | −13.48 | β | 0.00 | γ | 0.00 |

Displacement and tilt (2)

| X | 0.00 | Y | 0.00 | Z | 1.84 |
|---|---|---|---|---|---|
| α | −32.48 | β | 0.00 | γ | 0.00 |

Displacement and tilt (3)

| X | 0.00 | Y | 7.98 | Z | 1.45 |
|---|---|---|---|---|---|
| α | 41.87 | β | 0.00 | γ | 0.00 |

Displacement and tilt (4)

| X | 0.00 | Y | 8.57 | Z | 2.26 |
|---|---|---|---|---|---|
| α | 36.07 | β | 0.00 | γ | 0.00 |

Displacement and tilt (5)

| X | 0.00 | Y | 0.00 | Z | 1.31 |
|---|---|---|---|---|---|
| α | 7.46 | β | 0.00 | γ | 0.00 |

Displacement and tilt (6)

| X | 0.00 | Y | 0.09 | Z | 3.48 |
|---|---|---|---|---|---|
| α | 53.69 | β | 0.00 | γ | 0.00 |

Displacement and tilt (7)

| X | 0.00 | Y | −3.17 | Z | 4.35 |
|---|---|---|---|---|---|
| α | 79.69 | β | 0.00 | γ | 0.00 |

Displacement and tilt (8)

| X | 0.00 | Y | −0.53 | Z | 6.24 |
|---|---|---|---|---|---|
| α | 53.94 | β | 0.00 | γ | 0.00 |

FIGS. 11 to 20 are aberrational diagrams showing lateral aberrations in the above-described Examples 1 to 10, respectively. In these aberrational diagrams, the numerals in the parentheses denote [horizontal (X-direction) field angle, vertical (Y-direction) field angle], and lateral aberrations at the field angles are shown. Each aberrational diagram shows, in order from the bottom toward the top of the diagram, lateral aberrations in the center of the image field; lateral aberrations at the position of minus about 70% of the image height on the Y-axis; lateral aberrations at the position of about 70% of the image height in the X-direction and minus 70% of the image height in the Y-direction; lateral aberrations at the position of about 70% of the image height on the X-axis; lateral aberrations at the position of about 70% of the image height in the X-direction and about 70% of the image height in the Y-direction; and lateral aberrations at the position of about 70% of the image height on the Y-axis.

Incidentally, the above-described image-forming optical system according to the present invention can be used in photographic apparatuses in which an object image formed by the image-forming optical system is received with an image pickup device, such as a CCD or a silver halide film, to take a photograph of the object. In particular, the image-forming optical system can be used in cameras and endoscopes. It is also possible to use the image-forming optical system as an objective optical system of an observation apparatus in which an object image is viewed through an ocular lens, particularly a finder unit of a camera. Embodiments in which the present invention is applied to such apparatuses will be described below.

Figure 21:
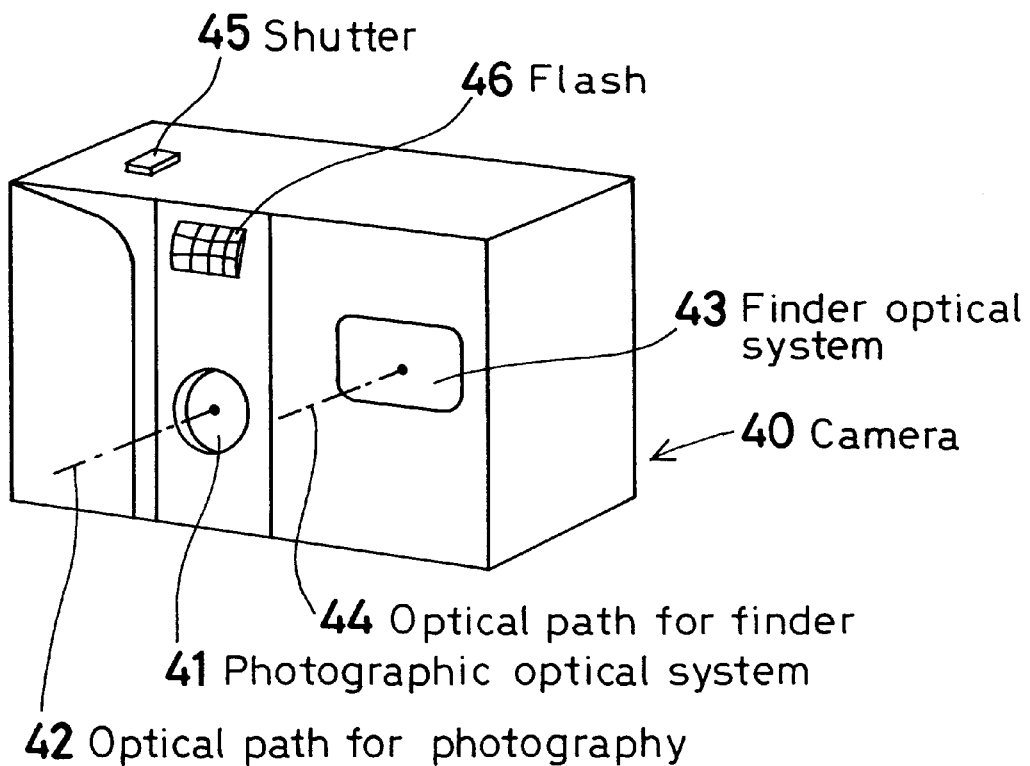
FIG. 21 is a perspective view showing the external appearance of an electronic camera to which an image-forming optical system according to the present invention is applied, as viewed from the front side thereof.
Figure 22:
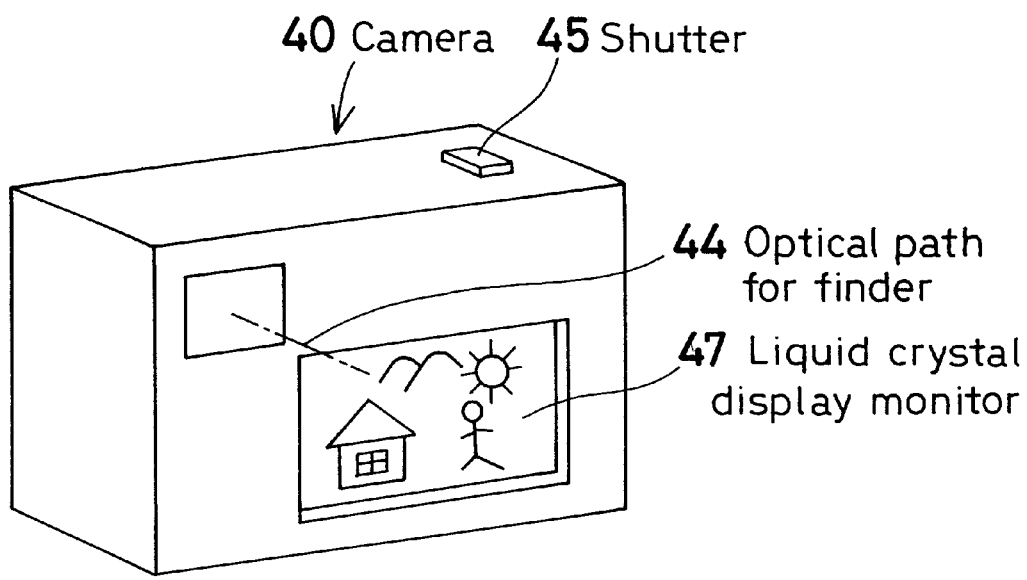
FIG. 22 is a perspective view of the electronic camera shown in FIG. 21, as viewed from the rear side thereof.
Figure 23:
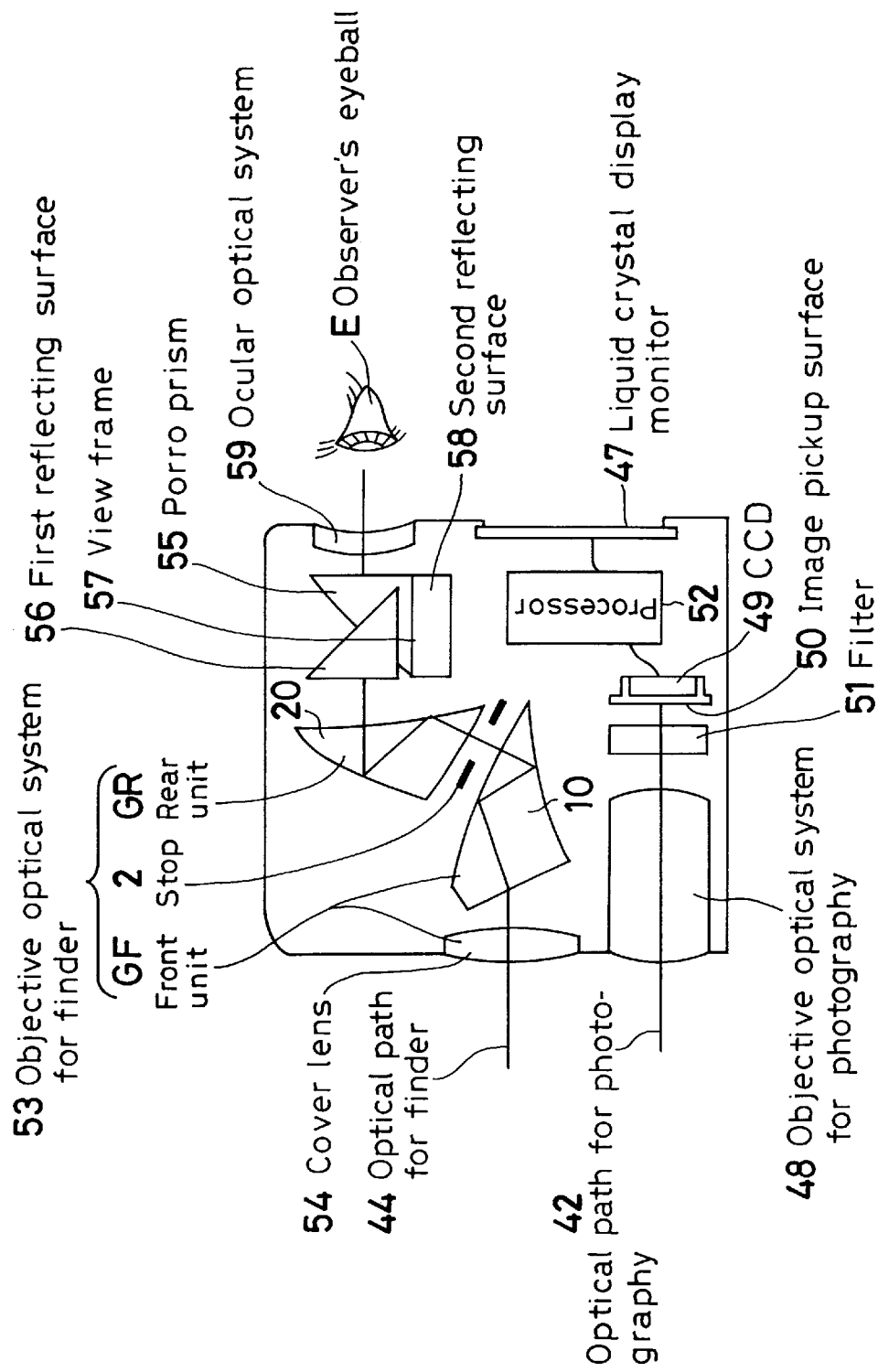
FIG. 23 is a sectional view showing the arrangement of the electronic camera in FIG. 21.

FIGS. 21 to 23 are conceptual views showing an arrangement in which the image-forming optical system according to the present invention is incorporated into an objective optical system of a finder unit of an electronic camera. FIG. 21 is a perspective view showing the external appearance of an electronic camera 40 as viewed from the front side thereof. FIG. 22 is a perspective view of the electronic camera 40 as viewed from the rear side thereof. FIG. 23 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera may be arranged in the form of a silver halide camera in which a silver halide film is disposed in place of the CCD 49.

Furthermore, an image-forming optical system such as that shown in Example 4 is placed in the optical path 44 for the finder as an objective optical system 53 for the finder. In addition, a cover lens 54 having a positive power is provided as a cover member to enlarge the field angle. It should be noted that the cover lens 54 and the prism 10 of the image-forming optical system, which is closer to the object side than the stop 2, constitute a front unit GF of the objective optical system 53 for the finder. The prism 20 of the image-forming optical system, which is closer to the image side than the stop 2, constitutes a rear unit GR of the objective optical system 53 for the finder. An object image produced by the objective optical system 53 for the finder is formed on a view frame 57 of a Porro prism 55, which is an image-erecting member. It should be noted that the view frame 57 is placed between a first reflecting surface 56 and a second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Figure 24:
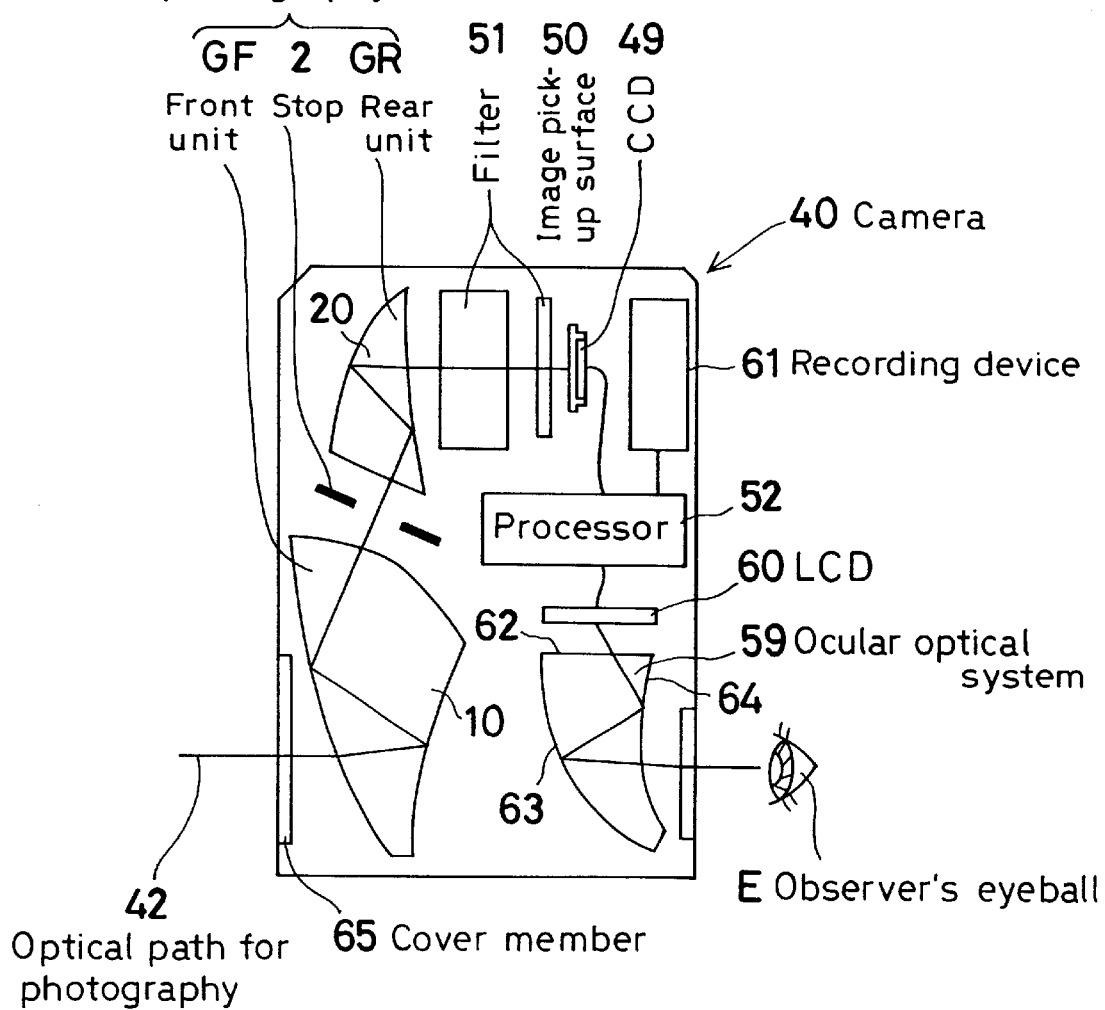
FIG. 24 is a conceptual view of another electronic camera to which an image-forming optical system according to the present invention is applied.

FIG. 24 is a conceptual view showing an arrangement in which an image-forming optical system according to the present invention is incorporated into an objective optical system 48 of a photography part of an electronic camera 40. In this example, the image-forming optical system shown in Example 1 is used in the objective optical system 48 for photography placed in an optical path 42 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism having a configuration similar to that used in the image-forming optical system according to the present invention. In this example, the ocular optical system 59 has three surfaces, i.e. an entrance surface 62, a reflecting surface 63, and a surface 64 serving as both reflecting and refracting surfaces. At least one of the two reflecting surfaces 63 and 64, preferably each of them, is formed from a plane-symmetry free-form surface with only one plane of symmetry that gives a power to a light beam and corrects aberrations due to decentration. The only one plane of symmetry is formed in approximately the same plane as the only one plane of symmetry of the plane-symmetry free-form surfaces in the decentered prisms 10 and 20 provided in the front and rear units GF and GR of the objective optical system 48 for photography.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

In the front unit GF of the image-forming optical system according to the present invention, the surface closest to the object side may be used as a cover member instead of providing a cover member separately. In this case, however, the entrance surface of the decentered prism 10 is the closest to the object side in the front unit GF. Because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 25A:
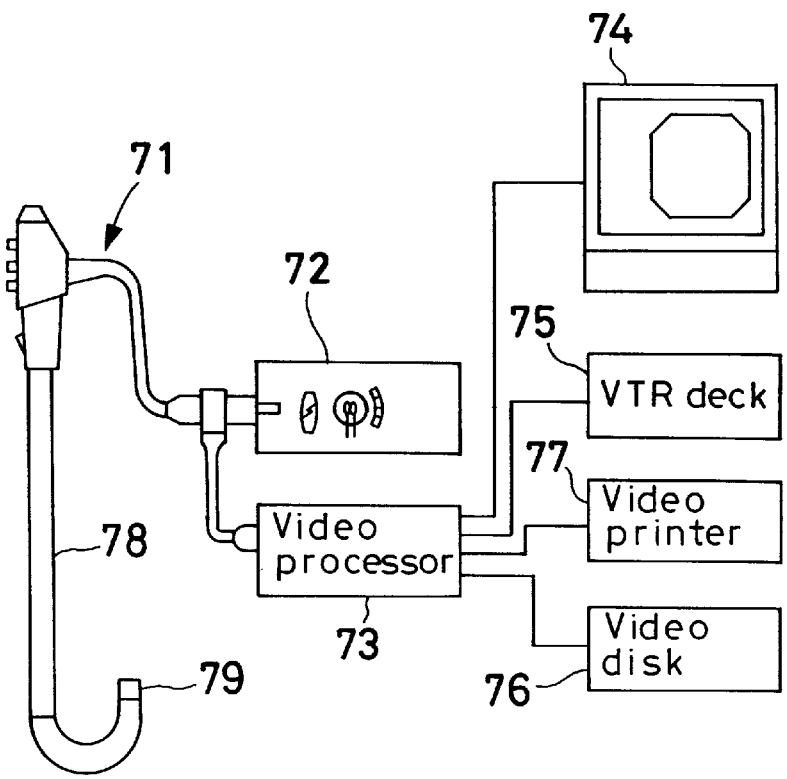
FIG. 25 is a conceptual view of a video endoscope system to which an image-forming optical system according to the present invention is applied.
Figure 25B:
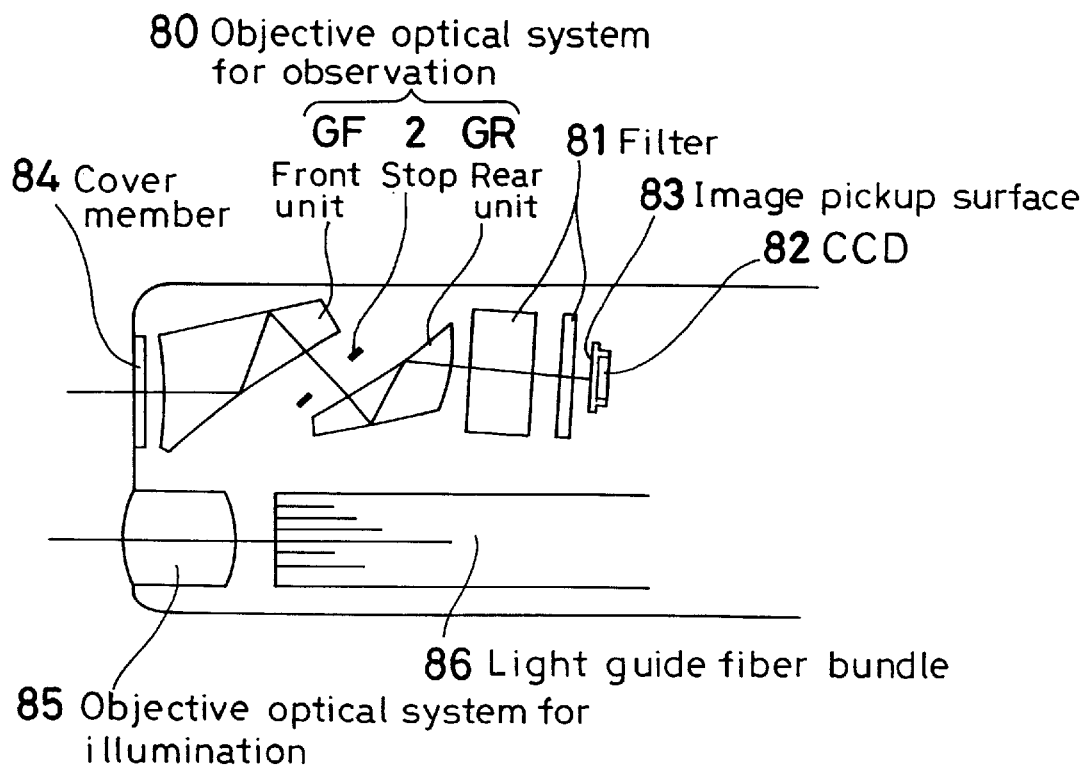

FIG. 25 is a conceptual view showing an arrangement in which an image-forming optical system according to the present invention is incorporated into an objective optical system 80 in an observation system of a video endoscope system. In this case, the objective optical system 80 in the observation system uses the image-forming optical system shown in Example 3. As shown in part (a) of FIG. 25, the video endoscope system includes a video endoscope 71, a light source unit 72 for supplying illuminating light, a video processor 73 for executing processing of signals associated with the video endoscope 71, a monitor 74 for displaying video signals outputted from the video processor 73, a VTR deck 75 and a video disk 76, which are connected to the video processor 73 to record video signals and so forth, and a video printer 77 for printing out video signals in the form of images. The video endoscope 71 has an insert part 78 with a distal end portion 79. The distal end portion 79 is arranged as shown in part (b) of FIG. 25. A light beam from the light source unit 72 passes through a light guide fiber bundle 86 and illuminates a part to be observed through an objective optical system 85 for illumination. Light from the part to be observed enters an objective optical system 80 for observation through a cover member 84. Thus, an object image is formed by the objective optical system 80. The object image is formed on an image pickup surface 83 of a CCD 82 through a filter 81, e.g. a low-pass filter or an infrared cutoff filter. Furthermore, the object image is converted into a video signal by the CCD 82. The video signal is displayed directly on the monitor 74 by the video processor 73, which is shown in part (a) of FIG. 25. In addition, the video signal is recorded in the VTR deck 75 and on the video disk 76 and also printed out in the form of an image from the video printer 77.

The endoscope arranged as stated above can be constructed with a minimal number of optical members. Accordingly, a high-performance and low-cost endoscope can be realized. Moreover, because the front unit GF and the rear unit GR, which constitute the image-forming optical system 80, are arranged in series in the direction of the longitudinal axis of the endoscope, the above-described advantageous effects can be obtained without hindering the achievement of a reduction in the diameter of the endoscope.

Figure 26:
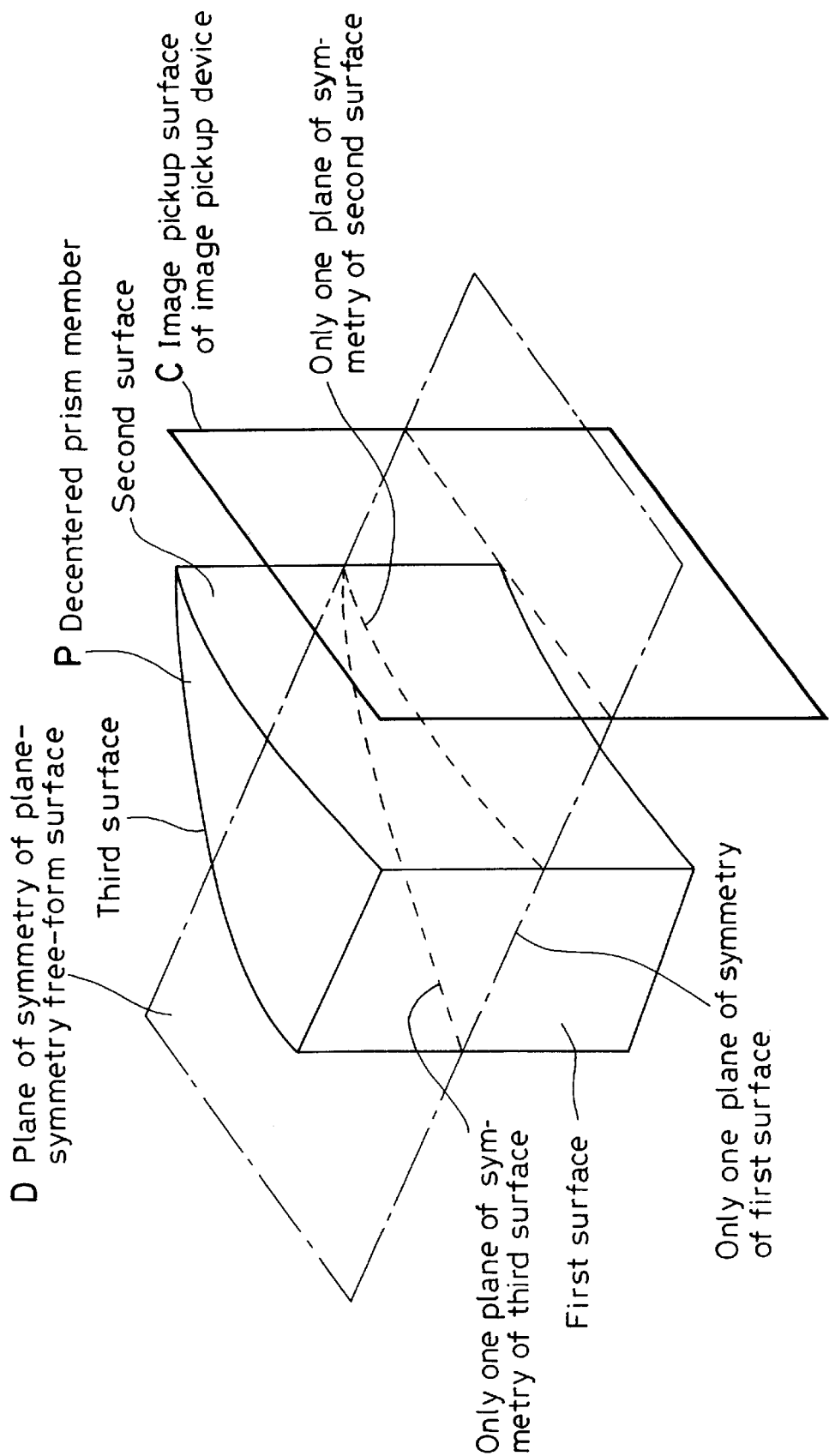
FIG. 26 is a diagram showing a desirable arrangement for an image-forming optical system according to the present invention when it is placed in front of an image pickup device.
Figure 27:
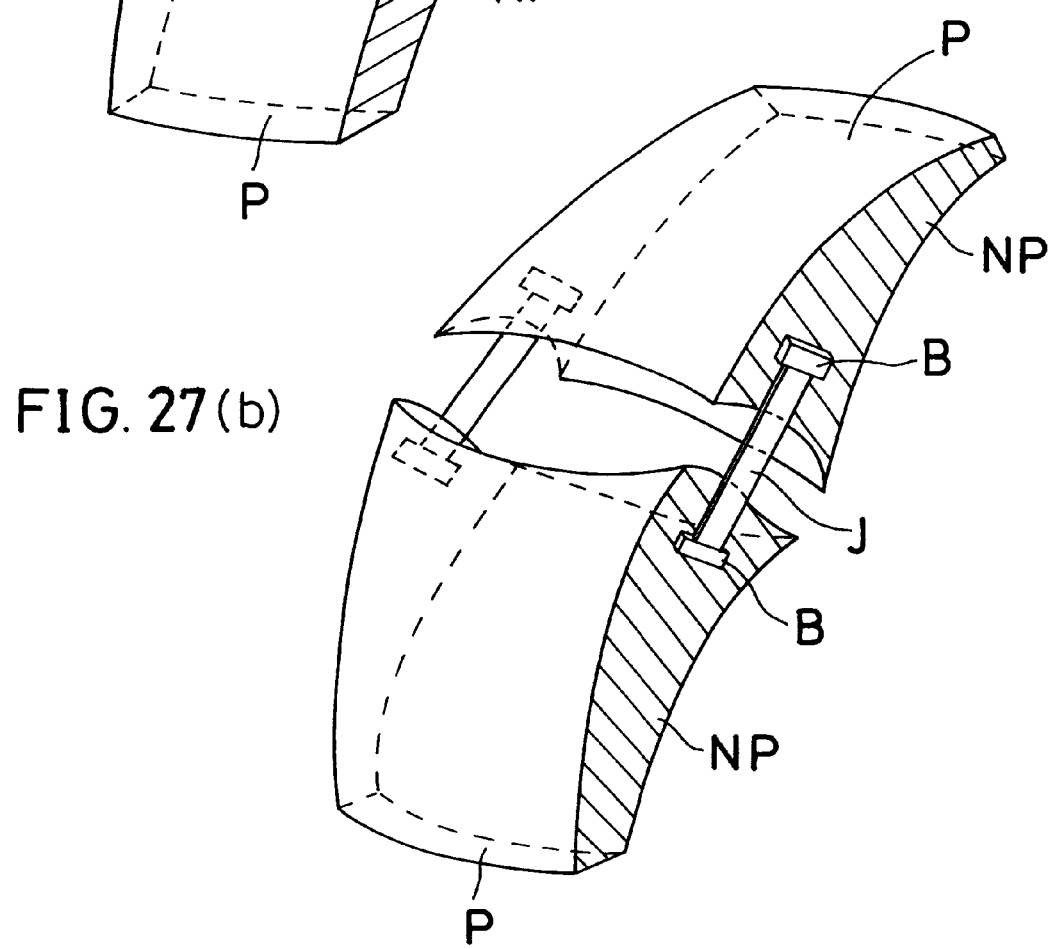
FIG. 27 is a diagram schematically showing an arrangement in which prisms of an image-forming optical system according to the present invention are provided with positioning portions for setting relative positions of the prisms.

FIG. 26 is a diagram showing a desirable arrangement for the image-forming optical system according to any of the foregoing Examples 1 to 10 when the image-forming optical system is placed in front of an image pickup device, e.g. a CCD, or a filter. In the figure, a decentered prism P is a decentered prism included in the front or rear unit of the image-forming optical system according to the present invention. When the image pickup surface C of an image pickup device forms a quadrangle as shown in the figure, it is desirable from the viewpoint of forming a beautiful image to place the decentered prism P so that the plane D of symmetry of a plane-symmetry free-form surface provided in the decentered prism P is parallel to at least one of the sides forming the uadrangular image pickup surface C.

When the image pickup surface C has a shape in which each of the four interior angles is approximately 90 degrees, such as a square or a rectangle, it is desirable that the plane D of symmetry of the plane-symmetry free-form surface should be parallel to two sides of the image pickup surface C that are parallel to each other. It is more desirable that the plane D of symmetry should be parallel to two parallel sides of the image pickup surface C and lie at the middle between the two sides. The described arrangement enables the required assembly accuracy to be readily obtained when the image-forming optical system is incorporated into an apparatus, and is useful for mass-production.

When two or all of the three optical surfaces constituting the decentered prism P, i.e. the first, second and third surfaces, are plane-symmetry free-form surfaces, it is desirable from the viewpoint of design and aberration correcting performance to arrange the decentered prism P so that the planes of symmetry of the two or all of the three surfaces are in the same plane D. In addition, it is desirable that the plane D of symmetry and the image pickup surface C should be in the above-described relationship.

All the decentered prisms provided in the front and rear units of the image-forming optical systems in the above-described examples are of the type in which there are two internal reflections and which has three optical surfaces, one of which is formed from a surface having both a totally reflecting action and a transmitting action. It should, however, be noted that decentered prisms usable in the present invention are not necessarily limited to the described type. Some examples of decentered prisms usable in the present invention will be described below with reference to FIGS. 28 to 33. In all the following examples, the decentered prisms will be described as a prism P that forms an image on an image plane 36. It should, however, be noted that these decentered prisms are also usable as a prism P in which rays from a subject enter the prism P from the image plane side (36) and an image is formed on the pupil side (31), by reversing the illustrated optical path.

Figure 28:
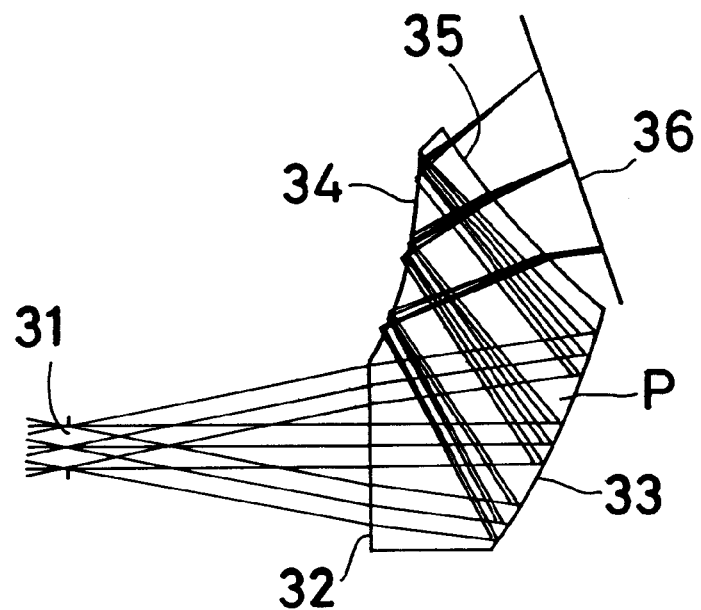
FIG. 28 is a diagram showing one example of decentered prisms applicable to the present invention.

In the case of FIG. 28, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is refracted by the fourth surface 35 to form an image on an image plane 36.

Figure 29:
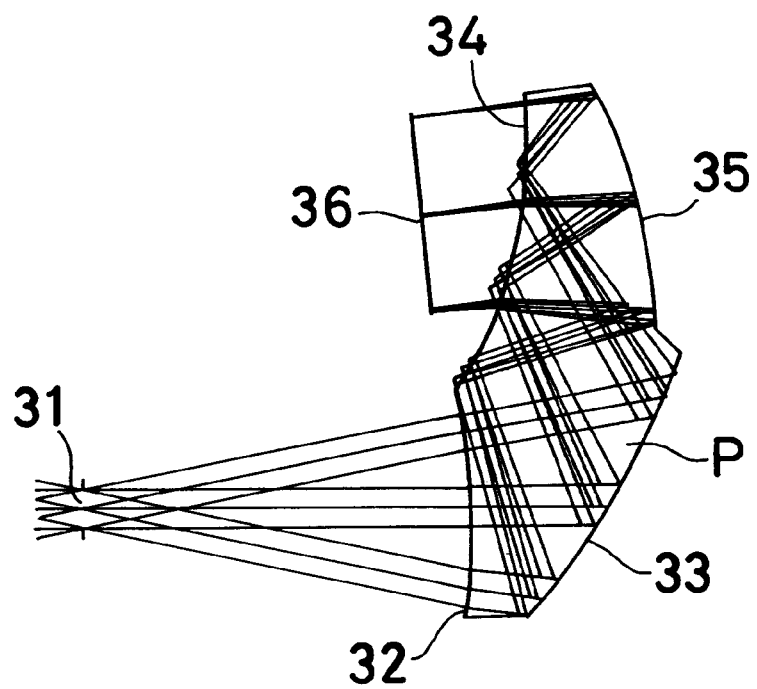
FIG. 29 is a diagram showing another example of decentered prisms applicable to the present invention.

In the case of FIG. 29, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and then totally reflected by the third surface 34. The reflected light is internally reflected by the fourth surface 35 and then refracted by the third surface 34 to form an image on an image plane 36.

Figure 30:
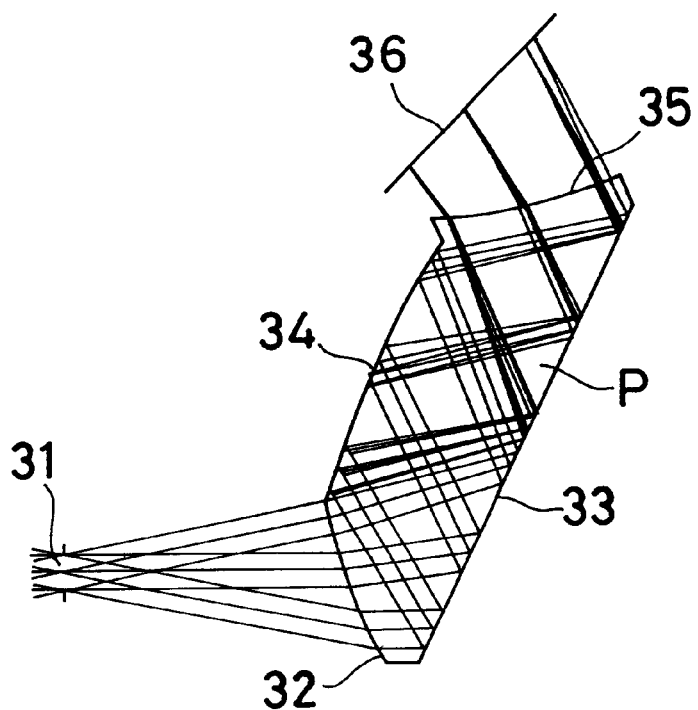
FIG. 30 is a diagram showing another example of decentered prisms applicable to the present invention.

In the case of FIG. 30, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then refracted by the fourth surface 35 to form an image on an image plane 36.

Figure 31:
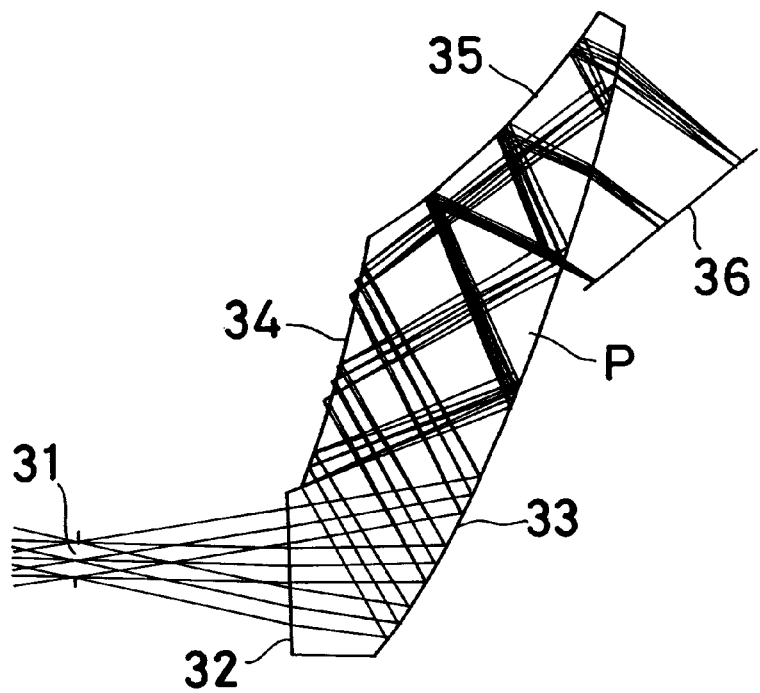
FIG. 31 is a diagram showing another example of decentered prisms applicable to the present invention.

In the case of FIG. 31, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then internally reflected by the fourth surface 35. The reflected light is then refracted by the second surface 33 to form an image on an image plane 36.

Figure 32:
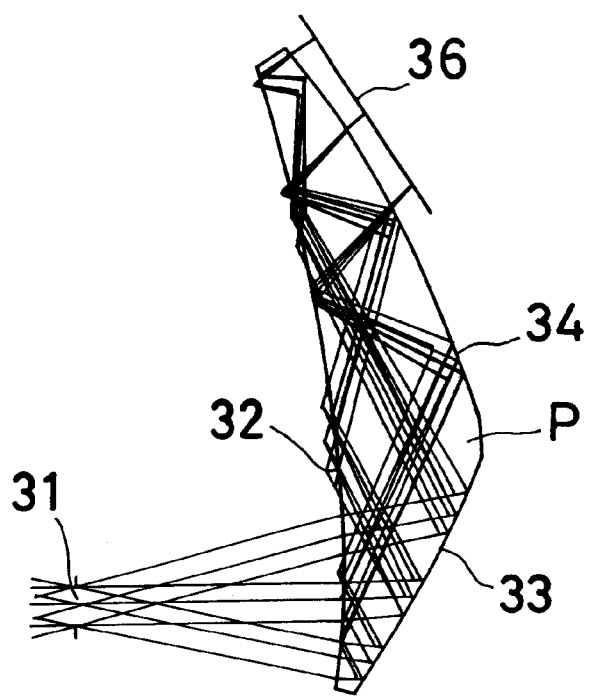
FIG. 32 is a diagram showing another example of decentered prisms applicable to the present invention.

In the case of FIG. 32, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. Then, the reflected light is refracted by the third surface 34 to form an image on an image plane 36.

Figure 33:
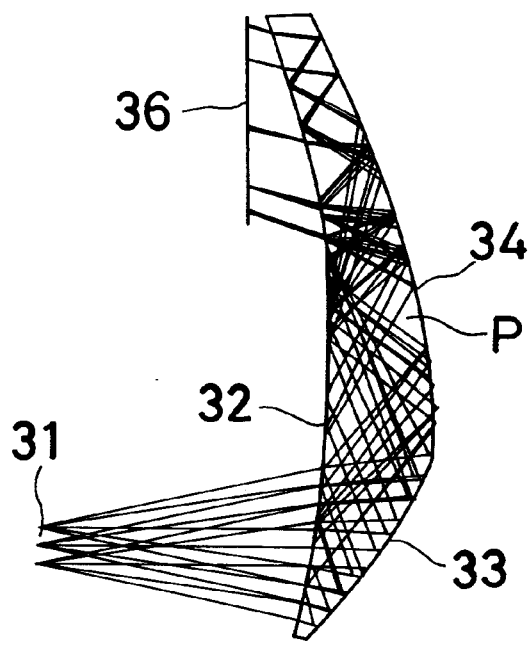
FIG. 33 is a diagram showing another example of decentered prisms applicable to the present invention.
Figure 34:
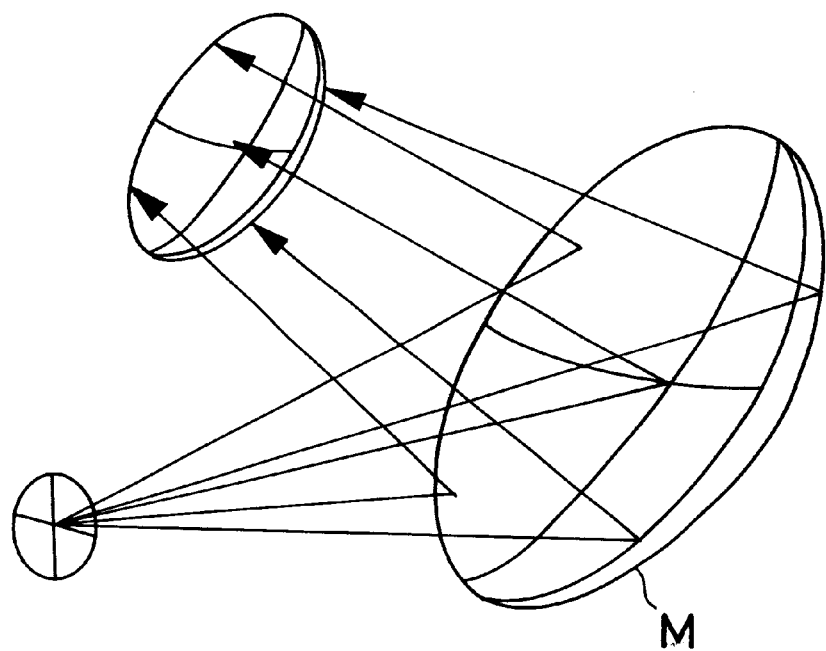
FIG. 34 is a conceptual view for describing curvature of field produced by a decentered reflecting surface.
Figure 35:
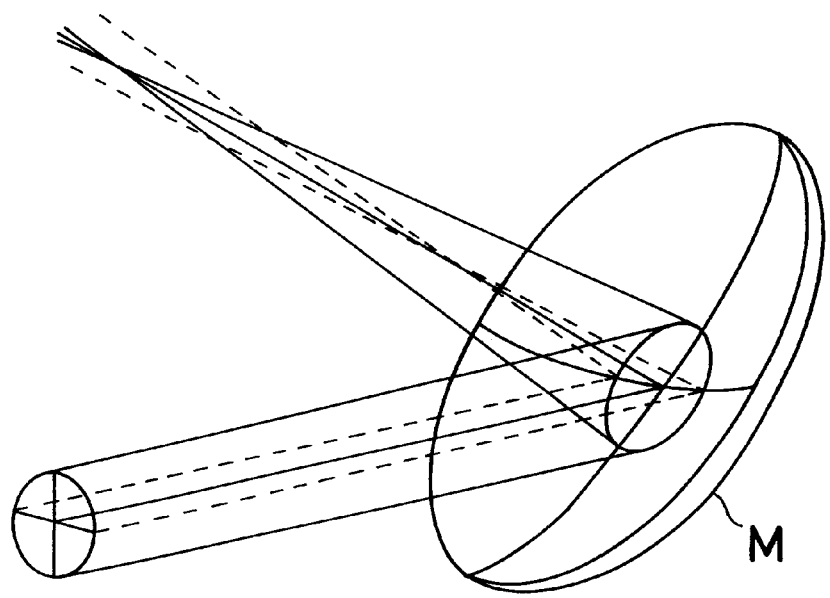
FIG. 35 is a conceptual view for describing astigmatism produced by a decentered reflecting surface.
Figure 36:
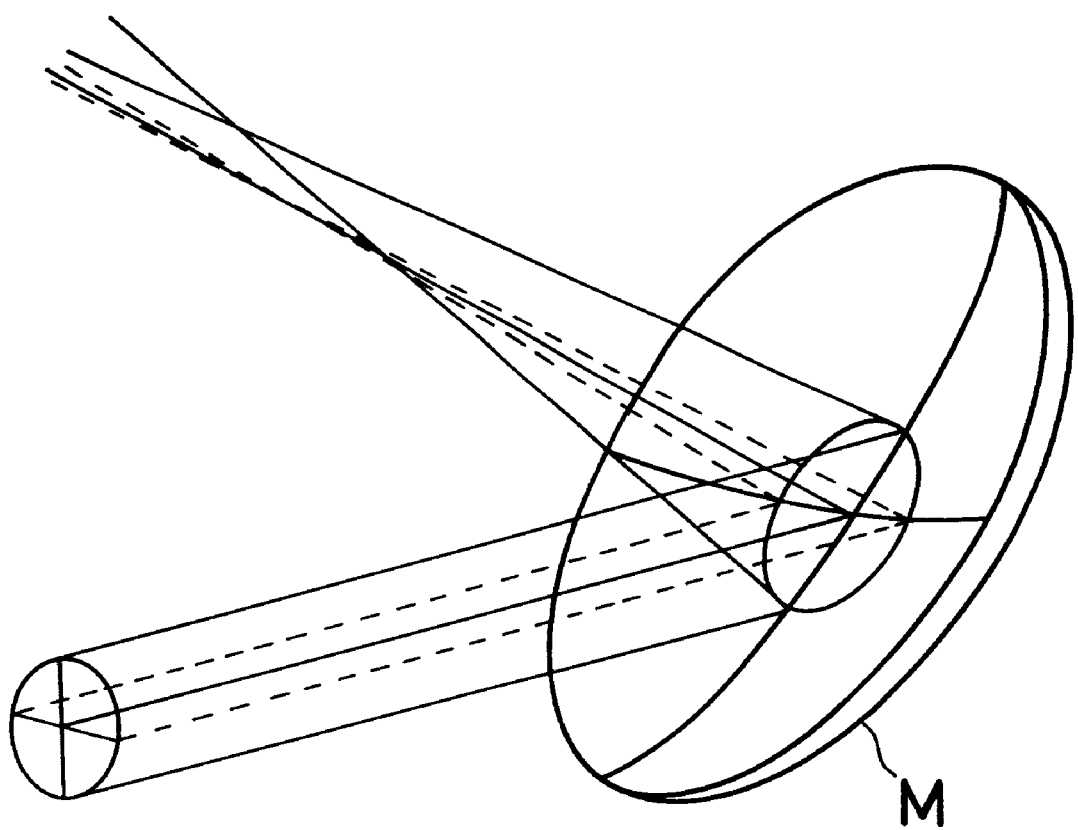
FIG. 36 is a conceptual view for describing coma produced by a decentered reflecting surface.
Figure 37A:
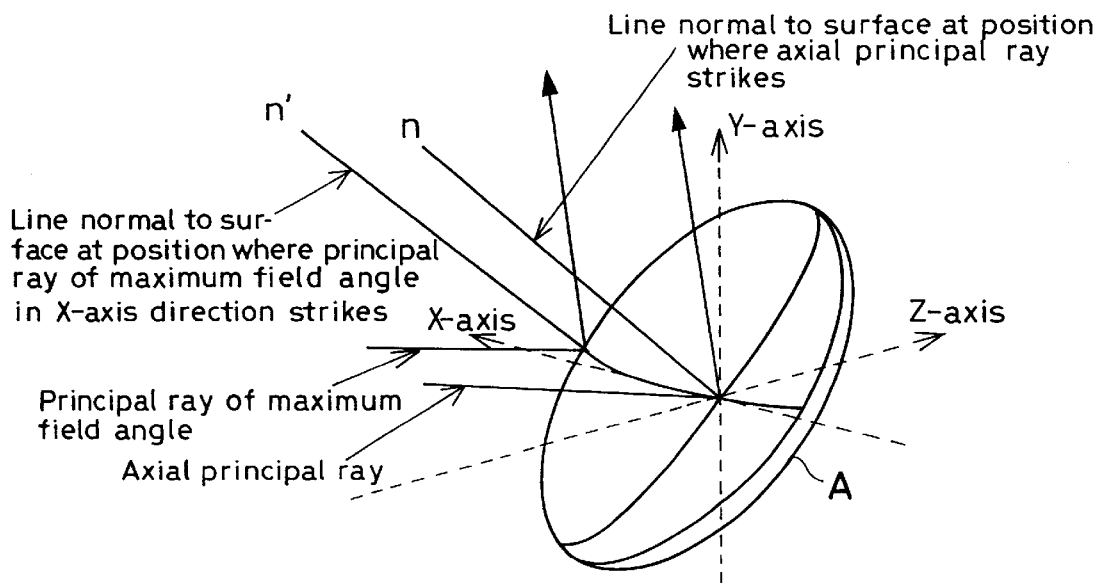
FIG. 37 is a diagram for describing parameter DY used in the present invention.
Figure 37B:
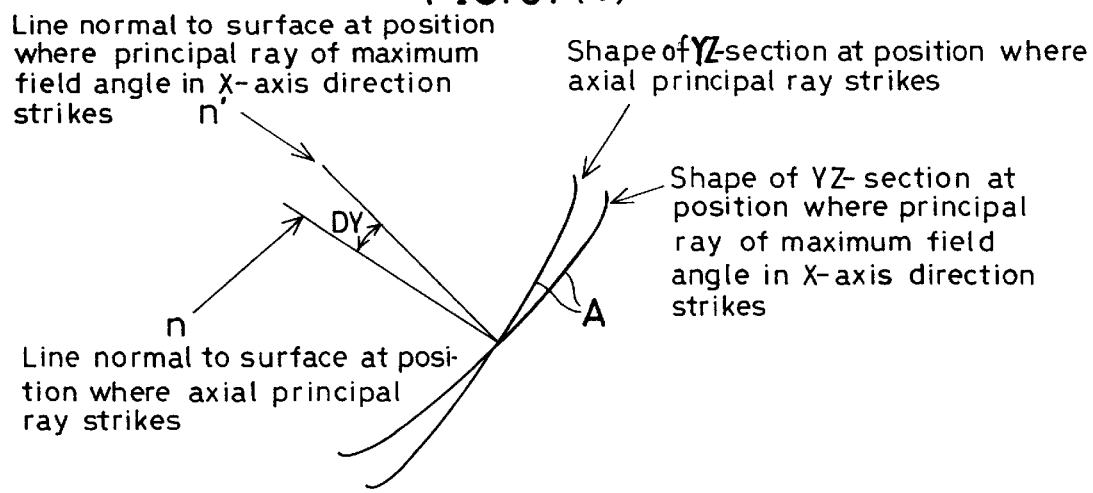
Figure 38:
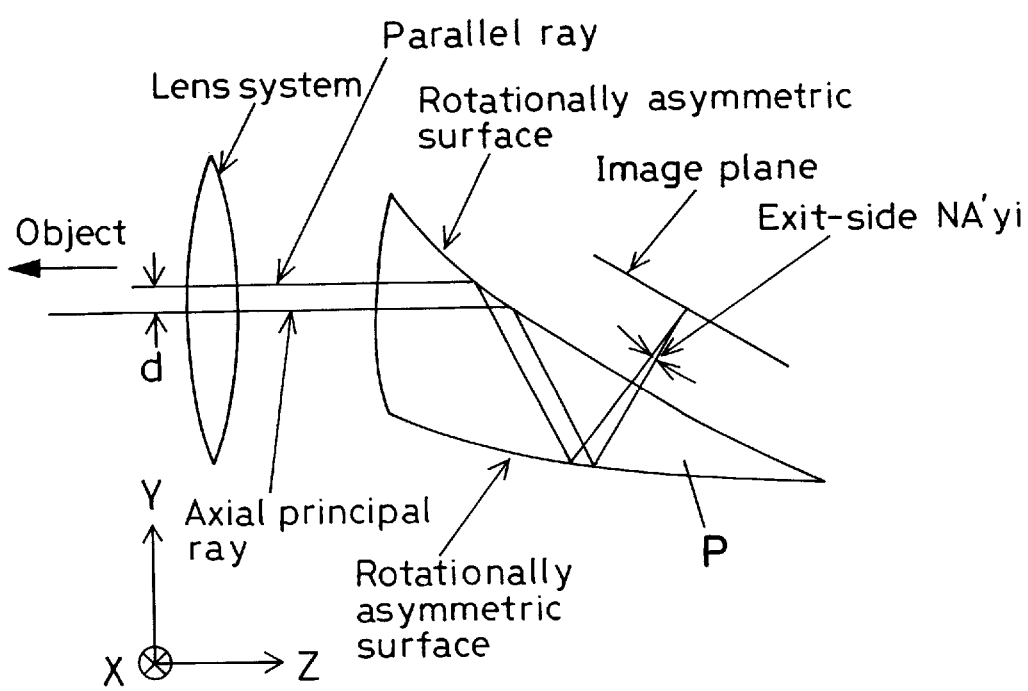
FIG. 38 is a diagram for describing the power of the image-forming optical system according to the present invention.

In the case of FIG. 33, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. The reflected light is internally reflected by the third surface 34 and then refracted by the first surface 32 to form an image on an image plane 36.

As has been stated above, and as will be clear from each example, the present invention makes it possible to obtain a high-performance and low-cost image-forming optical system with a minimal number of constituent optical elements. In addition, it is possible to obtain a high-performance image-forming optical system that is made compact and thin folding an optical path using reflecting surfaces arranged to minimize the number of reflections.

What is claimed is:

1. An image-forming optical system, comprising:
   at least one prism placed at each of front and back sides of a stop, said at least one prism having at least one reflecting surface having one of a positive and negative refractive power, said at least one prism being defined as a first prism; and
   a prism spacing fixing member constructed and arranged to keep a spacing between said first prism and another prism, which is defined as a second prism, along an optical path at a constant distance said prism spacing fixing member being arranged to connect together at least a non-optical surface of said first prism and a non-optical surface of said second prism,
   said image-forming optical system being approximately telecentric on an image side thereof.

2. An image-forming optical system consisting of:
   at least one prism placed at each of front and back sides of a stop, said at least one prism having at least one reflecting surface having one of a positive and negative refractive power, said at least one prism being defined as a first prism; and
   a prism spacing fixing member constructed and arranged to keep a spacing between said first prism and another prism, which is defined as a second prism, along an optical path at a constant distance, said prism spacing fixing member being arranged to connect together at least a non-optical surface of said first prism and a non-optical surface of said second prism.

3. An image-forming optical system, comprising:
   at least one prism placed at each of front and back sides of a stop, said at least one prism having at least one reflecting surface having one of a positive and negative refractive power, said at least one prism having at least one optical surface having both transmitting and reflecting actions, and said at least one prism being defined as a first prism; and
   a prism spacing fixing member constructed and arranged to keep a spacing between said first prism and another prism, which is defined as a second prism, along an optical path at a constant distance, said prism spacing fixing member being arranged to connect together at least a non-optical surface of said first prism and a non-optical surface of said second prism.

4. In an image-forming optical system having a plurality of prisms, at least one of said prisms having at least one reflecting surface having one of a positive and negative refractive power, said at least one of said prisms being defined as a first prism, the improvement wherein one and only one image-formation plane is present where light exits after passing through all optical elements of said image-forming optical system, and said image-forming optical system is approximately telecentric on an image side thereof and has a prism spacing fixing member constructed and arranged to keep a spacing between said first prism and another prism, which is defined as a second prism, along an optical path at a constant distance, said prism spacing fixing member being arranged to connect together at least a non-optical surface of said first prism and a non-optical surface of said second prism.

5. In an image-forming optical system having a plurality of prisms, at least one of said prisms having at least one reflecting surface having one of a positive and negative refractive power, said at least one of said prisms being defined as a first prism, the improvement wherein one and only one image-formation plane is present where light exits after passing through all optical elements of said image-forming optical system, and said image-forming optical system consists of said prisms and a prism spacing fixing member constructed and arranged to keep a spacing between said first prism and another prism, which is defined as a second prism, along an optical path at a constant distance, said prism spacing fixing member being arranged to connect together at least a non-optical surface of said first prism and a non-optical surface of said second prism.

6. In an image-forming optical system having a plurality of prisms, at least one of said prisms having at least one reflecting surface having one of a positive and negative refractive power, said at least one of said prisms being defined as a first prism, the improvement wherein one and only one image-formation plane is present where light exits after passing through all optical elements of said image-forming optical system, and said at least one of said prisms has at least one optical surface having both transmitting and reflecting actions, and wherein said image-forming optical system has a prism spacing fixing member constructed and arranged to keep a spacing between said first prism and another prism, which is defined as a second prism, along an optical path at a constant distance, said prism spacing fixing member being arranged to connect together at least a non-optical surface of said first prism and a non-optical surface of said second prism.

7. An image-forming optical system, comprising:

a diverging prism placed on an object side of a stop; and a converging prism placed on an image side of said stop;

wherein said diverging prism has an optical surface having reflecting action and said converging prism has an optical surface having reflecting action, said image-forming optical system being approximately telecentric on an image side thereof.

8. An image-forming optical system consisting of:

a diverging prism placed on an object side of a stop; and a converging prism placed on an image side of said stop, wherein said diverging prism has an optical surface having reflecting action and said converging prism has an optical surface having reflecting action.

9. An image-forming optical system comprising:

a diverging prism placed on an object side of a stop; and a converging prism placed on an image side of said stop;

wherein at least one of said diverging prism and said converging prism has at least one optical surface having both transmitting and reflecting actions.

10. An image-forming optical system, comprising:

a converging prism; and a diverging prism placed on an object side of said converging prism;

wherein said diverging prism has an optical surface having reflecting action and said converging prism has an optical surface having reflecting action; and wherein there is only one image-formation plane throughout said image-forming optical system, said image-forming optical system being approximately telecentric on an image side thereof.

11. An image-forming optical system consisting of:

a converging prism; and a diverging prism placed on an object side of said converging prism;

wherein said diverging prism has an optical surface having reflecting action and said converging prism has an optical surface having reflecting action, and wherein there is only one image-formation plane throughout said image-forming optical system.

12. An image-forming optical system, comprising:

a converging prism having a positive refractive power; and a diverging prism having a negative refractive power placed on an object side of said converging prism, wherein there is only one image-formation plane throughout said image-forming optical system, and at least one of said converging prism and said diverging prism has at least one optical surface having both transmitting and reflecting actions.

13. An image-forming optical system according to any one of claims 1 to 6, wherein said reflecting surface is decentered with respect to an optical axis and has a rotationally asymmetric curved surface configuration.

14. An image-forming optical system comprising, in order in which rays pass from an object side thereof:

a first prism having a first transmitting surface, a first reflecting surface, a second reflecting surface, and a second transmitting surface;

a stop; and a second prism having a first transmitting surface, a first reflecting surface, a second reflecting surface, and a second transmitting surface;

wherein said first transmitting surface and second reflecting surface of said first prism are an identical surface, and said first reflecting surface and second transmitting surface of said second prism are an identical surface.

15. An image-forming optical system according to any one of claims 1 to 12 and 14, wherein a reflecting surface that gives one of a positive and negative power to a light beam when reflecting said light beam is provided in each of a prism member in a front unit in front of the stop and a prism member in a rear unit behind the stop.

16. An image-forming optical system according to any one of claims 1 to 12 and 14, wherein, when said at least one prism is defined as a first prism, said image-forming optical system has a prism spacing fixing member constructed and arranged to keep a spacing between said first prism and another prism, which is defined as a second prism, along an optical path at a constant distance, said prism spacing fixing member being arranged to connect together at least a non-optical surface of said first prism and a non-optical surface of said second prism.

17. An image-forming optical system according to claim 13, wherein said reflecting surface is a plane-symmetry free-form surface having only one plane of symmetry, which is arranged to correct decentration aberrations produced by a decentered surface having a power.

18. An image-forming optical system according to claim 15, wherein the reflecting surface with one of a positive and negative refractive power that is provided in the prism member in said front unit and the reflecting surface with a power that is provided in the prism member in said rear unit are both plane-symmetry free-form surfaces each having only one plane of symmetry, wherein the only one plane of symmetry of said plane-symmetry free-form surface in said front unit and the only one plane of symmetry of said plane-symmetry free-form surface in said rear unit are in approximately an identical plane.

19. An image-forming optical system according to claim 15, wherein at least one prism member in said front unit has at least two reflecting surfaces, both said at least two reflecting surfaces having a rotationally asymmetric curved surface configuration that gives one of a positive and negative refractive power to a light beam and has an aberration correcting action.

20. An image-forming optical system according to claim 15, wherein at least one prism member in said rear unit has at least two reflecting surfaces, both said at least two reflecting surfaces having a rotationally asymmetric curved surface configuration that gives one of a positive and negative refractive power to a light beam and has an aberration correcting action.

21. An image-forming optical system according to claim 19, wherein the rotationally asymmetric curved surface configuration of said at least two reflecting surfaces provided in said at least one prism member is formed from a plane-symmetry free-form surface having only one plane of symmetry, wherein the only one plane of symmetry of one of said at least two reflecting surfaces and the only one plane of symmetry of at least one other of said reflecting surfaces are in approximately an identical plane.

22. An image-forming optical system according to claim 17, which has an electronic image pickup device placed in an image plane, said electronic image pickup device having a quadrangular shape, wherein the only one plane of symmetry of said plane-symmetry free-form surface is approximately parallel to at least one side of said quadrangular shape.

23. An image-forming optical system according to any one of claims 1 to 12 and 14, wherein said image-forming optical system is a single focal length optical system.

24. A photographic apparatus having the image-forming optical system of any one of claims 1 to 12 and 14, wherein said image-forming optical system is placed in an image pickup part of an image pickup apparatus.

25. A camera apparatus having the photographic apparatus of claim 24, wherein said photographic apparatus has a camera mechanism.

26. An observation apparatus having the image-forming optical system of any one of claims 1 to 12 and 14, wherein said image-forming optical system is placed in image forming means for forming an image to be observed.

27. A camera apparatus having the observation apparatus of claim 26, wherein said observation apparatus has a finder mechanism of a camera.

28. An endoscope apparatus having the observation apparatus of claim 26, wherein said observation apparatus has an observation system of an endoscope.

29. A photographic apparatus or a camera apparatus according to claim 24, wherein the prism member placed in said front unit is closest to an object side of said front unit among optical elements having an optical action, said prism member having an entrance surface decentered with respect to an optical axis, and wherein a cover member is placed on an object side of said prism member at right angles to the optical axis.

30. A photographic apparatus or a camera apparatus according to claim 24, wherein the prism member placed in said front unit has an entrance surface on an object side thereof, said entrance surface being decentered with respect to an optical axis, and wherein a cover lens having a power is placed on an object side of said entrance surface in coaxial relation to the optical axis, said cover lens facing said entrance surface across an air spacing.

* * * * *